(12) United States Patent
Ades

(10) Patent No.: US 7,733,797 B2
(45) Date of Patent: Jun. 8, 2010

(54) COMMUNICATIONS MESHES

(75) Inventor: Stephen Ades, Cambridgeshire (GB)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 11/737,579

(22) Filed: Apr. 19, 2007

(65) Prior Publication Data

US 2007/0189191 A1 Aug. 16, 2007

Related U.S. Application Data

(62) Division of application No. 09/971,655, filed on Oct. 9, 2001, now Pat. No. 7,286,489.

(51) Int. Cl.
*G08C 15/00* (2006.01)
(52) U.S. Cl. .................. 370/252; 370/254; 370/400
(58) Field of Classification Search .............. None
See application file for complete search history.

(56) References Cited

U.S. PATENT DOCUMENTS

| | | | |
|---|---|---|---|
| 4,475,010 A | 10/1984 | Huensch et al. | |
| 5,088,091 A | 2/1992 | Schroeder et al. | |
| 5,949,760 A | 9/1999 | Stevens et al. | |
| 6,286,038 B1 * | 9/2001 | Reichmeyer et al. | 709/220 |
| 6,400,681 B1 * | 6/2002 | Bertin et al. | 370/218 |
| 6,456,599 B1 * | 9/2002 | Elliott | 370/254 |
| 6,744,775 B1 * | 6/2004 | Beshai et al. | 370/409 |
| 6,751,196 B1 | 6/2004 | Hulyalkar et al. | |
| 2004/0213167 A1 | 10/2004 | Garcia-Luna-Aceves et al. | |

FOREIGN PATENT DOCUMENTS

| | | |
|---|---|---|
| EP | 0 457 445 A2 | 11/1991 |
| JP | 04-229898 | 8/1992 |
| JP | 07-066835 | 3/1995 |
| JP | 07-231322 | 8/1995 |
| JP | 11-152450 | 6/1999 |
| WO | WO-9827694 | 6/1998 |

OTHER PUBLICATIONS

Second Preliminary Rejection for Korean Patent Application No. 10-2003-70050000, mailed Jul. 31, 2008, 6 pgs.

(Continued)

*Primary Examiner*—Chirag G Shah
*Assistant Examiner*—Daniel Mitchell
(74) *Attorney, Agent, or Firm*—Blakely, Sokoloff, Taylor & Zafman LLP

(57) ABSTRACT

Methods are disclosed for forming a network (1) of nodes (A-H) from a plurality of nodes (A-H) and a plurality of potential transmission links (2) between respective nodes (A-H). Methods are also disclosed for adapting an initial mesh communications network configuration to a final mesh communications network communications configuration. Methods are also disclosed such that at least some of the changes to the initial mesh communications network configuration that are required as part of the adaptation to the final mesh communications network configuration form a group of changes such that all of the changes within the group can occur substantially simultaneously. Various other methods useful in or to a mesh communications network (1) are also disclosed herein.

20 Claims, 6 Drawing Sheets

OTHER PUBLICATIONS

Second Office Action for CN Application No. 2005-10083381.5, dated Feb. 22, 2008, 9 pgs.

Non-final Office Action for CN Application No. 2005-10083381.5, dated May 25, 2007, 3 pgs.

Non-Final Office Action for Japan Patent Application No. 2002535325, mailed Jan. 23, 2007, 3 pgs.

Final Office Action for Japan Patent Application No. 2002535325, dated Aug. 27, 2007, 4 pgs.

International Search Report from PCT/GB01/04503, mailed Sep. 25, 2002, 4 pgs.

1ST Office Action for Canadian Patent Application No. 2,463,479, mailed Jun. 5, 2008, 3 pgs.

EP Application No. 01 974 467.1-2416; Examination Report dated Jun. 6, 2006, 3 pgs.

KR Application No. 10-2003-700500; Notice of Preliminary Rejection dated Oct. 31, 2007, 16 pgs.

Office Action from U.S. Appl. No. 09/971,655 mailed Apr. 5, 2006, 9 pgs.

Office Action from U.S. Appl. No. 09/971,655 mailed Nov. 29, 2006, 8 pgs.

Second Preliminary Rejection mailed Jul. 31, 2008 for Korean Patent Application No. 10-2003-70050000, 12 pgs.

Second Office action dated Feb. 22, 2008, CN Application No. 2005-10083381.5, 11 pgs.

Non-final Office action dated May 25, 2007, CN Application No. 2005-10083381.5, 5 pgs.

Non-Final Office Action mailed Jan. 23, 2007 for Japan Patent Application No. 2002535325, 6 pgs.

Final Office Action dated Aug. 27, 2007 for Japan Patent Application No. 2002535325, 5 pgs.

International Search Report and Written Opinion from PCT/GB01/04503 mailed Sep. 25, 2002, 4 pgs.

1ST Office Action, Non-Final Office Action mailed Jun. 5, 2008 for Canadian Patent Application No. 2,463,479, 5 pgs.

\* cited by examiner

AVAILABLE LINE OF SIGHT: ·············
         LINK: ─────────

Before

Available LoS: 4
Min MIP hops: 3
Committed Sink: 1.1 Mb/s
Committed Source: 1.4 Mb/s Available LoS: 1
Min MIP hops: 4
Committed Sink: 1.2 Mb/s
Committed Source: 1.3 Mb/s

After

Available LoS: 3
Min MIP hops: 3
Committed Sink: 2.3 Mb/s
Committed Source: 2.7 Mb/s Available LoS: 0
Min MIP hops: 4
Committed Sink: -1
Committed Source: -1

COMMUNICATIONS MESHES

CROSS-REFERENCE TO RELATED APPLICATIONS

This application is a division of U.S. patent application Ser. No. 09/971,655 filed Oct. 9, 2001 and entitled "Communications Meshes."

In one aspect, the present invention relates to a method of and apparatus for forming a network of nodes, particularly in the context of a communications mesh of interconnected nodes. In another aspect, the present invention relates to methods of and apparatus for adapting a communications mesh. In another aspect, the present invention relates to a mesh communications network. In yet another aspect, the present invention relates to a method of measuring the behaviour of a proposed mesh communications network whilst operating an existing mesh communications network. The present invention also relates to related software and hardware by which these methods are implemented.

In this specification, various headings and sub-headings have been used. It should be noted that the headings and sub-headings have been used merely for reasons of clarity and convenience and are not intended to have any legal effect.

BACKGROUND

In our International patent application WO-A-98/27694, the entire disclosure of which is incorporated herein by reference, there is disclosed a communications apparatus comprising a network in the form of a "mesh" of interconnected nodes. Each node in the mesh can communicate with plural other nodes via individual respective point-to-point radio links between nodes by means of substantially unidirectional (i.e. highly directional) radio transmissions along the links, i.e. signals are not broadcast but are instead directed to a particular node with signals being capable of being passed in both directions along the link. The frequency used may be for example at least about 1 GHz. A frequency greater than 2.4 GHz or 4 GHz may be used. Indeed, a frequency of 40 GHz, 60 GHz or even 200 GHz may be used. Beyond radio frequencies, other yet higher frequencies such as of the order of 100,000 GHz (infra-red) could be used. In the preferred embodiment, each node in the mesh has plural antennas which provide plural potential point-to-point transmission links to other nodes. For example, each node may have four or eight antennas each respectively providing a link to another node. (It will be understood that in this context, "antenna" is to be construed broadly and includes any arrangement that can send or receive a highly directional beam. The plural antennas may for example be provided by plural physically discrete antennas that are individually selectable, by one or more physically steerable antennas, or by a phased array antenna.) In an example, time division duplex (TDD) is used to alternate transmission and reception at the nodes by dividing transmission and reception time frames into discrete timeslots.

The primary advantages of this "mesh" approach are set out in WO-A-98/27694 and include the distribution of bandwidth across the mesh and its associated capacity advantages over alternative systems (such as point-to-multipoint or broadcast systems); the availability of diverse traffic paths to at least the majority of nodes, which potentially allows service to be maintained regardless of whether or not a particular node has failed, thereby giving high resilience; and the potential to supply different nodes with widely varying levels of data traffic without the need for more than one type of radio link, simply by using a variable number of data paths to carry the data traffic. A wireless system has obvious advantages over a wired system in that it is not necessary to dig up roads, etc. to lay and maintain cables.

At least some and more preferably most nodes in the fully established mesh of interconnected nodes will be associated with a subscriber, which may be a natural person or an organisation such as a company, university, etc. Each subscriber node will typically act as the end point of a link dedicated to that subscriber (i.e. as a source and as a sink of data traffic) and also as an integral part of the distribution network for carrying data intended for other nodes. However, an operator of the mesh network may initially deploy a set of "seed" nodes in a "seed network". A seed node will typically be a non-subscriber node (though it may later be converted into a subscriber node) that is placed by the network operator prior to offering network services to potential subscribers and will typically be deployed to be highly visible to a large number of potential subscribers. (The word "visible" and the phrase "line-of-sight" or similar will be used herein in the sense that when two nodes or sites are said to be "visible" to each other or to be in "line-of-sight" with each other, the nodes or nodes positioned at the sites can in principle communicate with each other wirelessly at the frequency or frequencies used in the network when suitable transmitting and receiving equipment is installed at the site.) In the seed network, each node is visible to at least one other node. The seed network allows a suitable, minimum number of subscriber nodes to be connected to the mesh directly via these seed nodes when network services are offered by the operator. The seed nodes will typically act only as transit nodes and not as either sources or sinks of network traffic (whether for example user traffic or network management traffic). A seed node may in due course be associated with a subscriber and therefore become a subscriber node.

Formation

Once there has been established a suitable seed network or other set of nodes in which each node is in principle visible to at least one other node, it is necessary to select from all possible lines-of-sight between the nodes (i.e. potential wireless transmission links between the nodes) those which are most suitable for use as actual wireless transmission links between the nodes. This process will be referred to herein by the phrase "formation of a mesh" or similar. It will be understood that the process of formation of a mesh can be used for any mesh and may for example be used during initial formation of a mesh and during growth of a mesh, and may be applied repeatedly. It should be borne in mind that the problem of formation of a mesh of interconnected nodes of the type disclosed in WO-A-98/27694 and discussed above is a problem that does not arise in other network systems. For example, in a conventional telephone network or in for example the Internet, there already exists a network in which links exist between subscribers; network issues in such networks tend only to be concerned with the problem of routing from one subscriber to another in the existing network, taking into account the fact that some links may be faulty or otherwise unavailable. In contrast, given a set of nodes which are to be connected to form a mesh of interconnected nodes as disclosed in our WO-A-98/27694 and discussed above, typically the communication links for any one node can be set up to link that node to one (or other predetermined number) of many other nodes. In other words, there are many choices of ways of linking the nodes to provide a mesh. Therefore, one of the first problems to be addressed is how to form the mesh of interconnected nodes, i.e. given a set of nodes, how to determine which nodes should be provided with communication links to which other nodes. Such links should preferably be chosen such that these links provide adequate capacity for all data traffic to be routed across these links.

The problem of mesh formation will normally be a mathematically hard problem given the enormous number of potential links that will exist given a typical set of (unconnected) nodes and the fact that the number of combinations of potential communication links increases much more rapidly than the number of nodes. Moreover, not all topologically valid meshes will be suitable for use as a mesh network because of practical problems, such as for example the presence of a limited number of antennas available at each node, data traffic capacity limitations at each node or of the available RF spectrum (including a limitation on the number of timeslots available for transmission and reception), and restrictions on the length of traffic paths between the nodes (measured both in physical lengths of individual links and the number of transit nodes through which data passes from a source node to a target node).

In one implementation of the mesh, the mesh will be a self-contained or "non-access" network, that is the network is not connected to any external network. Such a non-access network is useful for example as a local area network or a wide area network, which may for example be used by a single organisation to provide network services to its users.

In the preferred implementation however, the mesh will typically be connected to an external network. For example, where the mesh is an access network, the external network will be a core network such as a trunk network. The point at which traffic passes from the external network into the mesh and vice versa will be referred to herein as a trunk network connection point ("TNCP"); it will be understood that this term is to be construed broadly as a connection point to any external network and is not limited to connection to a conventional trunk network. Special nodes, referred to in the specific description herein as mesh insertion points ("MIPs"), will typically be placed by the network operator and will have an additional direct link (typically using any technology) to a TNCP. The process of mesh formation in such cases will normally need to ensure that all nodes in the mesh are connected (directly, or indirectly via other nodes) to a MIP. The process should also preferably ensure that adequate capacity is provided for all the data traffic to be routed, taking into consideration the capacities of all links (using any technology) as far as the TNCP. In an alternative case or in only some parts of the network, a MIP and TNCP may be the same device, in which case the process of mesh formation remains the same as described herein.

According to a first aspect of the present invention, there is provided a method of forming a network of nodes from a plurality of nodes and a plurality of potential transmission links between respective nodes, at least one of the nodes being a connection node that provides a data connection into and out of the formed network, and wherein for each node that is not a connection node there is a maximum number of links acceptable for a transmission path from said node to a connection node, each node in the formed network being able to communicate with at least one other node by a transmission link between said each node and said at least one other node, each of the nodes in the formed network other than said connection node or connection nodes being linked to at least one connection node by at least one transmission path that comprises either a single transmission link between the node and a connection node or respective transmission links between the node and a connection node via one or more intermediate nodes, the method comprising the steps of:

for a node which is not a connection node and which has not been linked to a connection node:

(a) where there is a single connection node, identifying all transmission paths from said node to said single connection node that do not exceed said maximum number of links or, where there are plural connection nodes, identifying all transmission paths from said node to any of said connection nodes that do not exceed said maximum number of links;

(b) testing said paths against at least one criterion for acceptability until an acceptable path is found and providing links between the or each node on that acceptable path so that the or each node on that acceptable path is linked to a connection node by a transmission path which comprises either a single transmission link between the node and a connection node or respective transmission links between the node and a connection node via one or more intermediate nodes; and, (c) repeating steps (a) and (b) for all nodes which are not connection nodes and which have not been linked to a connection node.

According to a second aspect of the present invention, there is provided a method of providing a topology for a network of nodes and actual transmission links between nodes by determining which of a plurality of potential transmission links between the nodes should be made into actual transmission links between nodes, at least one node being a connection node that provides a data connection into and out of the formed network, and wherein for each node that is not a connection node there is a maximum number of links acceptable for a transmission path from said node to a connection node, each node in the formed network being in communication with at least one other node by a transmission link between said each node and said at least one other node, each of the nodes in the formed network other than said connection node or connection nodes being linked to at least one connection node by at least one transmission path which comprises either a single transmission link between the node and a connection node or respective transmission links between the node and a connection node via one or more intermediate nodes, the method comprising the steps of:

for a node which is not a connection node and which has not been linked to a connection node:

(a) where there is a single connection node, identifying all transmission paths from said node to said single connection node that do not exceed said maximum number of links or, where there are plural connection nodes, identifying all transmission paths from said node to any of said connection nodes that do not exceed said maximum number of links;

(b) testing said paths against at least one criterion for acceptability until an acceptable path is found and flagging in a computer database or data structure a variable representing the or each node on that acceptable path to indicate that said the or each node on that acceptable path is linked to a connection node; and, (c) repeating steps (a) and (b) for all nodes which are not connection nodes and which have not been flagged as linked to a connection node;

thereby to provide a dataset representing a topology for a network of the nodes and transmission links between the nodes.

These first and second aspects allow formation of an access network that includes the nodes. There is provided a method which enables an operator to determine, in a finite and practically short time, how to link nodes to provide a desired degree of service to the nodes. In a typical embodiment, the result of the method will be a database or data structure that indicates or represents a topology showing for all nodes that can be connected into a mesh how they should be linked to other nodes. A network operator in practice can then take that database or data structure and implement a physical realisation of the mesh as generally described above and in our WO-A-98/27694 by linking actual nodes using actual transmission links in reliance on the topology indicated or represented by that database or data structure.

In either aspect, each of the transmission links may be a wireless transmission link. Alternatively, some of the transmission links may be wireless transmission links and the remainder of the transmission links are cabled transmission links. It will be understood that "cabled" is to be construed broadly to include any suitable tangible medium including for example wired connections, optical fibres, etc.

In either aspect, steps (a) to (c) are preferably applied to nodes in descending order of expected data flow rate requirements for the nodes. Thus, in this embodiment, the nodes with the highest bandwidth requirements are connected first, thereby helping to minimise the bandwidth.hops or bandwidth.distance product across the network. On average, the largest amounts of data will have the shortest distance to travel to and from a connection node. The "data flow requirements" may be for example the committed source rate or committed sink rate or the sum thereof for the nodes, optionally including a fixed or variable overhead for network management traffic.

The method may comprise the step of, after step (a) and before step (b), determining an order of priority of said paths and wherein in step (b) said paths are tested for acceptability in said order of priority.

In the method, where at least some of the links are wireless transmission links, step (a) may comprise identifying all paths from said node to at least one connection node, and the order of priority of the paths may be determined in ascending order of the number of wireless transmission links in those paths. In this example, the nodes with the smallest number of wireless transmission links in a path to a connection node are connected first, again helping to minimise the bandwidth.hops or bandwidth.distance product across the network.

In the method, step (a) may comprise identifying all paths from said node to at least one connection node, and the order of priority of the paths may be determined in ascending order of the total currently committed data flow rate of the connection nodes to which said paths lead. In this example, the connection node that has the lowest currently committed data flow rate is preferred, it being understood that the committed data flow rate of a connection node increases as nodes are linked to it during repeated iterations of the method.

Where at least some of the links are wireless transmission links, the order of the paths may be determined in ascending order of the total physical length of the wireless transmission links within said paths. In this example, the path with the shortest total physical length of any wireless transmission links in the path is preferred.

The order of the paths may be determined in descending order of the number of links in a path that form at least a portion of a path that has previously been determined to be acceptable. In this example, when there are paths that have already been determined to be acceptable, there will be links on that path that are already committed to carrying data traffic. When determining the order of paths, it is preferred that the largest possible number of previously committed links be re-used, so as to minimise the total number of links used at this stage of the network formation.

In one preferred embodiment, the order of the paths is determined by applying these criteria in the following sequence: in ascending order of the number of wireless transmission links in those paths, in ascending order of the total currently committed data flow rate of the connection nodes to which said paths lead, in ascending order of the total physical length of any wireless transmission links in said paths, and in descending order of the number of links in a path that form at least a portion of a path that has previously been determined to be acceptable. In another embodiment, the order of the paths is determined by applying these criteria in the following sequence: in ascending order of the total physical length of any wireless transmission links in said paths, in ascending order of the total currently committed data flow rate of the connection nodes to which said paths lead, in ascending order of the number of wireless transmission links in those paths, and in descending order of the number of links in a path that form at least a portion of a path that has previously been determined to be acceptable.

In step (b) a path may be determined to be unacceptable if linking the or each node on that path to a connection node would exceed the maximum data traffic flow rate for that connection node.

In the formed mesh, transmissions to and from a connection node may take place during distinct timeslots, in which case it is preferred that in step (b) a path is determined to be unacceptable if linking the or each node on that path to a connection node would exceed the number of timeslots available at that connection node.

In the formed mesh, transmissions to and from a connection node may take place during distinct timeslots, in which case it is preferred that in step (b) a path is determined to be unacceptable if linking the or each node on that path to a connection node would exceed the number of timeslots available at any node on that path.

The or each node on a path being tested in step (b) may have plural antennas, each antenna being capable of providing a respective wireless transmission link with another node, in which case it is preferred that a path is determined to be unacceptable in step (b) if linking the or each node on that path to a connection node would result in any of the nodes not having at least one free antenna. In this example, a path is rejected if it would result in any of the nodes on that path not having a free antenna. It is desirable for each node to have a free antenna which is not committed for use in normal operation of the network in order to allow actual signal or interference measurements to be made. Furthermore, having a free antenna enables verification that each line-of-sight proposed for use in the preferred "adaptation" steps discussed further below is viable for use as a radio link. Having a free antenna also enables or at least simplifies verification that a link will operate correctly after an adaptation sequence has been effected. Furthermore, a free antenna enables adaptation of a mesh without interruption to traffic flows.

The or each node on a path being tested in step (b) may have plural antennas, each antenna being capable of providing a respective wireless transmission link with another node, in which case it is preferred that step (b) comprises the further step of flagging all potential links to/from a node as unavailable for use in a path if that node is linked to a connection node and has only one free antenna or if that node is a connection node and has only one free antenna. This example prevents the method investigating the assignment of links to nodes which it is already known are not viable or preferred.

Step (b) may comprise the further step of flagging all potential links between two nodes as unavailable for use in a path if both of said nodes are linked to a connection node. This example removes from consideration links between nodes which are no longer suitable because redundant paths are not allowed in this embodiment or at this stage of the method.

Step (b) may comprise the further step of flagging all potential links between a node and a connection node as unavailable for use in a path if said node is linked to a connection node. This example again removes from consideration links between nodes which are no longer suitable because redundant paths are not allowed in this embodiment or at this stage of the method.

It is preferred that prior to linking a node to a connection node, a check is made of all other nodes that have not been linked to a connection node to determine whether any of said other nodes would be made unconnectable to a connection node if said first node were linked to said connection node. It is preferred that said first node is not linked to a connection node if there are any nodes that would be made unconnectable to a connection node if said first node were linked to said connection node.

The method may comprise the step of, prior to step (a), for a node that has a single potential link to another node, linking that node to another node using said single potential link and marking said single potential link as unavailable for use in another path. This is part of what is termed herein the "anti-orphan" procedure and prevents such nodes from being "orphaned" or cut off from the rest of the mesh.

The method may comprise the step of providing further links between at least some of the nodes so as to create redundant paths to a connection node for at least one of the nodes. In this preferred embodiment, redundant paths are added, preferably as far as possible so that as many nodes as possible have completely independent paths to the connection node in order to provide for resilience (in the sense that back-up paths are available in the event of the failure of any component in the primary path) and to provide for diversity (such that for example a large amount of data from one node can be divided into smaller amounts which are sent over different paths).

According to a third aspect of the present invention, there is provided a method of forming a network of nodes from a plurality of nodes and a plurality of potential transmission links between respective nodes, each node in the formed network being able to communicate with at least one other node by a transmission link between said each node and said at least one other node, each of the nodes in the formed network being linked to at least one designated anchor node by at least one transmission path that comprises either a single transmission link between the node and a designated anchor node or respective transmission links between the node and a designated anchor node via one or more intermediate nodes, wherein all nodes in the formed network are linked to all other nodes, and wherein for each node that is not a designated anchor node there is a maximum number of links acceptable for a transmission path from said node to a designated anchor node, the method comprising the steps of:

for a node which is not a designated anchor and which has not been linked to a designated anchor node:
  (a) where there is a single designated anchor node, identifying all transmission paths from said node to said single designated anchor node that do not exceed said maximum number of links or, where there are plural designated anchor nodes, identifying all transmission paths from said node to any of said designated anchor nodes that do not exceed said maximum number of links;
  (b) testing said paths against at least one criterion for acceptability until an acceptable path is found and providing links between the or each node on that acceptable path so that the or each node on that acceptable path is linked to a designated anchor node by a transmission path which comprises either a single transmission link between the node and a designated anchor node or respective transmission links between the node and a designated anchor node via one or more intermediate nodes; and,
  (c) repeating steps (a) and (b) for all nodes which are not designated anchor nodes and which have not been linked to a designated anchor node.

According to a fourth aspect of the present invention, there is provided a method of providing a topology for a network of nodes and actual transmission links between nodes by determining which of a plurality of potential transmission links between the nodes should be made into actual transmission links between nodes, each node in the formed network being in communication with at least one other node by a transmission link between said each node and said at least one other node, each of the nodes in the formed network being linked to at least one designated anchor node by at least one transmission path which comprises either a single transmission link between the node and a designated anchor node or respective transmission links between the node and a designated anchor node via one or more intermediate nodes, wherein all nodes in the formed network are linked to all other nodes, and wherein for each node that is not a designated anchor node there is a maximum number of links acceptable for a transmission path from said node to a designated anchor node, the method comprising the steps of:

for a node which is not a designated anchor node and which has not been linked to a designated anchor node:
  (a) where there is a single designated anchor node, identifying all transmission paths from said node to said single designated anchor node that do not exceed said maximum number of links or, where there are plural designated anchor nodes, identifying all transmission paths from said node to any of said designated anchor nodes that do not exceed said maximum number of links;
  (b) testing said paths against at least one criterion for acceptability until an acceptable path is found and flagging in a computer database or data structure a variable representing the or each node on that acceptable path to indicate that said the or each node on that acceptable path is linked to a designated anchor node; and,
  (c) repeating steps (a) and (b) for all nodes which are not designated anchor nodes and which have not been flagged as linked to a designated anchor node;
  thereby to provide a dataset representing a topology for a network of the nodes and transmission links between the nodes in which all nodes in the formed network are linked to all other nodes.

These third and fourth aspects allow formation of a self-contained or "non-access" network that includes the nodes and rely on analogous steps as for formation of an access network as described above in connection with the first and second aspects. If there is one anchor node, then these methods produce a fully interconnected set of nodes. In the case of more than one anchor node, then a fully interconnected set of nodes will be produced if the anchor nodes are themselves interconnected. This may be done by any means, before or after the application of the method. It may be done by applying the method described herein to a set of lines-of-sight between the anchor nodes.

Preferred embodiments and detailed examples of these third and fourth aspects are generally analogous to those set out above for the first and second aspects described above.

According to another aspect of the present invention there is provided a computer program comprising program instructions for causing a computer to perform the method as described above.

According to yet another aspect of the present invention, there is provided a storage medium having stored thereon or therein a computer program as described above.

The storage medium may be a computer memory. The storage medium may be a read-only storage medium. Suitable read-only storage media include a CD-ROM or a semiconductor ROM. The storage medium may be a rewritable storage medium. Suitable rewritable storage media include a hard or floppy magnetic disk and a rewritable CD.

According to a yet further aspect of the present invention, there is provided a computer programmed to carry out the method as described above.

It will be understood that the term "computer" is to be construed broadly. The term "a computer" may include several distributed discrete computing devices or components thereof.

In many radio systems, the radio transmission method divides the transmissions into one or more slots, such as a repeating pattern of timeslots in a TDD system, as briefly referred to above in relation to one of the preferred embodiments of the method of formation. Furthermore, a radio node with multiple antennas may be designed such that each timeslot can be used at most once for transmission or reception purposes within the whole node. The preferred formation method discussed further below calculates meshes that are compatible with such constraints by ensuring that each node is required to use no more than the total available number of timeslots.

The preferred method of formation allows a number of goals to be set for it, according to the requirements that an operator wishes to impose on the network. These include:

1. providing the capacity to carry specified levels of traffic required to provide services to or between various nodes in the mesh;

2. providing back-up paths for such traffic so as to avoid interruption of such services in the event of the failure of a mesh link or node; and, 3. restricting the positions of certain nodes within the overall mesh topology.

An example of the third item mentioned above concerns nodes that are to be installed, de-installed or disrupted for maintenance purposes. The preferred formation method allows these nodes to be positioned in the mesh such that traffic to other nodes is not disrupted if these nodes are not operational. Thus, the preferred formation method can be operated to ensure that other traffic can be carried by the mesh before installation, after de-installation or during maintenance.

The meshes that are formed by the preferred method have the following components:

1. a set of radio links, or cabled links, or a combination of radio and cabled links, between nodes;

2. for each of the radio links, the number of timeslots required in each direction; and, 3. a set of traffic paths across the mesh, one or more per service according to the goals set for the formation method.

The process of formation thus addresses the calculation of a mesh that will achieve one or more goals that are set for it.

Providing for Peak Traffic Load

According to another aspect of the present invention, there is provided a method of forming a network of nodes from a plurality of nodes and a plurality of potential transmission links between respective nodes, each node in the formed network being able to communicate with at least one other node by a transmission link between said each node and said at least one other node, wherein at least one of the nodes has a peak traffic rate requirement for traffic to another point in the network and said node has a primary traffic path to said point in the network, the method comprising the steps of:

determining the traffic capacity of said primary path;

identifying other paths, other than said primary path, from said node to said point in the network such that the sum of the traffic capacity of said primary path and the traffic capacity of said other paths is equal to or greater than said peak traffic rate requirement for said node; and, making said other paths available to carry traffic from said node to said point in the network in addition to said primary path;

whereby in the formed network if the traffic rate for traffic from said node to said point in the network exceeds the traffic capacity of said primary path, the traffic can be divided into discrete portions which are respectively delivered over the primary path and said other paths to said point in the network.

This method allows a peak traffic rate to be offered to a subscriber. It will be understood that, in practice, the peak traffic rate can be offered at some times, but that these times will depend entirely on other subscriber traffic levels and on any incidences of failed equipment or links in the network. The preferred method makes use of what is referred to herein as "inverse multiplexing" which is a process in which a single stream of data that must be sent from A to B is divided at A into discrete portions, each portion is transmitted along one of the plural (i.e. primary and other) paths, and the portions are joined together at B to recreate the original stream.

According to another aspect of the present invention, there is provided a method of forming a network of nodes from a plurality of nodes and a plurality of potential transmission links between respective nodes, each node in the formed network being able to communicate with at least one other node by a transmission link between said each node and said at least one other node, wherein at least one of the nodes has a peak traffic rate requirement for traffic to another point in the network and each said node has a primary traffic path plus zero or more other paths to each said point in the network, the method comprising the steps of:

determining the traffic capacity of each said path; and, adding in a prioritised order capacity to links in the network such as provide for the peak traffic requirements at said nodes.

This provides an alternative or additional method for allowing a peak traffic rate to be offered to a subscriber.

Concatenation

According to another aspect of the present invention, there is provided a mesh communications network, the network comprising plural nodes and transmission links between the nodes, and wherein timeslots are allocated to the transmission links for transmission and reception of signals between the nodes over the links, wherein on at least one link at least two consecutive timeslots are allocated for transmission such that user traffic is in use transmitted continuously over more than one timeslot on said at least one link.

As discussed in more detail below, consecutive timeslots can be combined on a wireless transmission link where two or more timeslots are required in the same direction on that link such that additional capacity is provided on that link or such that the number of timeslots required on that link can be reduced.

Preferably, all timeslots have the same duration.

Colouring

"Colouring" is a term used herein to refer to the process of assigning timeslot numbers to each timeslot on a link in the mesh. This term is used herein because of the analogies that can be made with graph theory. It will be recalled that in the preferred implementation of the mesh, time is divided into discrete timeslots that are numbered within a time frame. For example, a wireless transmission on one wireless transmission link from a first node to another node may take place during timeslot 1; a wireless transmission on another wireless transmission link from that first node to a different other node may take place during subsequent timeslot 2; reception of a wireless transmission at the first node from another node may take place during timeslot 3; and so on. In what follows, the term "colours" is used to refer to these timeslot numbers such that different timeslots in a time frame are notionally associated with a different "colour". Given that at any particular node it is desired to avoid having reception from or transmission to other nodes taking place during the same timeslot numbers (i.e. it is preferred that any particular node is only either transmitting to or receiving from one other node only at any time instant), each link to and from the node in this embodiment must have a different timeslot number or "colour". (This assumes that all transmissions and receptions take place at the same carrier frequency. A discussion of the more general case, in which different frequency channels may be used, is given below.) Thus, the problem of allocating timeslots to the links on the nodes is analogous to the known problem of colouring of a graph in graph theory.

Colouring is the subject of copending patent application, U.S. patent application Ser. No. 09/971,622, which is assigned to the assignee of the present application.

In that copending patent application, there is disclosed a method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

assigning timeslot numbers to each timeslot in sequence in ascending order of the number of available choices of timeslot number at each timeslot.

In that copending patent application, there is also disclosed a method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

(a) identifying the node which has the greatest total number of timeslots to be used for transmission or reception of signals;

(b) for the node identified in step (a), assigning a different timeslot number to each of said timeslots at that node;

(c) determining which of the timeslots that have not yet been assigned a timeslot number has the least available choices of timeslot number and assigning a timeslot number to that timeslot so determined; and, (d) repeating step (c) until all timeslots have been assigned a timeslot number.

In step (a) of this aspect, if there are plural nodes having the same total number of timeslots to be used for transmission or reception of signals, then any of those nodes may be selected.

In step (b) of this aspect, the timeslot numbers may be assigned arbitrarily.

In that copending patent application, there is also disclosed a method of assigning timeslot numbers to timeslots used for transmission and reception of signals between nodes in a network of nodes in which each node is able to communicate with at least one other node by a transmission link between said each node and said at least one other node, at least some of the nodes having a respective transmission link to each of plural other nodes, each transmission of a signal over a link from a first node to a second node taking place during a timeslot, the method comprising the steps of:

(a) for each timeslot, setting a variable to have a value that is equal to twice the maximum number of timeslots numbers available;

(b) identifying the node which has the greatest total number of timeslots to be used for transmission or reception of signals;

(c) for the node identified in step (b), assigning a different timeslot number to each of said timeslots at that node;

(d) for each other timeslot sharing a node with the timeslots to which timeslots were assigned in step (c), reducing the value of the variable by a constant for each instance of said sharing of a node;

(e) selecting the timeslot having the smallest value of the variable;

(f) for each other timeslot sharing a node with the timeslot selected in step (e), reducing the value of the variable by a constant for each instance of said sharing of a node;

(g) repeating steps (e) and (f) until all timeslots have been selected; and, (h) in order of the selection made in steps (e) to (g), assigning a timeslot number to each of the timeslots selected in steps (e) to (g).

In step (b) of this aspect, if there are plural nodes having the same total number of timeslots to be used for transmission or reception of signals, then any of those nodes may be selected.

In step (c) of this aspect, the timeslot numbers may be assigned arbitrarily.

In any of these aspects, the timeslot number that is assigned to a timeslot is preferably the first timeslot number which is free at the nodes at both ends of the timeslot.

A timeslot number may be determined to be available taking into account interference that might arise in use on one link as a result of transmission on another link.

When assigning a timeslot number to a timeslot, an attempt to reduce interference effects can be made for example by (i) choosing the least-used timeslot number or (ii) choosing the most-used timeslot number or (iii) choosing the timeslot number which reduces the options for the smallest number of timeslots yet to be assigned timeslot numbers.

The method may comprise the step of assigning a frequency channel to each timeslot at which wireless transmission takes place during the timeslot. This can also be used as a way of reducing inter-node interference. The frequency that is assigned may for example be the frequency that has been least used or the frequency that has been most used.

The frequency channel assigned to the or each timeslot on at least one link may be selected taking into account interference that might in use be caused to or arise from a transmission/reception device that is not a part of said network of nodes during transmission over said at least one link. Thus, the interference effects which might otherwise arise both to and from another ("alien") transmission/reception device can be accounted for before the mesh network is operated, thereby to prevent such interference occurring.

The available frequency channels are preferably ordered in descending order of the number of links from one node to another node for which interference to or from a transmission/reception device that is not a part of said network of nodes during transmissions would be unacceptable, and wherein the frequency channel assigned to the or each timeslot on said at least one link is the first acceptable frequency channel in said order.

The determination of whether or not a frequency channel is acceptable preferably takes into account interference that might in use be caused to or arise from a transmission/reception device that is not a part of said network of nodes during transmissions at the frequency channel.

On at least one link, at least two consecutive timeslots may be allocated for transmission such that user traffic is in use transmitted continuously over more than one timeslot on said at least one link. A timeslot number is preferably assigned to said at least one link before timeslot numbers are assigned to any link not having two consecutive timeslots allocated for transmission.

All timeslots preferably have the same duration.

Adaptation

When a mesh network is operational, in practice it is likely that a new mesh configuration will be required, typically when the goals or parameters set for the mesh are altered. Examples are when a node is to be added to or removed from the network; when the traffic requirements of an existing subscriber change; when an operator of the network decides to add or remove seed or other nodes; when two nodes become no longer visible to each other (perhaps because trees have grown or buildings have been erected between the two nodes); when the current mesh topology becomes sub-optimal or falls below some quality threshold; when a wireless or other transmission link is added or removed between two existing nodes; when a timeslot on a wireless transmission link between two existing nodes is added, removed or reallocated; when main or back-up paths for existing subscriber traffic are reconfigured; and any combination of these events.

In principle, the new mesh configuration could be obtained by effectively forming the new mesh "from scratch", i.e. using a formation method to form the new mesh that meets the new requirements and without any regard to the configuration of the current mesh. The current mesh could then be made inoperative for a period in order for the new mesh to be constructed. However, such an operation would not in general be commercially acceptable owing to the temporary loss of service that would be experienced by the current users. An alternative operation could effectively be by "trial and error" in which the operator would for example try to add a new node in an ad hoc way simply by actually adding the new node and attempting to assign it links and timeslots, etc. and then testing the new mesh to determine whether the new mesh configuration operates successfully. However, such an approach is on average very unlikely to be successful given the interdependence of the nodes on each other across the mesh to obtain successful operation, including especially their link and timeslot assignments, etc.

Thus, in practice, a process is likely to be required to alter one mesh configuration to another mesh configuration in a controlled and predictable way. The term "mesh adaptation" or similar is used herein to refer generally to the process required to alter one mesh configuration to another mesh configuration in this manner. A mesh adaptation should preferably be carried out such that the mesh retains its ability to carry the data traffic of all subscribers throughout the adaptation process.

The problem of mesh adaptation, like that of mesh formation, will normally be a mathematically hard problem given the enormous number of potential links that will exist given a typical set of (unconnected) nodes and the fact that the number of combinations of potential communication links increases much more rapidly than the number of nodes. Moreover, as noted above, not all topologically valid meshes will be suitable for use as a mesh network because of practical problems, such as for example the presence of a limited number of antennas available at each node, data traffic capacity limitations at each node or of the available RF spectrum (including a limitation on the number of timeslots available for transmission and reception), and restrictions on the length of traffic paths between the nodes (measured both in physical lengths of individual links and the number of transit nodes through which data passes from a source node to a target node). In the case of adaptation, the problems are in practice exacerbated by the preferred objective that the adaptation be carried out such that the mesh retains its ability to carry the data traffic of all subscribers throughout the adaptation process.

Thus, according to another aspect of the present invention, there is provided a method of adapting an initial mesh communications network configuration to a final mesh communications network communications configuration, wherein:

the initial mesh communications network configuration comprises a first set of nodes, transmission links between the nodes, timeslot allocations to the transmission links and traffic paths across the mesh;

the final mesh communications network configuration comprises a second set of nodes, transmission links between the nodes, timeslot allocations to the transmission links and traffic paths across the mesh;

the first set of nodes, transmission links between the nodes, timeslot allocations to the transmission links and traffic paths across the mesh being different to the second set of nodes, transmission links between the nodes, timeslot allocations to the transmission links and traffic paths across the mesh; and, wherein there exists a method of forming a mesh communications network configuration from a set of nodes and potential transmission links between the nodes and which allocates timeslots to the transmission links;

the method comprising the step of forming at least a part of the final mesh communications network configuration by operating the method of forming a mesh either or both (i) on the basis of a restricted set of the potential transmission links between the nodes of the second set thus constraining the results produced by the mesh formation such that the initial mesh configuration can be adapted to the final mesh configuration and (ii) by adding one or more additional steps or tests to the method of forming a mesh that constrain the results produced by the mesh formation such that the initial mesh configuration can be adapted to the final mesh configuration.

The first set may differ from the second set in terms of one or more of the nodes (i.e. whether they are present or not), the transmission links between the nodes, timeslot allocations to the transmission links and traffic paths across the mesh. The first set may additionally or alternatively differ from the second set in terms of other factors, including for example the goals that they are required to achieve, examples of such goals being given above.

In an embodiment, the initial mesh communications network configuration has an initial primary topology being a non-redundant set of paths from every node of the first set to a connection node of the first set, and the final mesh communications network configuration has a final primary topology being a non-redundant set of paths from every node of the second set to a connection node of the second set, and wherein there is at least one new node in the final mesh communications network configuration that is not in the initial mesh communications network configuration, the step of forming at least part of the final mesh communications network configuration preferably comprising operating the method of forming a mesh on a restricted set of the potential transmission links between the nodes of the second set to produce a final primary topology which is the same as the initial primary topology plus at least one transmission link to the or each new node and in which the or each new node is configured as a node which is at the end of a primary path and which is not configured to be a transit node within the final primary topology for traffic intended for other nodes. Thus, in this embodiment, no changes are made to the existing primary topology and hence no changes are made to the existing primary traffic paths of existing traffic services; no transmission links are used in the new mesh that were not included in the current mesh, except for transmission links where at least one end of each link is at a new node. Thus, each new node is configured as a "leaf". This embodiment encompasses the adaptation methods referred to herein as "provisioning".

Said restricted set of the potential transmission links between the nodes of the second set may be the combination of all primary topology transmission links in the initial mesh communications network configuration plus all potential transmission links between the or each new node and a node in the initial mesh network configuration, whereby the final primary topology is the same as the initial primary topology plus at least one transmission link to the or each new node. This embodiment provides one way of ensuring that the final primary topology is the same as the initial primary topology plus at least one transmission link to the or each new node, as required for the class of adaptation referred to herein as "provisioning". In general, provisioning requires the least changes to be made to the mesh and is therefore the easiest to achieve and in general should be tried first although, on average, it is the method that is least likely to succeed.

In an embodiment, the initial mesh communications network configuration has an initial primary topology being a non-redundant set of paths from every node of the first set to a connection node of the first set, and the step of forming the final mesh communications network configuration being constrained to prevent a primary path being added that adds a timeslot to any transmission link in the initial primary topology or requires a timeslot to be removed from any transmission link. This corresponds to what, in the preferred embodiment, is referred to herein as "strict provisioning" in which the entire current mesh, without any modifications to it, forms a part of the new mesh. No changes to the current mesh need to be made which affect existing mesh links or paths for existing services. The only changes to the mesh required in a practical implementation consist of adding or removing nodes, links to them, and services and traffic paths to them as a part of an installation/deinstallation procedure.

In another embodiment, the initial mesh communications network configuration has an initial primary topology being a non-redundant set of paths from every node of the first set to a connection node of the first set, wherein in the step of forming the final mesh communications network configuration, one or more timeslots are added to links in the initial primary topology. This corresponds to what, in the preferred embodiment, is referred to herein as "additive provisioning". In the preferred embodiment, timeslots are added to existing links provided that this can be done without changing the configurations of timeslots already in use on any of the links in the current mesh.

In another embodiment, the initial mesh communications network configuration has an initial primary topology being a non-redundant set of paths from every node of the first set to a connection node of the first set, wherein the step of forming the final mesh communications network configuration includes the step of removing one or more links which are in the initial mesh communications network configuration and which are not in the initial primary topology. This corresponds to what, in the preferred embodiment, is referred to herein as "subtractive provisioning" in which "resilience links" (i.e. those not in the primary topology and which are used to provide for alternative, back-up paths for traffic as discussed further below) may be removed as required in order to make way for a new link in the primary topology.

In another embodiment, the initial mesh communications network configuration has an initial primary topology being a non-redundant set of paths from every node of the first set to a connection node of the first set, and the final mesh communications network configuration has a final primary topology being a non-redundant set of paths from every node of the second set to a connection node of the second set, and wherein there may be at least one new node in the final mesh communications network configuration which is not in the initial mesh communications network configuration, and in the step of forming at least part of the final mesh communications network configuration, said restricted set of the potential transmission links between the nodes of the second set is preferably all transmission links in the initial mesh network configuration plus, where there is at least one new node in the final mesh communications network configuration that is not in the initial mesh communications network configuration, all potential transmission links between the or each new node and a node in the initial mesh communications network configuration. This embodiment corresponds to the class of adaptation referred to herein as "redistribution". In the preferred implementation of these methods, no transmission links are used in the new mesh that were not included in the current mesh, except, where there is at least one new node in the final mesh communications network configuration that is not in the initial mesh communications network configuration, for transmission links where at least one end of each link is at a new node. However, no other restrictions are imposed, so that the new primary topology can use any existing links in the mesh. Links from the current mesh may not necessarily appear in the new mesh. These methods can be used for example where one or more new nodes are to be installed into an existing mesh. These methods are also suitable as a way to adjust the primary topology so that specified nodes become leaves or where the overall parameters of the mesh require to be adjusted.

Preferably, the change from the initial mesh communications network configuration to the final mesh communications network configuration is made as a single triggered step.

According to another aspect of the present invention, there is provided a method of adapting an initial mesh communications network configuration to a final mesh communications network communications configuration, wherein:

the initial mesh communications network configuration comprises a first set of nodes, transmission links between the nodes, timeslot allocations to the transmission links, and traffic paths across the mesh;

the final mesh communications network configuration comprises a second set of nodes, transmission links between the nodes, timeslot allocations to the transmission links, and traffic paths across the mesh;

the first set of nodes, transmission links between the nodes, timeslot allocations to the transmission links and traffic paths across the mesh being different to the second set of nodes, transmission links between the nodes, timeslot allocations to the transmission links and traffic paths across the mesh;

the initial mesh communications network configuration having an initial primary topology being a non-redundant set of paths from every node of the first set to a connection node of the first set, and the final mesh communications network configuration having a final primary topology being a non-redundant set of paths from every node of the second set to a connection node of the second set;

wherein there exists a method of forming a primary topology for a mesh communications network configuration from a set of nodes and potential transmission links between the nodes and which allocates timeslots to the transmission links;

the method comprising the step of operating the method of forming a mesh to form the final primary topology such that it can co-exist with the initial primary topology, whereby the initial mesh configuration can be adapted to the final mesh configuration.

This aspect of the present invention corresponds to the class of adaptation referred to herein as "methods of coexisting primaries". In the preferred implementation of these methods, a new mesh is produced in which new transmission links are added between existing nodes. Thus, in these methods, some antenna movements are typically required within the existing mesh. These methods preferably constrain the formation process to produce a new mesh such that only one or two groups of antenna movements are required and such that the change steps involve operating only one intermediate mesh. The methods attempt to find a new mesh such that all antennas required for the old primary topology and the new primary topology can be allocated at the same time. Hence, the antenna positions required for the primary topology of the new mesh can be achieved without prejudice to the ability of the current primary topology to carry all committed traffic across the mesh.

Preferably, in the method of forming the final primary topology, a path is determined to be unacceptable if at any node on the path, the number of potential transmission links that would be used for the path and that were not links in the initial primary topology exceeds the number of new links that the node can support in the final topology as calculated on the basis of the number of timeslots and antennas at the node left free while operating the links of the initial primary topology.

According to a further aspect of the present invention, there is provided a method of adapting an initial mesh communications network configuration to a final mesh communications network communications configuration, wherein:

the initial mesh communications network configuration comprises a first set of nodes, transmission links between the nodes, timeslot allocations to the transmission links, and traffic paths across the mesh;

the final mesh communications network configuration comprises a second set of nodes, transmission links between the nodes, timeslot allocations to the transmission links, and traffic paths across the mesh;

the first set of nodes, transmission links between the nodes, timeslot allocations to the transmission links and traffic paths across the mesh being different to the second set of nodes, transmission links between the nodes, timeslot allocations to the transmission links and traffic paths across the mesh;

the initial mesh communications network configuration having an initial primary topology being a non-redundant set of paths from every node of the first set to a connection node of the first set, and the final mesh communications network configuration having a final primary topology being a non-redundant set of paths from every node of the second set to a connection node of the second set;

wherein there exists a method of forming a primary topology for a mesh communications network configuration from a set of nodes and potential transmission links between the nodes and which allocates timeslots to the transmission links;

the method comprising the steps of:

(A) operating the method of forming a mesh to form an intermediate primary topology such that it can co-exist with the initial primary topology, (B) operating the method of forming a mesh to form a further intermediate primary topology which can co-exist with the previous intermediate topology, (C) repeating step (B) until the further intermediate primary topology can co-exist with the final primary topology, whereby the initial mesh configuration can be adapted to the final mesh configuration via a sequence of co-existing primary topologies.

This aspect of the present invention corresponds to what is referred to herein as "repeated overlapping primaries". In general, this is the most likely method to succeed of the methods of adaptation described herein though it is likely to require the most changes, and is therefore the most disruptive, and is the most computationally intensive.

In an embodiment, the adaptation process is preceded by use of the formation process to produce a target mesh that achieves its goals. The adaptation process then starts from either the target or the current mesh and then applies a modified version of the formation process, where the modifications are such as to calculate one or more intermediate meshes. A corresponding number of change steps can then be carried out in practice to transform the current mesh to the target mesh. It will be understood that the calculation of the intermediate mesh(es) can be carried out starting from either the current mesh or the target mesh because the or each intermediate mesh must have a primary topology that can co-exist with the primary topology of its adjacent meshes in the change sequence.

Most preferably, in the methods of adaptation referred to above, said method of formation is a method as described in general terms above and in greater detail below. The actual embodiment of the method of formation that is required to be used in any particular method of adaptation will depend on the requirements for the adaptation process itself and on the nature of the initial and final mesh communications network configurations. Thus, the actual method of formation used in practice in a method of adaptation may use one or more of the variants to the method of formation discussed in detail herein.

In summary therefore, in accordance generally with these aspects of the present invention, a method of adaptation can in principle make use of any method that is used to form a mesh of the type described above, with that formation method being appropriately constrained when used as part of the adaptation method. Preferably, the formation method of which the adaptation method makes use provides the capabilities described above, namely: 1. providing the capacity to carry specified levels of traffic required to provide services to or between various nodes in the mesh; 2. providing back-up paths for such traffic so as to avoid interruption of such services in the event of the failure of a mesh link or node; and, 3. restricting the positions of certain nodes within the overall mesh topology.

Thus, in general terms, a preferred embodiment of this aspect of the present invention provides a method of adaptation in which a formation method is modified to produce a mesh that not only meets its new goals but that also can be reached in a sequence of one or more change steps from the currently operating mesh and such that, at each change step in the sequence, the mesh retains its ability to carry the data traffic of all subscribers throughout the adaptation process. A new mesh is thus produced by the adaptation process which meets the goals set for it and which can be reached in a sequence of one or more change steps from the currently operating mesh.

Preferably, the modifications applied to the formation method fall into one or both of the following categories:

1. the set of links from which the formation process is permitted to choose various components of the new mesh is restricted at one or more stages of the formation process, the restricted set(s) being chosen such as to ensure that the new mesh can be reached in a sequence of one or more change steps from the currently operating mesh; and, 2. one or more additional restrictions or tests are added at one or more stages of the formation process, the result of such restrictions or tests being to ensure that the new mesh can be reached in a sequence of one or more change steps from the currently operating mesh.

It will be understood that where the adaptation process requires restriction of the set of links from which the formation process is permitted to choose various components of the new mesh, then different restricted sets may be used at different stages of the formation process.

There are many adaptation methods consisting of different sets of modifications that can be applied to a formation process in order to produce a valid change step sequence for adaptation. In other words, in general, plural differing sequences of changes will be viable in order to adapt from an initial mesh configuration to a final mesh configuration, and those different sequences of changes can be obtained by applying different sets of modifications to a formation process. The sequences of changes making up the adaptation processes will differ in a number of ways. Some of the important characteristics of an adaptation sequence in a practical implementation will include:

1. the set of change steps that are assumed to be possible. The set of change steps that are possible depends on the specification of the networking equipment from which the mesh is constructed. This specification can be chosen in such a way as to give rise to particular methods. Elements of specification that are preferably provided in combination with the adaptation methods described herein are set out below.

2. the number of change steps that are produced.

3. the time required to carry out each change step.

4. the characteristics of the mesh during these steps.

5. the characteristics of the final mesh.

6. the set of possible failures in the networking equipment that might prevent the sequence from being carried out correctly and the probability of these failure occurring. An example of a failure that may prevent an adaptation sequence being carried out correctly would be the failure of a remotely controlled steerable antenna to move to a new required position. An adaptation method would be vulnerable to such a failure only if it required repositioning of one or more antennas.

These above mentioned factors will affect the reliability of operation of the mesh during and after adaptation and hence the overall reliability of the network. For example, the characteristics of the mesh during an intermediate step might include a much lower level of back-up capability than is the case of the initial or final mesh. An equipment or radio link failure at that step would therefore carry a high risk of service disruption. Since the final meshes produced by different methods may also vary in their levels of back-up capability, the long term ability of the mesh to minimise service disruption also depends on the method used. There are many other characteristics that will vary between the meshes produced by different methods, such as their ability to handle peak traffic loads.

7. the probability that an adaptation sequence exists according to the method. Each adaptation method potentially applies different constraints on the choices available to the mesh formation process and thus affects the probability that a solution can be produced by the method.

For each method, the resulting adaptation sequence can be evaluated against one or more of the above criteria. By combining this with the operational requirements of a specific network, the most appropriate method can be selected.

A common operational requirement is that each adaptation is carried out such as to minimise the risk that the steps will fail to complete correctly. For example, if antenna repositioning were found to be a particularly unreliable process, then a method with the smallest number of repositioning operations might be preferred.

The different examples of the adaptation methods described herein in general differ in the probability that they will produce a successful adaptation sequence. In the preferred implementation, these methods can be ordered in an ordering such that as this probability increases, both the complexity and the length of the adaptation sequence increases and also the time required to calculate a valid sequence increases. Therefore, in one preferred implementation, the adaptation sequence is calculated by trying the methods in ascending order of probability that they produce a solution (i.e. trying first the method that is least likely to succeed) and/or the complexity of the adaptation method, until one method produces a solution.

Accordingly, in accordance with another aspect of the present invention, there is provided a method of adapting an initial mesh communications network configuration to a final mesh communications network communications configuration, wherein:

the initial mesh communications network configuration comprises a first set of nodes, transmission links between the nodes, timeslot allocations to the transmission links and traffic paths across the mesh;

the final mesh communications network configuration comprises a second set of nodes, transmission links between the nodes, timeslot allocations to the transmission links and traffic paths across the mesh;

the first set of nodes, transmission links between the nodes, timeslot allocations to the transmission links and traffic paths across the mesh being different to the second set of nodes, transmission links between the nodes, timeslot allocations to the transmission links and traffic paths across the mesh; and, wherein there exists a set of adaptation techniques available for adapting the initial mesh communications network configuration to the final mesh communications network communications configuration which can be ordered in ascending order of likelihood of success of the adaptation and/or complexity of execution;

the method comprising the step of applying said set of adaptation techniques in said ascending order until one of said techniques is successful in adapting the initial mesh communications network configuration to the final mesh communications network communications configuration.

Preload and Trigger Functions

Preferably, at least some of the changes to the initial mesh communications network configuration that are required as part of the adaptation to the final mesh communications network configuration form a group of changes such that all of the changes within the group can occur substantially simul taneously, the method comprising the step of executing a group of such changes by:

transmitting relevant information about the changes in the group to each node that during the adaptation will take part in any of the changes of said group; and, subsequently transmitting an instruction to each said node to carry out said changes of said group, thereby to cause each said node to effect said changes of said group substantially simultaneously.

In another aspect of the present invention, there is provided a method of adapting an initial mesh communications network configuration to a final mesh communications network communications configuration, wherein:

the initial mesh communications network configuration comprises a first set of nodes, transmission links between the nodes, timeslot allocations to the transmission links, and traffic paths across the mesh;

the final mesh communications network configuration comprises a second set of nodes, transmission links between the nodes, timeslot allocations to the transmission links, and traffic paths across the mesh;

the first set of nodes, transmission links between the nodes, timeslot allocations to the transmission links and traffic paths across the mesh being different to the second set of nodes, transmission links between the nodes, timeslot allocations to the transmission links and traffic paths across the mesh;

wherein at least some of the changes to the initial mesh communications network configuration that are required as part of the adaptation to the final mesh communications network configuration form a group of changes such that all of the changes within the group can occur substantially simultaneously, the method comprising the step of executing a group of such changes by:

transmitting relevant information about the changes in the group to each node that during the adaptation will take part in any of the changes of said group; and, subsequently transmitting an instruction to each said node to carry out said changes of said group, thereby to cause each said node to effect said changes of said group substantially simultaneously.

Preferably, where there are plural groups of said changes, the information transmitting step comprises the step of transmitting relevant information about the changes of all groups to each node which during the adaptation will take part in any of the changes.

Preferably, the method comprises the step of, after a predetermined time following the instruction transmitting step, interrogating each said node to determine if the change has occurred successfully.

As will be discussed further below, an adaptation from an initial mesh configuration to a final mesh configuration is preferably carried out as one or more change steps. Plural networking equipment devices can preferably carry out plural such operations simultaneously. The time taken to carry out such steps will typically affect the overall reliability of the network. It is thus in general beneficial to carry out an adaptation using a small number of steps, to minimise the time taken for each step and to maximise the probability that each step is commanded successfully. As discussed above, the commanding of change steps is preferably carried out by a "preload and trigger" sequence, a specific example of which is described in detail below.

Management Connectivity

In order to operate the mesh in practice, there will normally be connectivity between each of the mesh nodes and one or more management systems. In general, this connectivity is required in order that the state of the network can be monitored from one or more control centres. In general, such connectivity would also be used in order to configure and reconfigure the nodes. In the context of adaptation discussed above, this connectivity can be used to send adaptation instructions from the mesh change controller to the nodes and to monitor the success of each adaptation change step. It is highly desirable that the management connectivity be able to make use of any possible path from the control centre to any node: for example, provided there is management connectivity, this can be used to restore non-management or user traffic connectivity. Maximum possible management connectivity is important when a series of adaptation steps is being carried out. This allows faults that occur during an adaptation to be detected and corrective actions to be caused to take place at the relevant nodes. However, the duration of an adaptation is a difficult period in which to ensure continued management connectivity, due to the changes to the network topology that are occurring.

According to another aspect of the present invention, there is provided a mesh communications network, the network comprising plural nodes and transmission links between the nodes arranged in a network topology, at least some of the nodes being linked to plural other nodes via transmission links, each of said at least some nodes having a routing table for routing signals across the network by specifying the link along which signals from the node to another node are to be sent and being capable of updating the routing table according to the status of links in the network, each of said at least some nodes being arranged such that for certain predetermined changes to the network topology the updated routing table is not applied immediately for routing signals across the network.

Preferably, each of said at least some nodes is adapted to enter into a split table mode for said certain predetermined changes to the network topology by which the routing table that was in use prior to said certain predetermined changes to the network topology taking place continues to be used for routing signals across the network whilst a separate updated routing table is calculated and stored separately, the updated routing table being used to route signals across the network after split table mode is exited.

Said certain predetermined changes may include one or more failure or restoration or creation of a link or modification of the desirability of a link. In this context, "desirability" can be related to what is referred to in the description below as the "cost" of a link.

According to another aspect of the present invention, there is provided a method of measuring the behaviour of a proposed mesh communications network whilst operating an existing mesh communications network, wherein:

the proposed mesh communications network comprises a proposed network of nodes in which each node is able to communicate with at least one other node by a wireless transmission link between said each node and said at least one other node, each transmission of a signal over a link from a first node to a second node taking place during a timeslot; and wherein:

the existing mesh communications network comprises an existing network of nodes in which each node is able to communicate with at least one other node by a wireless transmission link between said each node and said at least one other node, each transmission of a signal over a link from a first node to a second node taking place during a timeslot;

the method comprising the steps of:

using one or more auxiliary timeslots within the existing mesh communications network to emulate the wireless transmission environment of one or more proposed transmission configurations over the links that will exist in the proposed mesh communications network.

This method may be used for example during installation of a new node to verify that it will operate compatibly with the existing mesh. As another example, when a change to a new link and colouring arrangement is about to happen, then the auxiliary timeslots can be used to verify that this new arrangement is compatible across the mesh, while still operating the previous link and colouring arrangement. The new arrangement can be tested out for each normal timeslot in turn.

Embodiments of the present invention will now be described by way of example with reference to the accompanying drawings, in which:

FIG. 1 shows schematically an example of a network provided by a mesh of interconnected nodes and which is connected to a trunk;

FIGS. 2A and 2B together show a schematic flow diagram for an example of a formation method according to the present invention;

MESH NETWORKS

Figure 1:
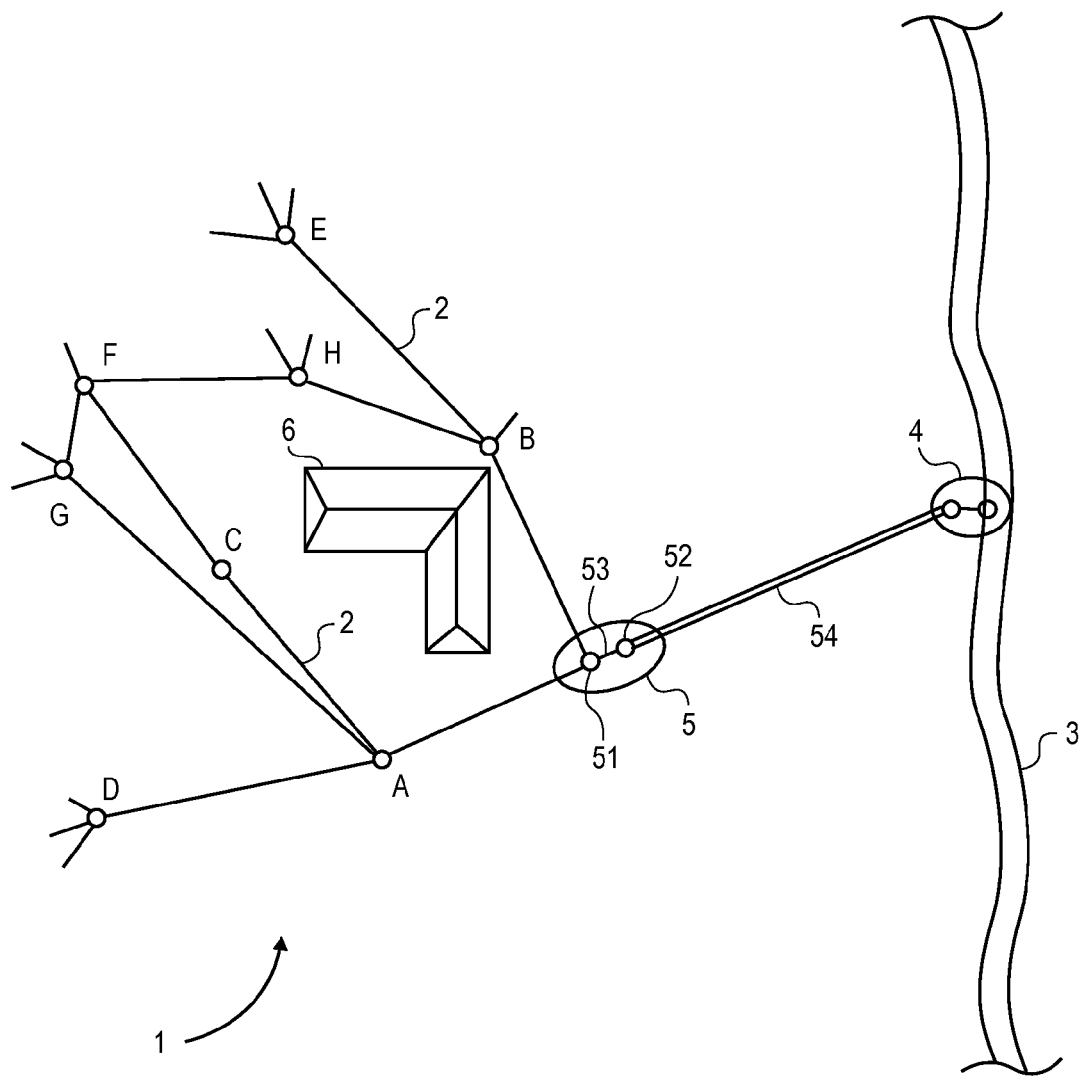

Referring first to FIG. 1 of the drawings, a communications network 1 has plural nodes A-H (only eight being shown in FIG. 1) which are logically connected to each other by respective point-to-point data transmission links 2 between pairs of nodes A-H in order to provide a mesh of interconnected nodes. The links 2 between the nodes A-H are provided by substantially unidirectional (i.e. highly directional) radio transmissions, i.e. signals are not broadcast but are instead directed to a particular node, with signals being capable of being passed in both directions along the link 2. The transmission frequency will typically be at least 1 GHz. Each node A-H has plural antennas which provide for the potential point-to-point transmission links to other nodes. In a typical example, each node A-H has four antennas and so can be connected to up to four or more other nodes.

In the example shown schematically in FIG. 1, the mesh 1 of interconnected nodes A-H is connected to a trunk 3. The point at which data traffic passes from the trunk 3 is referred to herein as a trunk network connection point ("TNCP") 4. As mentioned above, it will be understood that this term is to be construed broadly as a connection point to any external network and is not limited to connection to a conventional trunk network. The connection between the TNCP 4 and the mesh network 1 will typically be via a mesh insertion point ("MIP") 5. The MIP 5 will typically consist of a standard node 51 which has the same physical construction as the nodes A-H of the mesh network 1 and which is connected to a specially adapted node 52 via a feeder link 53. The specially adapted node 52 provides for a high data transfer rate connection via suitable (radio) links 54 to the TNCP 4 which, in turn, has suitable equipment for transmitting and receiving at these high data transfer rates. In one example, there will be one MIP 5 and one TNCP 4. In other examples, there will be at least two MIPs 5 and two TNCPs 4 and there is likely to be several MIPs 5 providing several connections to the trunk 3 (or to plural trunks) via respective TNCPs 4. The or each TNCP 4 may be connected to more than one MIP 5.

Typically, the location of the TNCPs 4 will be strongly determined by the route followed by the cables which form the existing trunk 3. The position of the MIPs 5 will typically be chosen by an operator of the mesh network 1 taking into account a number of factors including the location of available TNCPs 4 and the location of the nodes A-H of the mesh network 1. As mentioned above, the operator of the mesh network 1 may initially deploy a set of strategic or "seed" nodes in order to establish a seed network prior to offering network services to potential subscribers in order to ensure that a large number of potential subscribers can be connected to the mesh network 1 immediately on demand. It will be appreciated that the position and location of the nodes A-H (whether subscriber nodes or seed nodes) is strongly determined by the availability of suitable sites for positioning the equipment. Subscriber nodes will normally be positioned on or in close proximity to the relevant subscriber's building.

Once the physical location and position of the nodes A-H has been established, as will be understood and as can be seen from FIG. 1, the lines-of-sight between the nodes A-H can be determined. In other words, it can be determined which nodes are "visible" to which other nodes (in the sense described above, i.e. two nodes which are "visible" to or in "line-of-sight" with each other can communicate with each other wirelessly at the frequency or frequencies used in the mesh network 1). The determination of which nodes are actually visible to each other can be made in a number of ways, for example by actual physical inspections and testing at the relevant node sites or by use of appropriate surveys or a combination of both. It will be found in practice that some nodes are not visible to each other. For example, in FIG. 1, whilst node A is visible to each of nodes C, D, F and G, node A is not visible to nodes B, E or H because a tall building 6 obscures transmissions between nodes A and B and between nodes A and E and between nodes A and H. In addition, the question of which nodes are visible to which other nodes varies over time as buildings are erected or demolished, as trees grow or are felled, etc.

II. Mesh Formation

II.1. Introduction

Having established a set of nodes in which each node is in principle visible to at least one other node, it is necessary to select from all possible lines-of-sight between the nodes those which are most suitable for use as actual wireless transmission links between the nodes in the mesh network 1. As mentioned above, this process is referred to herein as "formation of a mesh" or similar. As will be appreciated, for any reasonable number of nodes, there will be a large number of lines-of-sight or potential transmission links between the nodes and an enormous number of possible combinations of subsets of those potential transmission links.

Thus, having established a set of nodes (which may be all seed nodes or all subscriber nodes or a mixture) and at least one MIP, and the set of available lines-of-sight (i.e. potential links) between all nodes and the or each MIP, it is then necessary to select which of those lines-of-sight should actually be used as wireless transmission links. During this process, there are a number of factors which the operator can take into account when determining which of the available lines-of-sight should be used as links. These will include the total available data capacity of the mesh network; the resilience of the network to failure of a single node; the ratio of subscriber to other nodes; the efficiency of use of the radio bandwidth; the ease of management of the mesh network; the scalability (i.e. the ability to grow without fundamental reconfiguration) of the network; and the impact of adding or removing individual nodes. All of these factors can be taken into account when forming the mesh network of interconnected nodes. However, the most important factors will normally be related to the data traffic carrying capacity of the mesh network.

The detailed description of a specific example of a method for forming the mesh network 1 which follows is intended to minimise the number of link timeslots that must be allocated across the whole mesh network in order to carry the committed traffic load, this being achieved by trying to minimise the product "bandwidth.hops" or the product "bandwidth.distance" across the mesh network 1 as it is believed that this is an effective way of forming a mesh that meets all traffic requirements. Put very simply, this is achieved by linking the largest traffic users to the mesh network first, by the shortest available path.

For various reasons, including the desirability of providing a facility whereby actual signal or interference measurements can be made, it is preferred to carry all committed traffic load while reserving at least one free antenna at each node. Interference may include "direct" interference, caused by transmissions from one node to another being received directly at a third node, and "indirect" interference, caused by for example reflection and scattering of transmitted signals or interference from sources outside the mesh. Furthermore, having a free antenna enables verification that each line-of-sight proposed for use in the preferred adaptation steps discussed further below is viable for use as a radio link. Having a free antenna also enables or at least simplifies verification that a link will operate correctly after an adaptation sequence has been effected. Furthermore, a free antenna enables adaptation of a mesh without interruption to traffic flows.

It will be understood that the methods described herein will typically be carried out by appropriate software running on appropriate computer equipment and will typically use variables and variable labels or flags as is known generally in the computer art to represent the nodes, the lines of sight and links, and attributes given to the nodes. Typically, therefore, where reference is made herein for example to a "node" and to it being "labelled", it will be understood that this means or can be taken to mean that a computer program variable (including an "object" in the sense of object-oriented programming or the like) representing the node is given an attribute or is otherwise "flagged". Computer-based databases and/or appropriate data structures will typically be used to store and organise the data.

In the example method that is described in detail below, the method preferably looks ahead at each stage for nodes that have only one viable path to a MIP and builds these nodes into the mesh network earlier than their bandwidth usage would otherwise dictate, in order that no nodes are inadvertently made unconnectable to the mesh.

Figure 2A:
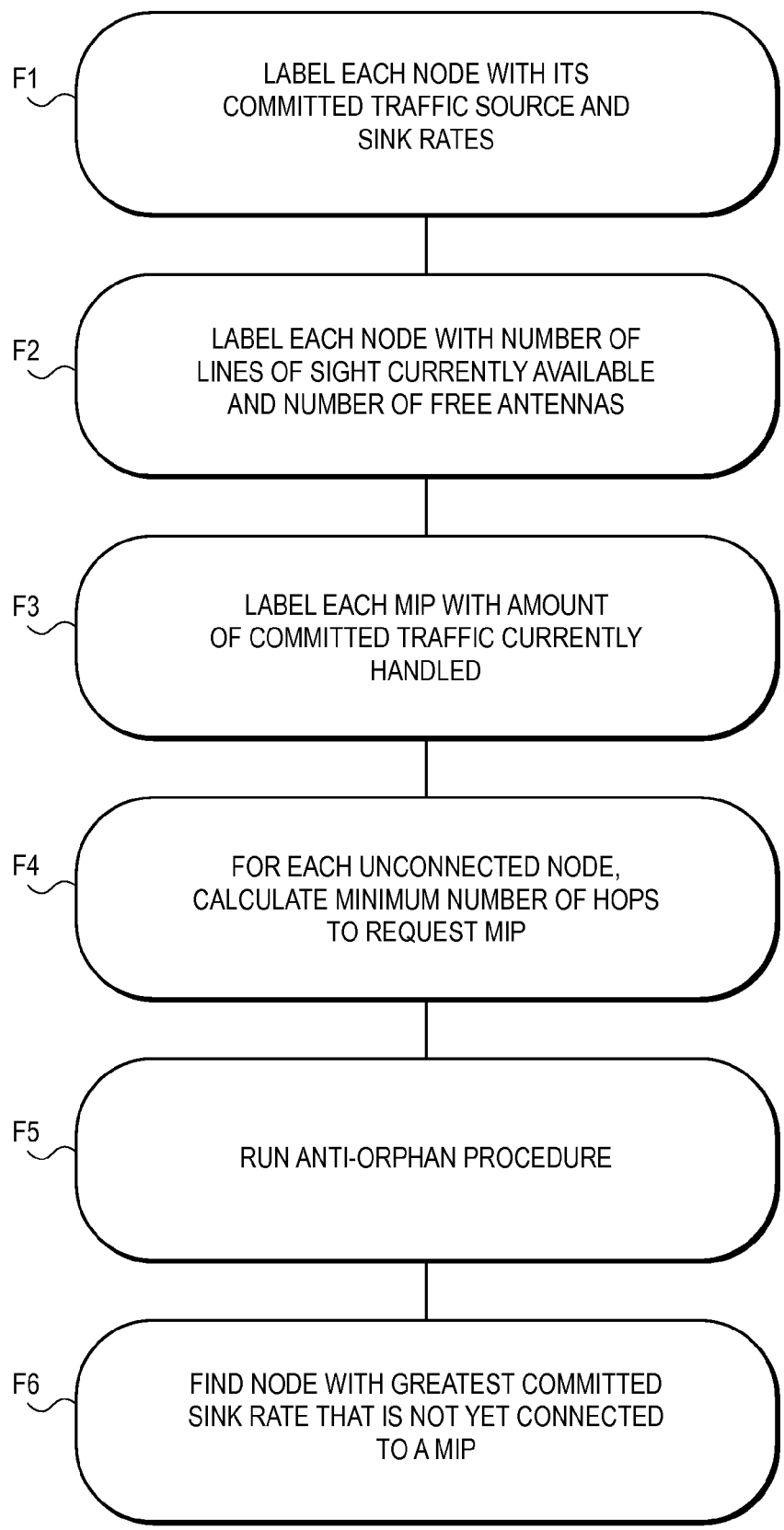
Figure 2B:
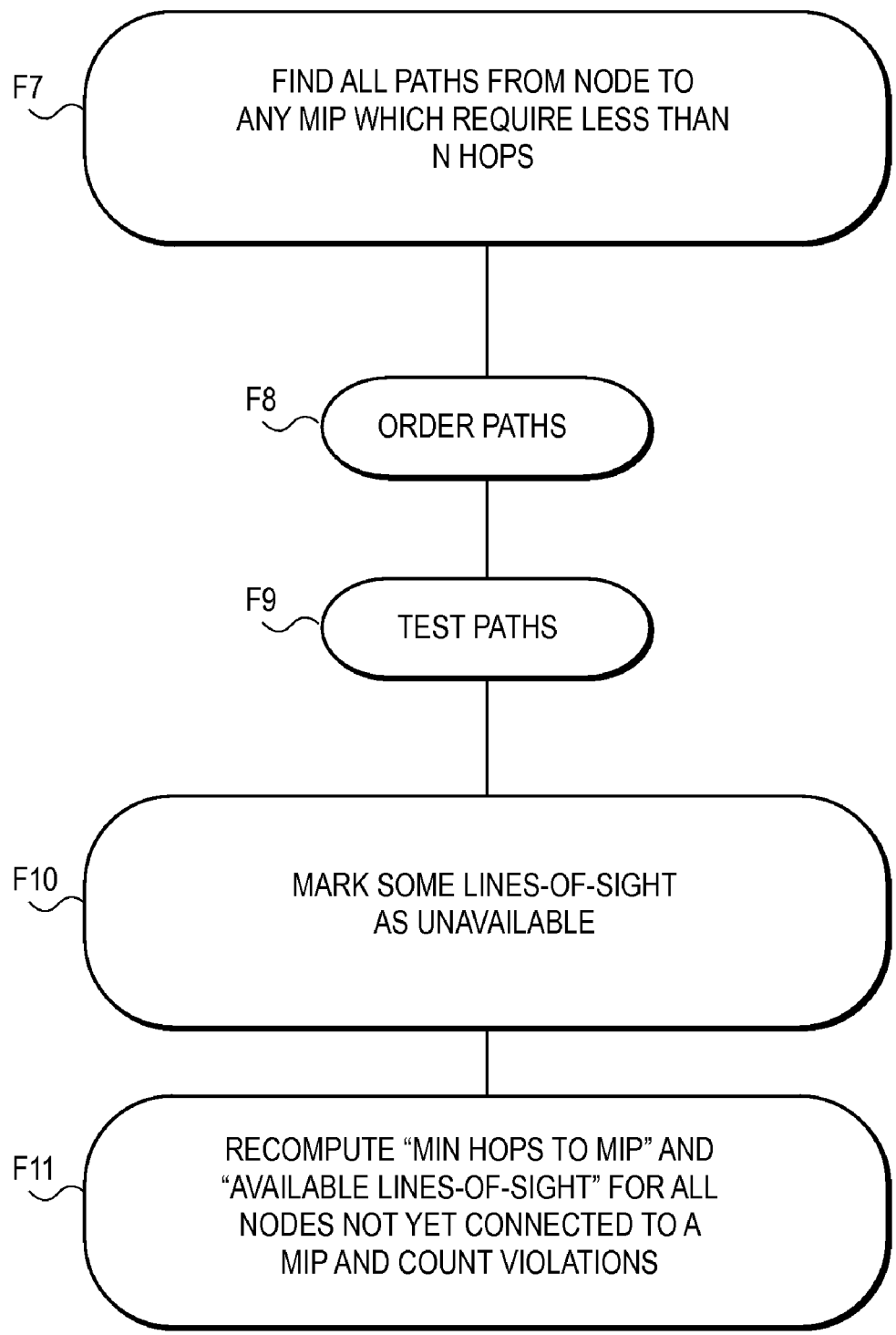

FIG. 2 shows schematically a partial flow diagram for an example of a method according to an aspect of the present invention. As will be appreciated from the following description, the method may have several branches and loops which are not shown in FIG. 2 for reasons of clarity. Also, many of the steps may be applied repeatedly. For example, one invocation of the "anti-orphan" procedure discussed in detail below may cause a second invocation of that procedure to be desirable as the first invocation to locate orphans and integrate them into the mesh may itself cause other nodes (individually or in groups) themselves to be orphaned.

In the preferred embodiment described in detail below, first, some initialisation steps are carried out. Then a set of non-redundant paths linking every node to a MIP is constructed to provide what is referred to herein as the "primary topology". (A set of non-redundant paths is one in which there is only one path from each node to a MIP, i.e. there are no "redundant" paths.) As part of this, a so-called "anti-orphan" procedure is carried out and repeated at certain stages. Each path from a node to a MIP in the primary topology is referred to herein as a primary path. For the purposes of providing network-wide resilience, these paths are also considered as extending from the node to a MIP and then through to the core network to which the mesh is connected.

Next, redundant paths are added as far as possible so that as many nodes as possible have completely independent paths to the core network in order to provide for resilience (in the sense that back-up paths are available in the event of the failure of any component in the primary path) and to provide for diversity (such that for example a large amount of data from one node can be divided into smaller amounts sent over different paths).

As mentioned, the "primary topology" is a non-redundant set of paths from every node to a MIP. In the most preferred embodiment, a primary topology has adequate timeslots to carry all the committed traffic and no path in the primary topology between a node and a MIP exceeds the maximum allowed hop count for that node, and furthermore the primary topology leaves at least one antenna free on each node. In the preferred embodiment, the redundant paths that are then added to the primary topology can be grouped into one of two or more sets. The first diversity set is an additional set of paths provided for diverse routing/back-up; the primary topology plus the first diversity set leaves at least one antenna free on each node. The second diversity set is a further set of paths provided for diverse routing/back-up and uses the last antenna on at least one node for each path. Further diversity sets may be added that provide partially diverse paths to some nodes or to serve other purposes.

II.2. Initialisation

Referring now to FIG. 2, in step F1, every node is labelled with its committed traffic sink and source rates. The "committed" traffic rate is the minimum data traffic rate which the network operator agrees to provide for that node. It will be understood that for some types of service peak rates will typically be (much) higher than the committed rate. In step F1, the committed traffic sink and source rate for any seed node is set at zero.

In step F2, every node is labelled with the number of lines-of-sight currently available from the node. Every node is also labelled with the number of free antennas. For the case of a node that is about to be either installed or de-installed (which implies that mesh formation must be possible both before and after installation/de-installation), such node is marked as having only one antenna available for use in the primary topology. Where desirable, other nodes may be marked to indicate that they should be a "leaf" in the primary topology, that is, to be configured as a node which is at the end of a primary path and which is not configured to be a transit node within the primary topology for traffic intended for other nodes. Such a configuration may be desirable from an operator point of view for a new node or for a node that is unreliable.

In step F3, the or each MIP is labelled with the amount of committed traffic currently handled by that MIP. This initially has a value of zero for all MIPs.

In step F4, for each node, the minimum number of "hops" (i.e. link traversals) between it and the MIP (if there is only one MIP) or the nearest MIP (if there is more than one MIP) using any available lines-of-sight is calculated. This can be achieved in a number of ways. In one example, all nodes are first labelled with infinity hops; all nodes that have an available line-of-sight to a MIP are then labelled as requiring one hop; all nodes currently at infinity and which have a line-of-sight to a 1-hop node are then labelled as requiring two hops; this process being repeated until no nodes have infinity hops. It will be appreciated that if this sequence does not complete, i.e. there are nodes which still have infinity hops none of which could be connected by another iteration of this process, then there are nodes which cannot be connected to a MIP. At that point, the operator may decide for example to provide a further seed node in order to allow such nodes to be connected to a MIP.

For each node, the maximum acceptable number of hops between it and the connection node to which it will have a path in the primary topology is now flagged at that node. An example of a reason for setting a maximum acceptable number of hops for a node is that some data transfer services are delay-critical. This includes for example services for voice transmission or real-time video. Such delay-critical traffic may mean that a path between a MIP and a particular node will not be suitable to carry such traffic if it exceeds a certain hop count owing to the finite time delays experienced in any actual traversal of a link by the data. The maximum hop counts acceptable for different delay-critical services may furthermore vary for different nodes within the mesh according to which services for the different nodes are provided with specific facilities such as echo cancellation in the case of a voice service. Thus, at this stage of the method, it may be desirable to check whether there are any nodes which require more than a predetermined minimum number of hops to connect that node to a MIP and, if there are any such nodes, marking those nodes as not connectable to the mesh network (or at least not for certain services required by subscribers located at such nodes). Other services, such as file transfer or video-on-demand services, are not necessarily delay-critical and thus there may not be a need to place any restriction on the number of hops for such services. There may of course be other constraints that limit the number of allowable hops and/or the suitability of paths.

II.3. Anti-Orphan Procedure

At any stage of the method, there may one or more nodes which have not been linked to a connection node and that have only one available line-of-sight and, plainly, a link must be assigned to those single lines-of-sight if those nodes are to be linked to a connection node; thus, before proceeding to link a node to the rest of the mesh network by assigning an available line-of-sight on that node as a link, a check is preferably made for any nodes that have only one available line-of-sight and if there are any such nodes, they are linked via those single lines-of-sight. This check is referred to herein generically as an anti-orphan procedure.

Figure 3:
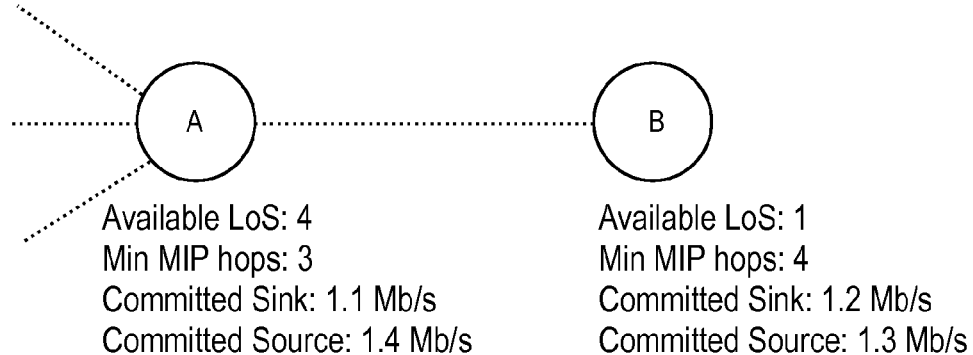
FIG. 3 is a schematic drawing showing operation of an example of an anti-orphan procedure.
Figure 3:
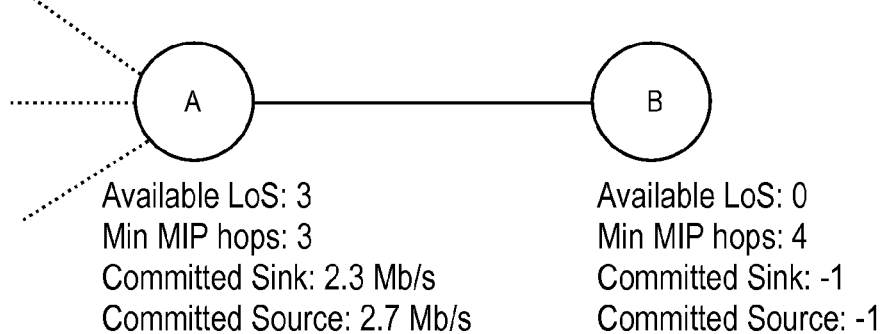

One example of such an anti-orphan procedure is to look in step F5 for any node that has exactly one available line-of-sight to another node. For any such node, the line-of-sight from the node is assigned as a link and the source and sink rates of the node are reassigned to the node at the other end of the link. The committed traffic rate at the node at the other end of the link is then labelled with the reserved value "−1". This is illustrated schematically by way of example in FIG. 3 in which available lines-of-sight are shown by dotted lines and assigned links are shown as solid lines. Before the anti-orphan procedure of step F5 is run, it is determined that node A has four available lines-of-sight, has a committed source rate of 1.4 Mb/s and a committed sink rate of 1.1 Mb/s and requires a minimum of three hops to the nearest MIP; node B has one available line-of-sight (to node A), a committed source rate of 1.3 Mb/s and a committed sink rate of 1.2 Mb/s and requires a minimum of four hops to the nearest MIP. At this point, timeslots adequate to carry the traffic formerly labelled as committed source and sink rates at B are allocated to the link A-B. After the anti-orphan procedure has been run, the line-of-sight between nodes A and B is assigned as a link; node A therefore only has three lines-of-sight available and node B has no lines-of-sight available. The committed source rate after the anti-orphan procedure has been run for node A is 2.7 Mb/s and the committed sink rate after the anti-orphan procedure has been run for node A is 2.3 Mb/s (respectively the sum of the previous rates for nodes A and B) whereas the committed source and sink rates for node B are each set at −1. Plainly, the minimum number of hops to the nearest MIP for each node A,B is unaltered. If the maximum acceptable number of hops hB from B to a connection code is less than the maximum acceptable number of hops from A to a connection code plus one, A should be relabelled as having a maximum acceptable number of hops of hB minus one.

As mentioned briefly above, it should be noted that whenever any link is assigned by the anti-orphan procedure, this may cause one or more other nodes' available lines-of-sight to fall to one, either individually or in groups. Accordingly, after assigning any link, it is preferred to search for any other nodes with a single available line-of-sight and repeatedly run the anti-orphan procedure until there are no such nodes.

It should also be noted that the anti-orphan procedure could connect a node to a MIP. Furthermore, in the steps which will be discussed below, if for example node A in FIG. 3 becomes marked as connected to a MIP, node B should be marked so also, node B being recognised from its adjacency to node A and its setting of −1 for the committed sink rate. This may occur repeatedly, for example where a large anti-orphaned part of the mesh becomes connected to a MIP. In addition, if the anti-orphan procedure causes another node's available lines-of-sight to fall to zero, then a valid mesh cannot be formed. Various options to overcome this will be available to the network operator. For example, whilst this is not preferred, the network operator may try to allocate the last (otherwise reserved) antenna at some node.

II.4. Create Primary Topology

Once the anti-orphan procedure has been completed satisfactorily, an unconnected node is selected as the next candidate for connection to a MIP. Preferably, a search is made in step F6 for the node with the greatest committed source rate or committed sink rate or sum thereof that is not yet connected to a MIP. The next subsequent steps F7 to F11 are applied to that node. This procedure (of selecting a node, preferably that node with the greatest committed source rate or committed sink rate or sum thereof that is not yet connected to a MIP and applying the next subsequent steps to that node) is then repeated for the other not-yet-connected nodes until all nodes can reach a MIP. Alternative ways of determining the order of selection of nodes to which the following steps are applied are possible on the basis of other criteria selected by the network operator according to local subscriber density, traffic requirements, etc. For example, the nodes could be ordered by selecting those nodes not yet connected to a MIP or another node already connected to a MIP and then applying the following steps to such nodes in order of those that have the physically shortest path or which require the least number of hops to a MIP or another node already connected to a MIP.

Thus, in step F7, in the preferred embodiment, for the node selected at F6, a search is made to find all paths, via available lines-of-sight and/or previously assigned links, which lead from this node to any MIP in less than h hops where h is a limit set for this node for example for reasons of traffic delay. It is preferred at this stage to ignore any path which, if followed in the direction node-to-MIP, includes a node which already has a primary path to a MIP and after that node traverses an available line-of-sight not in use in the primary topology so far. This ensures that paths that create redundant topologies are rejected, it being understood that a redundant topology is one in which there are plural paths consisting of links available from any one node to any one MIP.

Once these paths have been found, in step F8 the paths are ordered. The order in which the paths are placed in step F8 can be based on a number of criteria. One preferred option is that the paths are ordered first according to the number of hops, with the preference being for the smallest number; as a first tie-break, according to which MIP they lead to, with the preference being for the MIP with the lowest current committed traffic rate; as a second tie-break, by the sum of the physical distances of each of the links/lines-of-sight which make up the path, the preference being for the shortest physical distance; and for a third level tie-break, by the number of hops in the path that are already committed links, the preference being for the largest number of committed links. Thus, in this preferred embodiment, the paths are ordered so that the connection node which is the smallest number of hops away is preferred, with the connection node having the lowest currently committed data flow rate being preferred as a first tie-break, with the shortest physical distance of the path being a secondary tie-break, and with the preference to re-use the largest possible number of previously committed links being a tertiary tie-break. In another option, the paths are ordered first according to the sum of the physical distances of each of the links/lines-of-sight which make up the path, the preference being for the shortest physical distance; as a first tie-break, according to which MIP they lead to, with the preference being for the MIP with the lowest current committed traffic rate; as a second tie-break, by the number of hops, with the preference being for the smallest number; and for a third level tie-break, by the number of hops in the path that are already committed links, the preference being for the largest number of committed links.

In step F9, each path is considered in the order determined in F8 and an attempt is made to turn all available lines-of-sight on each path into links. Thus, in step F9, the paths are tested. A first test is to determine whether there is any node in the path which would have fewer than one free antenna if all of the available lines-of-sight on that path were converted to links; if there are any such nodes, the path is rejected. A second test takes into account the fact that converting lines-of-sight on a path into links will connect one or more nodes to a single MIP. Thus, the second test checks to determine whether the connection of these nodes to a MIP would cause the total committed bandwidth at the MIP to exceed the maximum committed rate of traffic which is allowed for the MIP. If so, the path is again rejected. In this regard, the network operator may set a maximum committed rate of traffic that is to be allowed per MIP; that maximum allowed committed rate might be a fraction of the capacity of the MIP so as to reserve a proportion of the MIP's capacity for back-up paths. A third test checks the hops from other nodes that become connected as a result of adding this path against the individual maximum hop limits for those other nodes. A fourth test checks that any timeslots or additional timeslots required at any point along the path in order to carry the committed traffic from any of the newly connected nodes can be allocated at the nodes at each end of the links in question. One or more of these tests may be applied. Preferably, all of these four tests are applied.

In step F10, for a path which has not been rejected in the testing step F9, all nodes on that path are marked as connected to a MIP. Furthermore, various lines-of-sight are marked as unavailable: those lines-of-sight are all unused lines-of-sight from any node or MIP in the path that now has only one free antenna; any line-of-sight that runs between two nodes both of which are now connected to MIPs; any line-of-sight between two nodes either of which does not have free the minimum number of timeslots as are required to create a link; and any line-of-sight that runs between a MIP and a node which is connected to some other MIP. This marking of lines-of-sight in step F10 serves to eliminate from further consideration lines-of-sight that, as a result of adding this path, would no longer be available for use and this allows the method to identify problems that the addition of this path would or might cause.

After the markings of step F10 have been made, in step F11 the minimum number of hops to a MIP and the number of available lines-of-sight are recomputed for all nodes not yet connected to a MIP. The total number of nodes showing a violation of certain criteria are counted. These criteria can include nodes for which there are now no available lines-of-sight and nodes for which the minimum number of hops from the node to a MIP exceeds the predetermined acceptable maximum number of hops for that node's traffic. If the number of violations is zero, then the links on the path and the markings are retained; the committed traffic rates of all newly connected nodes are added to the committed rate of the MIP to which the newly connected nodes have been marked as connected; the committed traffic rate of each newly connected node is made zero; and then preferably the anti-orphan procedure of step F5 is repeated as necessary. On the other hand, if the number of violations is non-zero, a record of that path as just marked in step F10 is made together with the number of violations and then the markings made in step F10 and the path itself and any timeslot allocations made in step F9 are all unmade. Thereafter, the next path from step F8 is considered.

If it is found that there is no path from step F7 with zero violations, then the method preferably returns to the path which produced the smallest number of violations; considering all nodes that showed a violation for this path, then preferably the node with the greatest committed source rate or committed sink rate or sum thereof is selected in place of the node previously selected in step F6 and then steps F7 to F11 are applied to that node. A procedure may be required to prevent an infinite loop from resulting from this step. To terminate such a loop, each node for which an attempt has been made to add it to the mesh during this step is marked as "blocked". Upon revisiting a node that is already marked as blocked, that node is ignored and an attempt is made to connect to a node which is again preferably the node with the greatest committed source rate or committed sink rate or sum thereof that cannot yet reach a MIP and which is not blocked until either a path is added or all nodes are blocked.

Once a path has been added, any nodes marked as blocked are unmarked and the method then returns to step F6 and is repeated until all nodes are connected to a MIP via links assigned to available lines-of-sight or it has been determined that certain nodes cannot be connected to a MIP without violating one or more of the criteria described above (such as the desire to leave one antenna free on each node).

The above steps build a set of non-redundant paths linking every node to a MIP and provide what is referred to herein as the "primary topology". As mentioned, in the preferred embodiment, the primary topology is a non-redundant topology in which there is only one path from each node to a MIP and in which there is at least one antenna free on each node and which can carry all the committed traffic. In an alternative embodiment, the primary topology may not be constrained to leave an antenna free at each node.

II.5. MIP, Node and Link "Handicap"

The steps described above attempt to connect each node to the best MIP. For certain topologies, the above methods will tend to preferentially connect nodes to a subset of the available MIPs, resulting in excess use of those MIPs whilst other MIPs in the mesh remain under-utilised. This may prevent a primary topology from being formed or it may produce an unacceptable traffic balance across the mesh. The preferred method of dealing with such failure or imbalance is to introduce an additional parameter into the formation method, herein referred to as a "MIP handicap", and then to repeat the formation method with said additional parameter. In the preferred arrangement, a MIP or MIPs that are seen to emerge from a first pass of the formation method with excessive traffic are assigned an additional hop count handicap that is added to the computed hop count for all paths that terminate at those MIPs. For example, if steps F7 to F11 fail to add a path, it may be that a path would have been acceptable but for the fact that it exceeded the maximum permitted load on a MIP at step F9. Such a MIP is a candidate for a handicap. It should be noted that this handicap is only applied when ordering alternative paths for selecting a route and this hop count handicap is not used when assessing the maximum number of hops for delay-critical traffic. In the preferred method, this refinement is used to adjust the MIP handicaps for each MIP in a way that results in a mesh with a more uniform distribution of traffic to MIPs. It will be appreciated that this MIP handicap can also be used to introduce other types of bias into the formation method if desired, for example to cause traffic to be preferentially routed to particular MIPs.

The repetition of the formation method with an added handicap may itself lead to a failure to form a primary topology or to produce an acceptably balanced traffic distribution, in which case the same or another MIP is indicated as a candidate for a further handicap. In such cases, the formation method may be repeated multiple times with one or more handicaps at one or more MIPs. Preferably such repetitions will be ceased if either all MIPs have obtained the same non-zero handicap level or after some fixed maximum number of repetitions.

It will be appreciated that other types of handicap can be introduced into the formation method to introduce other types of bias into the mesh formation. For example, step F2 allowed node bias to be introduced to reduce the number of available antennas on selected nodes and this will limit the number of links that can be formed. At step F2, this was used as an option to force a particular node to be configured as a "leaf" in the mesh, that is, to be configured as a node which is at the end of a primary path and which is not configured to be a transit node within the primary topology for traffic intended for other nodes. Such a configuration may be desirable from an operator point of view for a new node or for a node that is unreliable.

A further form of handicap is link handicap. In some cases there will be some links whose inclusion in a mesh is less desirable than for other links. In cases where the undesirable links are completely unacceptable, the corresponding lines-of-sight are simply not offered for consideration in the formation process, which may prevent formation from completing. However, in other cases, the formation process is desired to complete, while at the same time making minimal use of undesirable links. One practical example of this occurs where a large number of nodes are located in an approximately straight line and most of the lines-of-sight therefore follow this approximately straight line. A city which is built on the banks of an approximately straight river may lead to such an example. In this case, the level of interference in the mesh and hence its spectral efficiency can be improved by making maximum use of radio links that do not follow this line and minimum use of those that do follow it. Another practical example of this occurs where the traffic capacity of a radio link is a non-linear function of the link length, for example due to step changes in the type of modulation that can be used on the link (e.g. the number of bits per symbol). A handicap reflecting the modulation that can be used on each link can therefore be employed.

Link handicap is preferably added to mesh formation by adjusting the value of the handicapped links at step F8. If the ordering at step F8 is first by number of hops, then each handicapped link may be assigned a value of H rather than 1 hop. For other orderings, other factors may be weighted instead; for example the physical link distance may be multiplied by H in the case of the handicapped links. The value of H can be adjusted in order to specify the level of preference against the handicapped links.

Note that, as for MIP handicap, link handicap is applied only when ordering alternative paths at step F8; it is not used when assessing the maximum number of hops for delay-critical traffic.

II.6. Adding Redundant Paths

In the preferred embodiment, the result of the above method steps is a database or data structure that represents all nodes, the links connected between them, and the lines-of-sight that are still available between them. The topology of the mesh network so far created is non-redundant (i.e. each node has only a single path to a MIP). In order to provide resilience for the mesh network and in order to provide for high bandwidth for selected subscribers, it is preferred to add redundant paths for as many of the nodes as possible. This can be achieved in a number of ways.

Where there is more than one MIP, in one preferred embodiment the method first tries to provide a maximum number of nodes having independent traffic paths to different MIPs so that subscribers at those nodes are fully protected against any single failure in the network (apart from failure of the subscriber's node itself of course). Where there is more than one TNCP, in another preferred embodiment the method first tries to provide a maximum number of nodes having independent traffic paths to different TNCPs. Where TNCPs are linked to the core network at a single access point via common equipment, in another preferred embodiment the method first tries to provide a maximum number of nodes having independent traffic paths to the core network. In a first stage, the redundant paths are chosen first so as to reserve an antenna at each node; these additional paths are termed herein the "first diversity set". Then, in a second stage, further redundancy can be added using the reserved or spare antenna at one or more nodes. It is preferred at this stage to use preferentially the spare antennas on nodes other than MIPs. It is also preferred at this stage to assign a link to an available line-of-sight only if this can be done without causing interference problems. The additional paths created at this second stage are termed herein the "second diversity set".

Thus, in a first stage for adding redundant paths, for each node in the mesh, a flag independent_paths is added indicating whether the node has completely independent paths back to different MIPs. All flags are initially set to FALSE. For those nodes having a maximum allowable hop count to a connection node, it is preferred at this stage to include only those paths that do not exceed that predetermined maximum number of hops, as discussed above. It will be appreciated that the lines-of-sight available to create the first diversity set are already identified in the database or data structure produced by the method steps described above for forming the primary topology: the available lines-of-sight are only those which run between pairs of nodes both of which have at least two unused antennas and at least sufficient timeslots at both ends. (All lines-of-sight that end on a node with only one unused antenna have already been marked as unavailable in step F10.)

Taking each available line-of-sight in turn, a count is made of the number of nodes for which the independent_paths flag would change from FALSE to TRUE if this line-of-sight were to be made into a link. One method for this is, for each node currently flagged FALSE, start with the primary path from that node to a MIP, as determined in the method steps set out above. For each intermediate node on this path, consider the mesh but with that intermediate node and all its attached links discarded. Try in each case to find a path to a MIP that is still available and that does not violate the maximum hop constraint for that node. If for the removal of each intermediate node in turn there is one such path in each case, then the flag would change to TRUE. (It should be noted that this procedure may find two or more independent paths, neither of which is the path as determined in the method steps set out above.) The line-of-sight whose addition would produce the largest number of flag changes and which can be added without timeslot allocation failure is then selected and a link assigned to it; the appropriate flag settings are then changed for those nodes that have now obtained independent paths according to the above method steps; also, any lines-of-sight between nodes which no longer have two free antennas are marked as unavailable. (For a tie-breaker, the line-of-sight which produces new paths with on average the smallest total number of hops to the MIP per node, summed over all nodes, can be selected.)

This procedure to add a link is then repeated for other available lines-of-sight until there are no available lines-of-sight that would cause a flag change. It should be noted that the number of flag changes per available line-of-sight preferably is recalculated from scratch each time the procedure is repeated because the inclusion of the last redundant link will have affected the results that now obtain from other potential links.

Once no more flag changes are possible in the above first stage for adding redundant paths, then either all nodes have independent paths to MIPs or further redundancy can only be added via the antennas that have so far preferably been reserved at each node. To do this, the set of available lines-of-sight is redefined to be those that run between any pair of nodes that each has at least one spare antenna and at least sufficient timeslots at both ends. Continuing with the flag settings from the end of the previous stage for adding redundant paths, the link addition loop of the first stage for adding redundant paths is repeated with the newly allowed set of available lines-of-sight, until once again no flag changes occur.

Preferably this stage is carried out in two subdivided stages. The first subdivision does not allow use of lines-of-sight either end of which is at a MIP which has only one spare antenna; the second subdivision does allow their use.

Where redundancy is desired to include alternative TNCPs or core network access points, the procedure above can be used but taking into account the requirement for paths to different TNCPs or core access points respectively in place of MIPs in deciding when a flag change would occur.

As a further refinement to the process of adding redundant paths described above, redundant paths that only provide partial diversity may be added. Partial diversity is used herein to refer to a node with one or more back-up paths which provide connection to the core network in the case of the removal of only a subset of the intermediate nodes. It will be understood that a failure in the other intermediate nodes would result in failure of both the primary path and all back-up paths for that node.

In the cases of both full and partial redundancy above, these may be achieved by one or more back-up paths. In an alternative implementation, fully diverse paths that require only one back-up path would first be sought. Such paths can be found by testing for a flag change above if all intermediate nodes are removed at once, as opposed to each intermediate node in turn.

The method of selecting diverse paths or partial diverse paths that are used in the event of the failure of a link or node should preferably take account of the total change in traffic distribution that would result from any single failure. For example, the failure of a given link would be expected to result in re-routing of all the traffic that is using that link to the appropriate back-up paths; and the failure of a given node would result in the re-routing of all traffic passing though that node with the exception of the traffic that has its source or sink at said node. In the preferred implementation, the computation of the required capacity for the various back-up paths will take account of said re-routing, thus allowing the back-up paths to take advantage of mesh capacity that is freed up by said re-routing following any given link or node failures. As a consequence, there may be a greater number of back-up paths chosen for a node or service than may be required on purely topological grounds.

A "service" may be defined as being the smallest unit by which traffic is delivered to a subscriber. For example, in an ATM network, a service might correspond to an ATM PVC (permanent virtual circuit). Where one or more subscribers attached at one node had two leased line connections and internet access via the core network, these might constitute three services. "Remaining dependencies" for a service are defined herein, at any stage of the process of selecting diverse paths, as those nodes or other devices (core network access) along the primary path for that service whose failure would cause failure of the service.

Preferably where one or more back-up paths are provided for one service, there should be an inherent precedence to those paths, such that a logical process can be carried out at both the subscriber site and at the core network by which the best path is selected for use in the event of any failure in the network, by preferring the path that is intact and is highest up the precedence. Preferably this selection can be carried out locally at both the subscriber site and at the core network without reference to or knowledge of the state of the network, but solely based on a knowledge of which paths are intact. Preferably the result of a set of such local decisions is such as to provide best performance across the mesh as a whole.

In the preferred method, an attempt to meet these objectives can be made by performing the following series of steps.

As a first step, each direction of each link is marked with a "node failure array" that contains an entry for each possible node failure, where said entry gives the total amount of spare capacity available to be assigned for back-up paths in this link direction. The amount of spare capacity in each case is the amount spare within the current timeslot allocations in the no-failure case, plus the amount of traffic that would no longer use this as a primary path if the node in question were to fail. Also all available lines-of-sight are marked with a node failure array containing all zeros in each direction.

As a second step, for each service a set of initial remaining dependencies is marked, being all of the nodes and other devices on which its primary path depends, it being borne in mind that this is the path around which alternative routes are sought.

As a third step, some ordering of all services is selected. In one embodiment, this ordering is in decreasing order of bandwidth (the committed source plus sink traffic) per service. In another embodiment, this ordering is dictated by differing commercial importances of the services (possible reflected in different tariffs paid for the services). In another embodiment, the ordering of the services is in decreasing order of remaining dependencies. It will be appreciated that other ordering rules can be applied depending on the objectives of the network operator and that the above orderings can be applied in combination with different preferences given to each of the factors.

As a fourth step, for each service taken in this order, all possible paths to a MIP are identified, including those which use lines-of-sight that are available but are not being used for links. These are preferably ordered first by the smallest number of remaining dependencies that there would be if the path were selected, then sub-ordering these paths by total "cost", as a sum of link costs over the hops in the path; each link cost is preferably a function of the form {constant k1 per hop, plus constant k2 per extra timeslot needed to carry traffic, $0<=k1<k2$}. Within this order, each path is tested to determine whether it is usable. A back-up path is only usable if it can be assigned without reducing the spare capacity entry in the node failure array (as defined in the first step above) below 0 in either direction on any link in the path, for each remaining dependency that would be removed by adding the back-up path. However there may be one or more timeslots available for allocation on one or more links, which if added would augment the link capacity such that no spare capacity entry in the node failure array then falls below 0 in either direction. In such a case, the path is usable.

The first usable path found in the fourth step is selected and any timeslots required are added, incrementing all entries in the node failure array defined in the first step for each direction of each link gaining a timeslot, by the capacity of the timeslot. The relevant remaining dependencies from the node's list removed by adding this path are removed from its list of remaining dependencies and the back-up path together with its precedence are recorded. The precedence of one back-up path is higher than that of another if it was produced earlier than said other in the execution of this method. All other array entries in the node failure array in both directions along said back-up path are adjusted to reflect the remaining dependencies removed by the back-up path.

As the fourth step above is carried out for each service, the remaining dependencies for each service may not be reduced to zero. In one preferred embodiment, each service is considered repeatedly until its remaining dependencies either have been reduced to zero or cannot be further reduced. In another preferred embodiment, each service is considered once, then the services are reordered according to the criteria initially used for their ordering, each service is considered once more that does not have zero remaining dependencies, and so on until no more remaining dependencies can be removed. In a third preferred embodiment, after each back-up path has been recorded the reordering is completely recalculated, another back-up path is selected and so on until no more remaining dependencies can be removed.

It should be noted that for each node, its initial remaining dependencies should be taken to include itself. Where node A has a remaining dependency on node B, this remaining dependency cannot be removed by a path that uses any link connected to B, unless A=B in which case it can include any link connected to B except for that link in the primary path from B to the core network. The purpose of these two rules is to provide a set of back-up paths that cater for the failure of both any one device and any one link.

The addition of timeslots permitted in the course of adding a path, as described above, is permitted to include the case where a line-of-sight is turned into a link, subject to the availability of the antennas and timeslots required to support such a link.

In one embodiment, the assignment of back-up paths follows the selection of links using the independent_paths FLAG-based process. This ordering follows the order of description above. In another embodiment, either one or all of the stages of selection of links using the independent_paths FLAG-based process is omitted, the assignment of back-up paths then follows. In this case selection of links is partly or wholly a product of the process of adding back-up paths.

II.7. Providing for Peak Traffic Load

II.7.1 Introduction

All the formation steps described so far have addressed the provision of sufficient capacity across the mesh to support the committed traffic rates associated with each service, both to and from each subscriber. For some traffic types this is sufficient. For example, a link between two telephone exchanges may require exactly this committed traffic rate at all times. However, other traffic types may be characterised by:

a committed traffic rate, i.e. the rate to which the subscriber is entitled on demand;

a peak traffic rate, i.e. the maximum rate that the subscriber will ever be offered; and, a minimum traffic rate, i.e. the smallest rate that the subscriber will ever exploit.

The first two rates define the service offered to the subscriber. The committed traffic rate should be offered at all times, regardless of other subscriber traffic levels. The peak traffic rate will be offered at some times, but these times will depend entirely on other subscriber traffic levels and on any incidences of failed equipment or links in the mesh.

The minimum traffic rate is a property of the nature of the use to which the service is put. For example, an internet access service may be available to a subscriber at all times, but the subscriber may be making no use of it at all at some times. In such a case, the minimum traffic rate is zero. As another example, the output of a surveillance camera may be low when there is no movement in the field of view of the camera (the minimum traffic rate) and higher when there is movement (the committed traffic rate). A link between two telephone exchanges may have equal committed, peak and minimum rates. In general, any traffic service can be described by a combination of the committed, peak and minimum rates to and from the subscriber.

In order to meet the requirement that the peak traffic rate can be offered at some times, it is sufficient to ensure that the peak rate for each service can be offered at a time when all other services are exploiting only their minimum rates: this requirement can be termed the "peak service delivery requirement". Since plural services will in general use each link in a mesh, some level of peak traffic capacity will in general be available along the primary path (i.e. the path provided along the primary topology) of each service. In some cases, this capacity will be sufficient to satisfy the peak service delivery requirement. In other cases, the addition of additional timeslots to some links in the primary topology will allow the peak service delivery requirement to be met.

However, in yet other cases a different approach may be preferable, for two reasons. First, a peak traffic rate may be much larger than a committed traffic rate. For example, a peak traffic rate might be 8 times a committed traffic rate. This means that very many links in the primary topology will require the allocation of timeslots additional to those allocated to carry the committed traffic; this effectively reduces the committed traffic carrying capacity of the mesh, since some allowance for these additional timeslots must be made when forming the primary topology.

Secondly, the process for adding redundant paths, described in the previous section, in general produces better results when there are more timeslots available to be allocated to redundant links; if timeslots must be reserved in the primary topology, then the provision of redundant paths will be affected. Since the provision of peak traffic capacity and redundant paths are both important objectives, then preferably a method is used in which the provision of one is not at the expense of to the provision of the other but is instead complementary to the provision of the other.

A preferred method for providing peak traffic capacity is set out below. The preferred method relies on the ability to "inverse multiplex" the traffic for one service between two points A and B, using plural paths across the mesh between these two points. Inverse multiplexing is a process in which a single stream of data that must be sent from A to B is divided at A into discrete portions, to each of which is added a label indicating a unique portion number, this portion number (typically) being incremented each time a portion is formed. Each labelled portion is then transmitted along one of the plural paths. At B, the portion numbers are used to reorder the data arriving across plural paths; the portions are joined together in number order and the labels removed, thus recreating the original stream.

Preferably for each service, point A is at the subscriber node. Preferably for each service, point B is at some point on the primary path for that service. Preferably for each service, point B is at a point as close to the mesh edge as possible; for example it could be at common equipment linking all TNCPs to the core network.

Given that the mesh provides an inverse multiplexing capability, a preferred method for satisfying peak traffic rate requirements is, in outline: determine how much of the peak requirement is already satisfied by the primary path; then look for additional paths across the mesh which will supplement the primary path until these paths in total meet the peak rate requirement; an inverse multiplex can then be configured that operates over the primary and all necessary additional paths.

In more detail, every service provided across the mesh can be characterised by six parameters: minimum rate to subscriber, committed rate to subscriber, peak rate to subscriber, minimum rate from subscriber, committed rate from subscriber, peak rate from subscriber. These will be denoted herein MT, CT, PT, MF, CF, PF respectively.

In practice, it may be desired to constrain these parameters to a range of values, such as constraining them all to be multiples of 64,000 bits/second. It may also be desired to constrain the peak capacities allocated on each primary and additional path to another range of values, possibly related to the first range. Such constraints will be assumed in the following description, with the understanding that these constraints can be removed if desired, to allow the use of any granularity of allocation.

Each direction of each link is first labelled with its available burst capacity Cb1. This is the total capacity of the link in this direction less the sum of the minimum loads (MT or MF) for each service using the link as its primary path in the direction.

Now, for each service whose peak rates exceed its committed rates, its primary path is scanned to find, for each direction, the lowest values of Cb1 for any link along the path. Record for each direction the sum of this lowest value plus the minimum rate of this service, as the peak traffic capacity provided for this service by the primary topology, denoted PT0 or PF0. Record also for the service the amounts Sf, St by which these figures PT0, PF0, when rounded down to the nearest allowed capacity value, fall short of the required PT, PF.

II.7.2 Allocating New Peak Paths Over Existing Links

The following steps are preferably carried out for every service where Sf or St are non-zero in order to determine a set of paths that, when inverse-multiplexed together, provide the required PT and PF for the service. (CT and CF are not considered here as they are provided by the primary path.) The order in which the services are considered in these steps is not important.

Copy all Cb1 to variables Cbs for this service per direction per link, reflecting the peak capacity available in each link direction for this service. Reduce the Cbs along all links in the primary path by the PT0, PF0 values recorded for the service, after rounding down to the nearest allowed capacity value.

While either Sf or St for this service remains non-zero, repeat the loop:

determine all possible paths across links in the mesh between the points A and B for this service;

if Sf<St, order these paths in decreasing order of the smallest value of Cbs on any link in the path in the direction towards the subscriber. Otherwise, order the paths in decreasing order of the smallest value of Cbs on any link in the path in the direction from the subscriber;

if all the paths produce a smallest value of Cbs which is less than the smallest allowed capacity value, then break out of this loop: the peak capacity cannot be delivered by the current capacities of the links in the mesh;

otherwise, the path at the head of the order is the path which can provide the largest part of the unsatisfied peak capacity. Add this path to the list of additional paths for the service. If this is the nth additional path so identified, starting at n=1, record this path with a peak capacity of PTn, PFn, where PTn, PFn are the peak capacities available from this path (even if these peak capacities exceed the unallocated peak capacity);

adjust St, Sf, reducing them by these PTn, PFn values recorded for the service, when rounded down to the nearest allowed capacity value. Reduce the Cbs in each direction along this path by the same adjustments. If either of St, Sf becomes negative, set them to 0.

At the end of this loop, the peak capacity of the service, or as much of it as possible, has been provided by the current link capacities of the mesh. If there is any unsatisfied capacity, the following steps are preferably used to provide it.

II.7.3 Increasing the Capacity of Existing Links

If there is at least one service for which either of St, Sf are non-zero, the following process is preferably repeated in its entirety to add one additional timeslot to the mesh on each repeat, until no more timeslots remain whose use will satisfy at least some of the outstanding peak capacity of at least one service.

Set up a flag for each radio link, to indicate whether both of the nodes at the ends of the link have at least one spare timeslot available. This indicates all the links which are candidates for addition of a beneficial timeslot. If no flags are set, no more beneficial timeslots remain and this procedure ends.

Set up a count Nes, initially 0, per direction on each radio link, which will be used in the following steps to indicate the number of paths whose peak capacity would be increased by adding a timeslot in that direction.

For each service for which either of St, Sf is non-zero:

copy all Cb1 to variables Cbs per direction per service, reflecting the peak capacity available in each link direction for this service. Reduce the Cbs on all links along all the paths recorded for this service, by the PTn/PFn values recorded for these paths;

if St is non-zero, then for every recorded path in the direction towards the subscriber, scan the path to find the link with the smallest value of Cbs. Increment Nes for that link and direction;

if Sf is non-zero, then for every recorded path in the direction from the subscriber, scan the path to find the link with the smallest value of Cbs. Increment Nes for that link and direction.

Note that all alternate paths are considered here, since any one of them may increase the peak capacity of the service. A link that is the constricting point for two paths for the same service will cause Nes to be incremented twice on this link. This is intentional: a complete new timeslot is likely to add capacity via both paths.

If all links that are flagged to indicate a timeslot available have Nes=0 in both directions, this procedure ends.

Otherwise, for the link and direction with the highest Nes, out of those flagged to indicate a timeslot available, add a timeslot to the link and update its Cb1 appropriately.

For each path for a service that uses this link and direction:

update the PTn/PFn recorded for the path, to reflect the actual peak capacity that the path can now sustain. If either St, Sf for the service is non-zero, also update these to reflect the peak capacity now available for the service;

if more than one path for this service uses this link and direction, this step should preferably not double-count the additional capacity. Therefore, in such a case:

the paths are preferably considered as candidates for the additional capacity in decreasing order of their Pn, where Pn is the greater of PTn and PFn before either is updated;

the first path in this order is allocated any bandwidth from the link that it can exploit along the whole path;

only the new link capacity left unexploited by the first candidate may be considered for the second candidate, and so on.

or each service, at the end of the above steps there will be a path set consisting of a primary path with peak capacity PT0, PF0, plus zero or more additional paths with peak capacities PTn, PFn. Together, the paths in this path set allow the peak capacity of the service to be delivered, or partially delivered if either of St, Sf for the service was not reduced to 0 in the steps above.

The path numbers n allocated to the additional paths in a path set were chosen above to reflect the decreasing order in which they contribute to the peak capacity. Any timeslots then added to mesh links may have caused this ordering to change. Therefore, the path numbers are preferably reordered, by allocating, for n=1 upwards, path number n to the path that gives the greatest reduction in whichever of St, Sf is the greater when the capacities of only path numbers 0 . . . n−1 were considered.

The reordered PTn, PFn are then preferably all rounded down to the nearest allowed capacity value and summed from n=0 upwards, until they equal or exceed the PT and PF for the service. These then constitute the final set of paths over which inverse multiplexing will occur. One or more of the higher numbered paths may not be required and in this case they are not included in the set.

In one embodiment, the steps for peak capacity allocation described above are carried out following those steps used to add redundant links and back-up paths. In another embodiment, the steps for peak capacity allocation described above are carried out following those steps used to add redundant links and before those steps used to add back-up paths.

In another embodiment, the steps for peak capacity allocation are carried out excluding those used to select additional peak paths, and the remaining steps are carried out prior to adding redundant links. This approach provides a set of peak traffic paths that do not rely on inverse multiplexing for their operation, by adding timeslots to the primary topology. As noted above, such an approach will tend to lessen the capability of the mesh to provide back-up paths, but it avoids the requirement for the mesh to support inverse multiplexing.

II.8. Incorporation of Cable Links

A network may contain both cable and wireless links. In such a case, the detailed examples of the method described herein can readily be adapted for use in such methods. Example cases of such networks include networks where a pair of mesh nodes are linked together by cable, for example at a location where two such nodes provide a beneficial increase in the number of lines-of-sight at the location. Another case arises where a number of subscribers are linked to a mesh node via intermediate switching equipment via cable links. In a further example, in the example of FIG. 1, the feeder link 53 between the MIP standard node 51 and the MIP adapted node 52 is a cable link, as is the connection from the TNCP 4 to the trunk 3. Finally, there may be cable links from the trunk 3 to a central traffic switching centre.

The methods described herein can beneficially be applied to a whole network which includes both cable and wireless links, such as the above examples. Particular benefits include the use of the method described herein to provide resilient traffic paths all the way to a central switching centre, so providing resilience against failures of all nodes and links, both cable and wireless, in the whole network.

For the purposes of applying the method to cable links, the following additional procedures may be implemented. Where the link is a cable link, no consideration of remaining free antennas is made when considering the possible use of that link in a path. Instead of a check that sufficient timeslots can be allocated at each node to support the link, the total capacity of a cable link is instead tested against the traffic that it is required to carry. The total capacity is similarly used when calculating the "node failure array". After the primary topology has been produced and before the addition of redundant paths, all cable links not included in the primary topology should be incorporated into the first diversity set.

Where feeder links are realised using the same technology as the mesh wireless links, they can preferably be treated as links between a pair of nodes each with multiple antennas but only one line-of-sight, this line-of-sight being to each other.

The methods described herein can be used in the case of networks whose links are wholly cable links for example for the purpose of calculating a set of primary and redundant paths across such a network.

II.9. Addition of MIPs

If it becomes necessary during operation of a mesh for one of the nodes become a MIP, perhaps because of additional traffic capacity requirements necessitating another connection to the core network, then the node which is to become a MIP is preferably selected from all (suitable) nodes in the network as follows. Each node is considered in turn and the minimum hop counts to all other nodes is found for each. A method to do this has previously been described. The minimum hop counts to all such other nodes is then summed. Where the traffic requirements of each node is known, preferably the sum is a weighted sum in which the minimum hop count for each such other node is multiplied by the traffic requirement at that node. For each node, a sum of minimum hop counts has now been calculated; preferably the node which is to become a MIP is the node giving the smallest sum.

II.10. Application to Networks Other than Access Networks

In a more general case, the methods described herein can be used to form networks whose main purpose is other than to convey traffic from subscribers to a core network. Examples of such use are the construction of a general purpose resilient topology linking plural nodes, to carry traffic whose characteristics are not necessarily known at the time of formation of the network and which may flow entirely within the network, to and from a core network or some combination of these. In the case where traffic to be carried between two nodes is known, then the required source and sink capacity is marked against both such nodes. If the level of traffic to be carried in the network is not known, then each node may preferably be assigned an identical level.

In order to form such a network in the absence of a core network, one or more nodes are designated as anchor nodes and the method then proceeds as if they were connection nodes. If there is one such anchor node, then the method will produce a fully connected network. If plural such anchor nodes are used, then a fully interconnected network will be produced if the anchor nodes are themselves interconnected. This may be done by any means, before or after the application of this method. It may be done by applying the method described herein to a set of lines-of-sight between the anchor nodes.

If there is to be one anchor node, it is preferably selected from all the nodes in the network as follows. Each node is considered in turn and the minimum hop counts to all other nodes is found for each. A method to do this has previously been described. The minimum hop counts to all such other nodes is then summed. Where the traffic requirements of each node is known, preferably the sum is a weighted sum in which the minimum hop count for each such other node is multiplied by the traffic requirement at that node. For each node, a sum of minimum hop counts has now been calculated; preferably the anchor node is the node giving the smallest sum.

II.11. Conclusion

The result of the example formation method described in detail above is a database or data structure that indicates or represents a topology showing for all nodes that can be connected into a mesh how the nodes should be linked to other nodes should be allocated to the links. A network operator in practice can then take that database or data structure and implement a physical realisation of the mesh as generally described above and/or in our WO-A-98/27694 by linking actual nodes using actual transmission links in reliance on the topology indicated or represented by that database or data structure.

III. "Colouring"

III.1. Introduction

The preferred formation method as described above is capable of being applied to meshes using a variety of different radio transmission techniques. As noted above, these include the class of meshes in which all transmissions on radio links are carried out in repeated time frames of discrete timeslots, for example a mesh that operates in a Time Division Duplex (TDD) mode. There are a variety of ways of operating a mesh in TDD mode. In one preferred mode of operation, in each discrete timeslot each node can transmit to one other node, receive from one other node or be inactive. Each discrete timeslot will be assigned a timeslot number, for the purposes of the following discussion. If there are numTimeSlots discrete timeslots, they are numbered from 1 to numTimeSlots.

The preferred formation process produces meshes appropriate for such TDD operation, since it ensures that enough timeslots are allocated on each link to carry the allocated traffic for the link, while at the same time it ensures that the total number of timeslots allocated for all the links at any one node is no more than the number of timeslots in a TDD frame.

In the case where a mesh operates in a TDD mode, an additional process is preferably carried out after the formation process and before the mesh network is deployed, in which a timeslot number is allocated for each of the timeslots required on each radio link in the mesh. As has been briefly discussed above and as will become apparent from the following, this process can be likened to a mathematical problem well known within the area of graph theory, which is known as the colouring problem and is thus referred to herein as "colouring" a mesh or similar: different timeslots in a time frame are notionally associated with a different "colour". For a mesh, there are however some additional goals that this process should preferably achieve that are not present in the standard colouring problem within graph theory. These goals relate to the practical aspects of operation of a radio communications mesh.

In this analogy, the standard colouring problem concerns only the assignment of timeslots to links such that each node requires each numbered timeslot to be active for use on at most one radio link. In other words, given that at any particular node it is desired to avoid having reception from or transmission to other nodes taking place during the same timeslot numbers (i.e. it is preferred that any particular node is only either transmitting to or receiving from one other node only at any time instant), each timeslot used for transmission to and from the node in this embodiment must have a different timeslot number or "colour". (This assumes that all transmissions and receptions take place at the same carrier frequency.) Preferably the process used for a mesh should also take account of one or more of the following additional factors.

Whenever a timeslot is used for transmission on any one link by a node, then all other nodes at which that same timeslot is used for reception may receive some interference from this transmitting node. If the transmitting node is located far enough from another node, this other node may also receive some interference in following timeslots, according to the distance between the nodes and the temporal length of the timeslots in question. The use of highly directional antennas in the mesh reduces the effects of this interference, but the colouring process preferably produces a set of timeslot allocations which permits each link to operate such that the strength of the desired signal received in each reception timeslot is greater by an adequate margin than the strength of the total interference received in that timeslot.

In order to produce a set of mesh links which will operate compatibly, the colouring process preferably produces a set of power levels at which each timeslot on each link should operate.

Dependent on the operating frequency of the radio links, the attenuation on those links may be affected by changing weather conditions. In some weather patterns, such as a moving heavy rain front, the various signal or interference paths within the mesh may be affected by the weather conditions in different ways at the same time. The set of power levels produced by the colouring process preferably produces a set of link configurations which are able for a high proportion of the time to operate compatibly, taking into account such weather conditions.

Typically a mesh network may be assigned multiple frequency channels on which to operate; preferably the nodes can use any one such channel during each timeslot. The level of interference between a transmitter on one link and a receiver on another will be reduced where they operate on different frequencies; the colouring process preferably exploits this fact in a multi-channel mesh to achieve a satisfactory colouring in cases where such a colouring could not be achieved in a mesh operating on fewer channels.

Where nodes are equipped with plural discrete antennas, these antennas may be operated using a single radio transmitter and a single radio receiver, for reasons of cost. In such a case, in practice each desired transmission out of an intended antenna may be accompanied by a (usually lower power) transmission on all other antennas, while each signal received on a desired antenna may be accompanied by additional interference effects from the other antennas. Preferably the levels of transmission and reception on the other antennas are very much weaker than those via the desired antenna. The colouring process preferably accommodates this additional interference and preferably does so not only when all antennas are static and in defined positions but also when any antenna other than the desired antenna is either moving or at a random orientation. This ensures that the mesh continues to operate correctly during antenna movements, such as may occur during an adaptation sequence.

III.2. Example Colouring Method

The preferred method to colour a mesh, taking into account these additional factors, is as follows. The method is based on the theorems of König (1916) and Vizing (1964) and on public domain algorithms based on these theorems. The public domain algorithms as applied in the present context will be outlined here, then the preferred or optional additional steps added to account for certain mesh-specific factors will be described. For the purposes of these algorithms:

each mesh node is regarded as a vertex of a graph;

each timeslot required for transmission from node N1 to node N2 is regarded as an edge. The direction of transmission on an edge is significant for the purposes of interference calculations;

the number of edges meeting at a vertex is the total number of timeslots to be used for either transmission or reception at the node which is that vertex;

an edge is "coloured" by assigning a timeslot number to it.

In the case of the mesh, the preferred colouring process also includes assigning a frequency channel and appropriate power levels to the edge.

If edges with the smallest number of available choices are coloured first, then the chance of finding a successful colouring is greatest (though this cannot be guaranteed). Accordingly, the following steps may be carried out:

C1) all the vertices are scanned to find a vertex with the maximum number of edges;

C2) these edges are coloured arbitrarily. Each colouring of an edge reduces the number of colours available at each of its end vertices by one;

C3) for each edge, a variable dblMaxChoice is initially set to twice the number of colours available, representing the sum of the colours available at each of its end vertices;

C4) for every edge sharing an end vertex with the edges just coloured, reduce the value of dblMaxChoice by 1 for each instance of sharing;

C5) select one of the edges with the smallest value of dblMaxChoice, and place this at position 1 in the list of edges to be coloured;

C6) reduce dblMaxChoice for every other edge by 1 for every vertex it shares with this edge;

C7) repeat the preceding two steps, every time placing one of the edges with smallest dblMaxChoice at the next highest position in the list. Continue until the list is fully ordered;

C8) assign the next edge to be coloured the first colour which is free at both end vertices;

C9) if no colour is free at both ends, then remove the previous colour assignment (this is termed "backtracking") and consider the next colour which was free at both end vertices of that edge;

C10) repeat the preceding two steps until either the process has backtracked to the first edge to be coloured and there are no more colours to try, or all of the edges have been coloured.

This procedure has the capacity to explore every possible colouring before giving up, but will in general backtrack a lot more times than is optimal, so that the time taken in colouring may be excessive. This is because the procedure will often find that no common colour is free at both vertices at step C8.

To reduce the amount of backtracking in such a case, the following method, which corresponds to the method published by König with his theorem, may be used. This handles the case where a timeslot is free at each end of an edge, but is a different timeslot at each vertex. This method attempts to reassign existing timeslot allocations until a common timeslot becomes available. Therefore, instead of backtracking when there is no common colour free at both ends of an edge, König's method may be attempted at step C8. If this fails, then the algorithm may backtrack.

In the basic algorithm steps described above, there was a once-only ordering of edges, carried out in steps C1 to C7. An alternative preferred implementation reorders every time an edge is coloured. Instead of maintaining a dblMaxChoice variable as previously described, at each colouring step a determination is made of how many colours are actually available for each edge and the edge having the least available colours is coloured next. This additional processing may save a greater amount of processing, avoided by reducing the quantity of back-tracking or reassignments by König's method. Because of the need to consider interference effects during each colour reassignment, König's reassignment method is less effective in the case of a mesh than in the standard graph colouring problem (for which it was of course designed).

III.3. Accommodating Intra-Mesh Interference

In order to obtain colourings that accommodate interference constraints arising from interference occurring between nodes of the mesh, two matrices are preferably used. The first is an interference matrix Inter[ ][ ] where Inter[i][j] indicates the degree to which edge [i] introduces interference to edge [j] in the case where both edges are coloured with the same frequency channel. Note that this matrix is not (in general) symmetrical: Inter[i][j] is not (in general) equal to Inter[j][i]. In order to set up Inter[ ][ ], a method of choosing signal levels for each edge must first be carried out.

Preferably, for each edge the signal power at the receiving end of the edge is chosen as the minimum level required to decode the signal at the receiver. This is generally determined by reference to the power level of noise in the receiving equipment, generally termed its "noise floor". The signal power level required will be a multiple of the noise floor. This multiple is generally termed the "demodulation margin". It may be different on different edges, for example as a function of the radio modulation being applied to the edge.

Such an approach to setting the received power levels generally acts to minimise the overall transmitted energy in the mesh and allows links to be operated at their maximum possible lengths. However, the dynamic range of the transmitter may be limited such that on some short links the minimum possible signal power at the receiver is greater than required to exceed the noise floor by the demodulation margin.

Preferably all radio links are operated such that the received power level for each edge is kept constant. As weather and other conditions vary, this requires the transmitted power for each edge to be adjusted, to compensate for varying levels of power loss along the link. Preferably this is achieved by a technique of feedback on each link, whereby the receiving end of the link indicates to the transmitting end how much the transmitting end should increase or decrease its transmitted power level in order to restore the received power level to its desired level.

For each edge, a maximum transmit power is preferably chosen, such that the link is able to operate at some maximum level of adverse weather and other conditions. If the feedback from the receiver indicates that more power is required than this maximum, then the transmit power is held at this maximum. For example, in a particular location it may be known that a certain level of rainfall is exceeded on average for 0.01% of the time; a maximum transmit power that permitted the link to operate at this level of rainfall would be required in order to allow the link to function for the remaining 99.99% of the time. Preferably, the maximum transmit power is increased to allow for any power setting or measurement tolerances or errors in the radio system, within both receiver and transmitter, thus ensuring that operation for such a percentage of the time can in practice be achieved.

Given the set of received power levels and demodulation margins, a matrix Allowed[j] can be constructed to represent the maximum level of interference allowable at the receiving end of an edge, this being an interference level which lies below the received signal power by the demodulation margin plus any allowances required for tolerances or errors of the type described above.

Having determined the maximum transmit power for each edge, Inter[i][j] can now be set up. Since in the preferred embodiment of the mesh both edges i and j correspond to pairs of directional antennas aligned along each of the edges, the interference from edge i onto edge j will in general be reduced according to the extent the antennas are aligned away from the interference path. The interference will also depend on the weather and other conditions.

In one preferred implementation, the interference level is calculated according to the weather conditions that will produce the maximum interference to edge j, but based on the signal level calculated for the weather conditions that produce the minimum received signal on edge i. This allows for correct operation in the presence of weather fronts, for example where the path of a link is experiencing heavy rain, so that its transmitted power is increased, but the interference path is not experiencing rain, so that the interference is not diminished by rain.

In another preferred implementation, the interference level is calculated as the greater of:
  that occurring when both signal and interference paths experience one extreme of weather conditions; and,
  that occurring when both signal and interference paths experience the other extreme of weather conditions.

This second approach is based on the premise that severely different conditions between signal and interference paths occur very rarely and can be included in the percentage of the time for which a link may not function correctly. This approach may be preferred to the previous one since it allows for substantially reduced margins between signal and interference and hence increases the traffic density that can be supported using a fixed allocation of transmission channels.

In the case where each antenna is associated with a separate radio receiver and transmitter unit, the interference is preferably calculated with reference only to the antenna positions corresponding to the relevant edges. As noted above, where multiple antennas are grouped with a common radio receiver and transmitter unit, this in practice is likely to give rise to interference through all the antennas thus associated, preferably diminished in the case of the antennas not allocated to the link by an isolation margin implemented in each node. In order to determine the interference effects allowing for grouped antennas in a static operating mesh, the worst case interference arising is determined by considering all combinations of:
  any one of the grouped antennas at the source node for the interference; and,
  any one of the grouped antennas at the receiver node for the interference.

Preferably the case is also accommodated of an antenna within such groups that is not assigned to either of the edges and which is oriented in an arbitrary direction. As noted above this prevents interference effects arising specifically during antenna movements, such as may occur for example during an adaptation sequence. This case can be accommodated by considering all four combinations of two cases of antennas at the source node and the receiver node for the interference: the two cases are the antenna which is assigned to the edge, at its assigned orientation, plus another antenna in the group, oriented directly towards the other node but subject to the isolation margin.

Having determined:
  the levels of relevant interference from each edge to each other edge; and,
  the total allowed interference into each edge;
this information can be used to modify the behaviour of the colouring process previously described.

When a colour is assigned to an edge, then in the case where multiple frequency channels are available, each assignment preferably includes a channel number. The channel number will in general affect the interference with other edges. Preferably the algorithm attempts first to allocate the lowest channel number in all colours and considers other channels only in the case described below.

When a colour is assigned to an edge [i], this colour becomes unavailable for all the edges [j] for which it would cause the total interference in that colour to exceed Allowed [j]. Note that it is not the same as using a colour at both end vertices of the edge, because the colour still remains available for other edges terminating at either end of edge [j] if they do not suffer interference from [i].

The preferred algorithm therefore applies the condition that there may not be excessive interference between a newly coloured edge and the existing coloured edges, in addition to requiring the same timeslot to be available at either end vertex of an edge. If this rules out all timeslots for the edge, considering only the lowest frequency channel, then consideration may be given to use of other frequency channels, preferring the lowest numbered useable channel.

Note that in the case where a source of and receiver of interference are located close to each other, transmissions in a specific timeslot will typically cause interference only in the same numbered timeslot. However, in the case of greater separations, interference may additionally or alternatively occur in following timeslots. This is preferably allowed for in determining the interference suffered. In this regard, it should be recalled that because the timeslot pattern repeats, Timeslot number 1 is the timeslot following Timeslot number numTimeSlots.

Some variations can be made to the above procedures, and these will now be discussed.

III.4. Constrained Colouring

Where a first mesh is currently being operated and it is proposed to change to a second mesh, for example as a step in a mesh adaptation, there will in general be a set of edges that occur in both meshes. Preferably a colouring can be calculated for the second mesh such that as many common colours from the first mesh are retained as possible. This is termed herein "constrained colouring".

In the following, a half-link is defined as the set of edges that are used to transmit from node N1 to node N2. A preferred method for constrained colouring divides the colouring process into three parts. Part 1 deals with each half-link that requires the same number of or more edges to be assigned in the second mesh than in the first mesh: the colourings for this half-link from the first mesh are simply copied to the second mesh; any additional edges required for these half-links will be coloured in Part 3. Part 2 deals with all other half-links that occur in both the first and the second meshes. As these were not dealt with in Part 1, they therefore have fewer edges to colour in the second mesh than in the first. For these half-links, the full colouring algorithm as above is run, but for each edge the only candidate colourings allowed are those which were used in the first mesh. Part 3 then deals with the additional edges for half-links which require additional edges to be coloured, plus all new half-links. In Part 3, the colouring process is run entirely unmodified. Note that backtracking can occur only in Part 3 but may alter colourings that were assigned in Parts 1 and 2.

Preferably, a time limit can optionally be set for a constrained colouring computation, for example the time limit being a small multiple of the time taken to carry out unconstrained colouring on the second mesh. This prevents the computation being continued in the case where substantial backtracking occurs, and where the resulting colouring for the second mesh is unlikely to be usefully more similar to the first mesh than for unconstrained colouring, due to the changes made during backtracking.

III.5. Concatenation

The colouring process can be enhanced to produce meshes that require the use of a reduced number of frequency channels in the case where the mesh radio equipment supports concatenation of timeslots, which will now be discussed.

Typically only p %, being less than 100%, of the duration of a timeslot is used for transmission of traffic. The remainder is reserved both for overhead transmissions used for example for radio link maintenance and also to allow a "guard band". One reason for employing a guard band in the context of the preferred mesh is to ensure that, taking account of the time of flight of a radio signal sent in a timeslot from node N1 to node N2, the signal has been completely received before N2 requires to begin communication with another node during the following timeslot.

If C consecutively numbered timeslots are concatenated, this means they are used on the same half-link and with the same additional colouring parameters, such as power level and frequency channel number. Therefore the transmitting node can transmit continuously through the C timeslots, thus utilising 100% of the first C−1 timeslots plus p % of the final timeslot in the concatenation. This can reduce the number of timeslots required to carry a given quantity of traffic. This is turn will reduce the number of edges required at some vertices; in practice these are usually the most constrained vertices, which means that the colouring task can be potentially made to use fewer frequency channels.

In one preferred implementation, the total capacity required on all half-links should be such that this capacity can still be provided in the event that no concatenations are used, without requiring the number of edges available at any one vertex to be exceeded. In such a case, successful colouring of concatenations can assist in increasing spectral performance but it is not a precondition for achieving the specified capacities.

In order to take advantage of concatenations, the colouring algorithm is preferably aware of the total capacity required on each half-link, of the capacity obtained from 100% usage of a timeslot, and also of the value of p. It should be noted that the value of p in general depends on the physical length of the half-link.

Given the above information, it is possible to compute all the optimum concatenations for a mesh. On any half-link, a concatenation of C timeslots is beneficial if its use on the half link in place of unconcatenated timeslots would allow at least one timeslot less to be used on the half-link to provide the total required capacity. For a half-link for which at least one beneficial concatenation exists and for which up to D timeslots can be dropped by use of one such, the best single concatenation is the shortest beneficial concatenation, being of length B timeslots, which allows D timeslots to be dropped. If the best single concatenation cannot be split into two or more smaller concatenations that use a total of B timeslots and allow a total of D timeslots to be dropped, then the best single concatenation is the optimum concatenation for that half-link. Otherwise the optimum concatenations for the half-link are such two or more smaller concatenations. Preferably, where more than one set of such smaller concatenations exists, the optimum concatenations are that set with the smallest maximum length of any of the smaller concatenations.

Given that optimum concatenations exist for a subset of the half-links in some mesh, the colouring algorithm can be modified to incorporate them. Preferably, all such concatenations are coloured completely at the start of the colouring process, instead of starting at a vertex with the maximum number of edges. The optimum concatenations are preferably coloured in descending order of C. For colouring of concatenations, the colouring algorithm looks for a consecutive block of C timeslots that are usable with a single value of power settings/frequency channel number. In each case, if none such is available, the full number of unconcatenated edges must be coloured instead. After attempting colouring of the concatenations, the process of colouring the remaining single edges then proceeds as previously described.

Where constrained colouring and concatenations are both used, then preferably in Parts 1 and 2 of the constrained colouring method discussed above all unchanged optimum concatenations from the first mesh are copied as a part of the constrained colouring process described above. Then Part 3 of the constrained colouring method discussed above begins by attempting to colour first the remaining concatenations and then all remaining single edges.

III.6. Coexistence with Other Radio Systems

There may be at least one "alien" radio system (being a radio system that is not part of the mesh), comprising a transmitter and/or a receiver, operating at a frequency close to or the same as one or more frequency channels used by the mesh, such that one or more edges of the mesh, if inappropriately coloured, will suffer interference from or cause interference to such alien radio system. Given some information about the characteristics of such alien radio system, additional steps are preferably added to the colouring process such that a colouring is produced in which such interference does not occur.

Examples of interference to and from a mesh will now be given.

III.6.1. Interference to a Mesh

There may be a radio system operating in the same geographic region as a mesh which uses frequency channels close to those used in the mesh. This may for example be a cellular radio system. Information on the location, frequency use, transmission power and antenna profiles of the base stations in such a cellular system will generally be obtainable. Such base stations will emit high power signals which may potentially cause interference to one or more edges of the mesh.

More generally, there may be an alien transmitter of interference, whether in the same geographic region as a mesh, close to it or remote from it, transmitting at frequencies close to or the same as one or more of those being used in the mesh, such that one or more edges in the mesh may potentially receive interference from such alien transmitter. An example of a remote transmitter that may cause interference is a satellite radio transmitter. The existence of such a transmitter, and its location and other characteristics as above, may be notified to the operator of a mesh system and thus constitute information that can be used during the colouring process.

If information about an alien transmitter is not available or for safety in any event, the mesh radio devices at the nodes may assign some time allocation to detecting significant levels of interference from alien transmitters. Information from such measured levels can then be used during the colouring process. For example, as described elsewhere herein, timeslots might be reserved for interference measurements. In the present context, some of these reserved timeslots may be allocated such that no mesh devices transmit during these timeslots. In such timeslots, the mesh devices can be arranged to measure total interference due to alien devices, carrying out such measurements for one or more frequency channels and one or more antenna positions.

In some cases, the exact location of an alien transmitter may not be known, or it may vary over time, and thus it may be desirable to produce a colouring that tolerates transmissions from anywhere in some geographic region up to some interference power. For example, there may be a radio network in a nearby region whose topology varies over time and whose maximum transmitting power is known.

In all of these cases, the total interference from alien transmitters may be calculated for each combination of an edge of the mesh and frequency channel available for use in the mesh. Where interference has been measured, its value can be included directly in the calculation of the total interference. Where the interference is predicted to come from a particular transmitter location or region, its worst case value can be calculated taking account of the antenna position, antenna profile and channel rejection of the mesh device receiving the interference.

As a part of the preferred colouring process described above (see section II.3 above), a transmit signal power level for each edge in the mesh will have been chosen. Since in the preferred embodiment the transmit signal level for each edge has been determined, the threshold level of interference on each edge, above which the edge will not operate correctly, can also be determined. If an edge/channel combination shows interference from alien systems above this level, that edge/channel combination can be marked as not useable. Otherwise, the alien interference can be combined with mesh interference during the colouring process.

In general, the alien transmitter will not use a timeslot pattern that is the same as that used in the mesh. In such cases, the calculated interference is preferably regarded as applying to all timeslots if used on a particular frequency channel at a specific edge, rather than more specifically to individual edge/timeslot/frequency combinations.

III.6.2. Interference from a Mesh

Examples of interference from a mesh include the case of a radio system operating in the same geographic region as a mesh which uses frequency channels close to those used in the mesh. This may for example be a cellular radio system. In such a case, information on the location, frequency use, interference susceptibility and antenna profiles of the base stations in such a cellular system will generally be obtainable. One or more edges of the mesh may potentially cause interference to such a base station.

More generally, there may be an alien radio receiver, which may be in the same geographic region as a mesh, close to it or remote from it, receiving at frequencies close to or the same as one or more of those being used in the mesh, such that one or more edges in the mesh may potentially cause interference to such alien receiver. The existence of such a receiver, and its location and other characteristics as above, may be notified to the operator of a mesh system and thus be information that can be used during the colouring process. An example of such a receiver is a radio telescope which detects signals on frequencies the same as or close to one or more of those used in the mesh.

In some cases, the exact location of an alien receiver may not be known, or it may vary over time, and thus it may be desirable to produce a colouring that generates no more than a certain interference level in a defined geographic region. For example, there may be a radio network of known characteristics in a nearby region, the position of whose individual radio systems is not known.

As mentioned above, as a part of the preferred colouring process described above (see section II.3 above), a transmit signal power level for each edge in the mesh will have been chosen. Given such signal levels, the worst case interference from each edge to each alien receiver position or region can be calculated for transmissions on each frequency channel used by the mesh. Such worst case interference calculation preferably takes account of the orientation of the mesh transmitter compared to the alien receiver and the antenna profile of the mesh transmitter. Where suitable information is available, it also preferably takes account of the orientation of the alien receiver and its antenna profile. As a result of this process, each combination of edge and frequency channel is marked to indicate whether the channel may be used on that edge: a particular combination of edge and frequency channel may be used only if the level of interference to all alien receivers is below the level that is acceptable.

In general, the alien receiver will not use a timeslot pattern that is the same as that used in the mesh. In such cases, the calculated interference is preferably regarded as applying to all timeslots if used on a particular frequency channel for a specific edge, rather than more specifically to individual timeslot/frequency combinations.

III.6.3. Accounting for Alien Interference During Colour Choice

As a result of carrying out the steps described above, each edge/channel combination can be marked to indicate:

if the edge/channel combination is unacceptable, on considerations of interference between the mesh and alien systems;

if not, the level of interference arising at the edge/channel combination due to alien transmitters.

The preferred colouring process described above can take these factors into account, in the same way as it takes into account interference from other edges of the mesh, each time a colour is assigned for use on an edge. In this regard, reference is again made to section II.3 above.

Provided that the number of unacceptable edge/channel combinations is a small proportion of the total combinations, then a colouring that accommodates such coexistence requirements can typically be achieved without alteration to the number of frequency channels required to operate the mesh.

An analysis of a typical cellular system co-located with a typical mesh shows that the proportion of mesh transmitters that can potentially provide an unacceptable level of interference to a base station located in the same operating region is no more than 2.5%, and this can only for one specific channel out of those available to the mesh transmitters. This figure also takes no account of the orientations of the mesh edges linked to these mesh transmitters. Given that the preferred mesh system uses highly directional antennas, the mesh transmitter will be a potential interferer to a base station only for a specific subset of the possible edge orientations at the mesh transmitter: this further reduces the number of unacceptable edge/channel combinations. A similar argument applies to the proportion of edges that can potentially receive interference from a base station.

In practice, a "safety zone" can be defined around a cellular base station such that it is only mesh transmitters within the safety zone that may (but which do not necessarily) cause interference to the base station, whereas any mesh transmitter outside the safety zone will not cause interference to the base station (because attenuation of signals transmitted by the mesh transmitters causes any interference to drop below an acceptable level). In a typical example, the safety zone around a base station may have a radius in the range 60 to 200 m or so. In the preferred colouring process which takes into account interference to an alien receiver, it may be sufficient to take into consideration transmissions only from those mesh transmitters that lie within the safety zone. This may assist in speeding up the calculation process but is not essential to the more general method described above.

The following alteration to the colouring procedure is preferably used to avoid or minimise the requirement for additional frequency channels in a case where coexistence constraints affect a significant proportion of edge/channel combinations. The frequency channels are ordered in descending order of the number of edges for which each channel is not available. When a frequency is to be assigned to any edge, the channels are considered as candidates according to this order until a channel is found that is acceptable on grounds of interference levels (both within the mesh and with respect to alien systems). The effect of this order of consideration is to make most use of frequency channels that have the greatest alien interference constraints, thus giving the best choice when an edge with severe alien interference constraints must be accommodated.

It is to be noted that interference to and from an alien radio system can effectively be avoided by appropriate colouring of the mesh network without requiring any specific coordination between the operators of the mesh network and the alien radio system. There is also typically no appreciable effect on the spectral efficiency of the mesh network.

III.7. Other Variations

When assigning a colour for a new edge, and where there are multiple choices of timeslot for this edge, strategies for choosing between them include:

a) prefer the least-used timeslot (by number of edges assigned so far), or b) prefer the most-used timeslot (by number of edges assigned so far), or c) choosing the timeslot which reduces the options for the smallest number of edges yet to be coloured.

Note that the choice of timeslot will not alter the number of other edges affected by interference, except in cases where cumulative limits are exceeded. Here the timeslot choice is made on topological grounds only. For example, (c) aims to introduce as little as possible new topological constraint.

Option (c) seeks to maximise the number of timeslots from which a selection can potentially be made, throughout the colouring process. Option (a) aims to utilise timeslots as evenly as possible, in order to reduce the probability that a dead-end position is reached in all of them due to interference combinations. Option (b) operates on the basis that by leaving some timeslots as little used as possible, these can then be used to resolve the most restrictive interference constraints. Selection of the lowest numbered useable channel when no timeslot choices are available using the lowest channel number operates on a similar basis to option (b), since it leaves the highest numbered channels as little used as possible.

In some meshes, there will be nodes that are sited very close to each other. Examples are at a TNCP 4 where multiple nodes may be co-located to reduce the cost of access to a backhaul network. In such cases, depending on the sizes of antenna off-centre rejection and the demodulation margin, it may be very unlikely that:

a timeslot used for transmission at one of these nodes can be used for reception at another; and that:

the same timeslot and channel combination can be used for reception at two such nodes.

Since these may be very tight restrictions on the colouring process, then in line with the general approach above, they are preferably addressed first, to avoid substantial back-tracking. In one preferred implementation therefore, whenever an edge on one link to or from such a node is coloured, an attempt is made to use the same timeslot number to colour an edge on each other closely located node.

For convenience, all of the above techniques are referred to generally as "colouring" in the rest of this specification, although it will be appreciated that this term is used only as an analogy and that the techniques represent more than just colouring as normally defined or applied in graph theory.

IV. Elements of Specification of Networking Equipment

The following properties of networking equipment are required or advantageous in one or more of the adaptation methods described herein.

IV.1. Recolouring of Radio Links

Where a radio link between two nodes, N1 and N2, uses one or more timeslots for transmission from N1 to N2, it is possible for the timeslots used from N1 to N2 to be altered, or any of their radio operational parameters to be altered, without interruption to operation of the link, provided that both before and after the alteration at least one timeslot is in use from N1 to N2. Such an operation is termed herein "recolouring the link" or similar. Typically, for recolouring to be carried out without interruption to the operation of the link, N1 and N2 need to have a shared knowledge of the time at which it will occur.

In one implementation of recolouring, an external piece of apparatus directs the two nodes as to the time at which they should carry out this recolouring. This is described in more detail below. In another implementation, the two nodes implement a signalling protocol by means of which they agree upon the time at which the recolouring is to occur. This signalling protocol between N1 and N2 may follow the same or a similar design to that described below between an external piece of apparatus and a node. Alternatively, it may be some other signalling protocol.

In any event, the effect of the preferred embodiment of recolouring of a link is uninterrupted link operation. (It should be noted that the recolouring may cause the network delay experienced by traffic using that link to alter. For example, this may arise because of changes to timeslot sequences on a path, such as timeslot allocations 1,3,5 on links 11,12,13 which comprise a contiguous path changing to timeslots allocations 1,7,5, the delay to traffic using that path thereby being increased by one frame period.)

IV.2. Route Switching

It is possible for a traffic path that is being used to carry a service between two nodes to be altered without disruption of the service.

Figure 4:
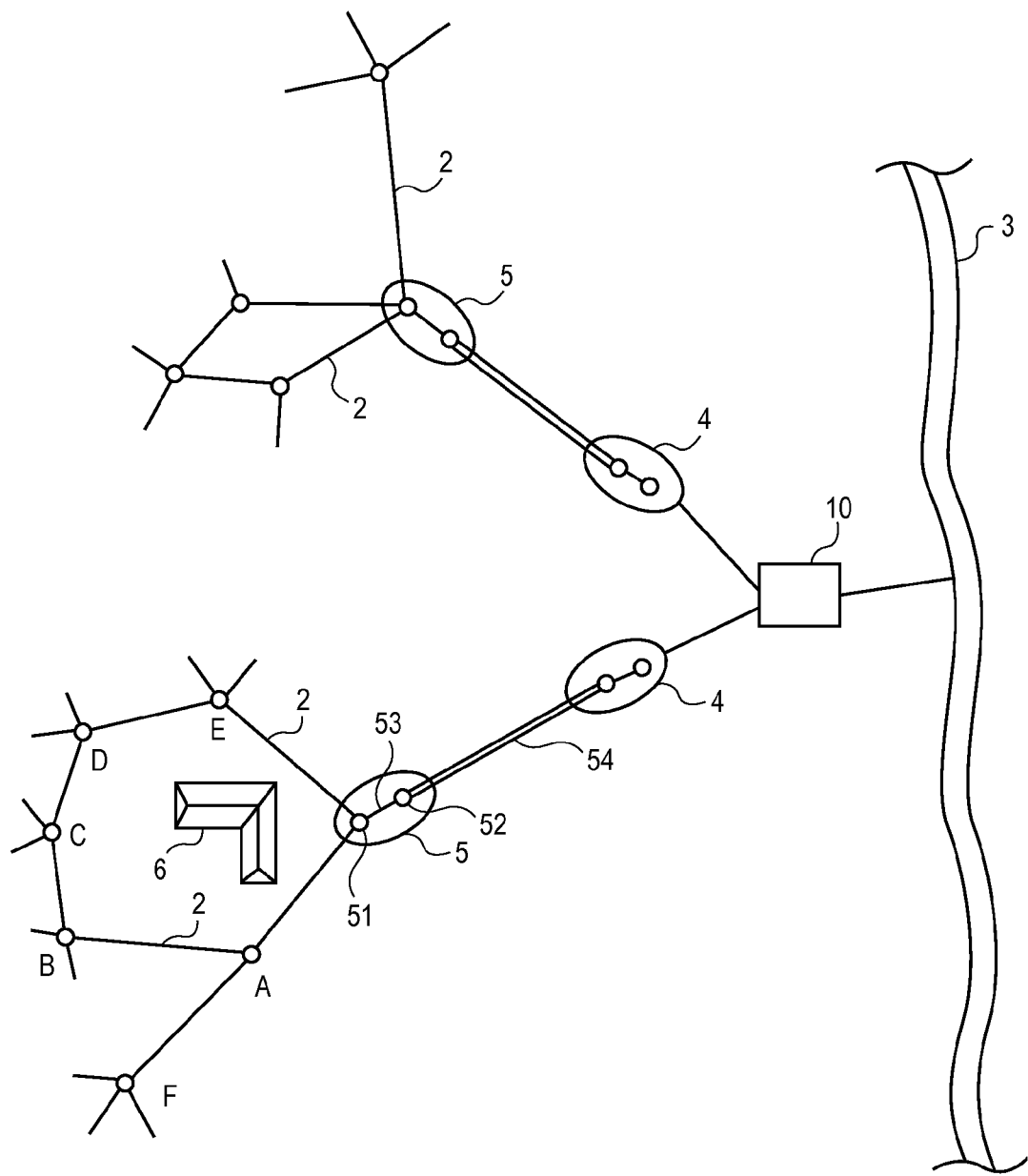
FIG. 4 shows schematically another example of a network provided by a mesh of interconnected nodes and which is connected to a trunk via a switching centre.

In a preferred implementation, the alteration or changeover is carried out by means of two route switching entities, both of which lie on both the old and new paths. In a case where the service is carried between two nodes in the mesh, the preferred locations for these two entities are at the nodes which are the service endpoints. Referring to FIG. 4, in the case where the service is carried between a node in the mesh and an external network or trunk 3 (i.e. the case of an access network), the preferred locations are one entity at the node which is a service endpoint and the other at a switching centre 10 interposed between the TNCP(s) 4 and the trunk 3, this being the point where traffic converges beyond the TNCP(s) 4.

These locations for the route switching entities are the most preferred since they allow route switching to occur between any pair of paths that can be produced by the preferred formation process. If for example the route switching entities were located at just any pair of nodes lying on a traffic path in use for the time being, then route switching could be carried only onto paths which differed from that path between the pair of nodes in question. For example, if the route switching entity were to be moved from the switching centre to a TNCP 4, this would restrict the paths available to the formation process to those paths passing through the same TNCP and hence would degrade the results of an adaptation based on the preferred formation process. Alternatively, it would require alteration to the formation process to allow paths routed via one TNCP to be routed onwards to another TNCP via the trunk 3.

In a preferred implementation of route switching, the route switching entities permit one set of paths, namely a main path plus one or more back-up paths, to be replaced by a new set of paths of the same description. In one embodiment, all paths are at any time designated disabled or enabled, the enabled paths being further designated main, first back-up, second back-up, etc. In order to carry out route switching, first the new set of paths are configured between the two route switching entities and designated disabled, then route switching occurs, in the course of which paths are redesignated, then finally the old set of paths are removed.

It is not necessary for a path to be switched between disabled and enabled: it may alternatively be switched between two different enabled path classifications, such as main and second back-up. Furthermore, in a multi-step adaptation, route switching may occur multiple times. One path may at one stage be changed from enabled to disabled and at a later stage back to enabled. Preferably, all paths used for the same service before, during and after an adaptation are compared during the planning of the adaptation and paths that are enabled two or more times during the steps, with the same or different designations, are determined. Those paths that are required at any stage during or at the end of the adaptation but which are not enabled in the initial mesh are added to the network before the route switching operations; only those that are left disabled at the end of the adaptation are removed from the network after the route switching operations.

According to the nature of the service being switched, so various procedures may be adopted to carry out the actual route switching operation, while meeting the preferred requirement not to disrupt the service. What procedure is acceptable will depend on the nature of the service.

IV.3. "Synchronised" or "Simultaneous" Mesh Changes

It is possible for two or more networking devices to make changes to their operating states at an identical or substantially identical time. In the preferred implementation, these changes include any number of recolouring operations at plural nodes and any number of route switching operations at plural route switching entities.

Since it is possible to recolour all the links at a single node simultaneously, this preferred implementation allows links to be recoloured in combinations that could not occur individually, such as for example the timeslots in use on a single link being exchanged. By extending this across part or the whole of a mesh, reallocations of timeslots can be carried out in a single step which either would not be possible individually or which would require a long sequence of steps.

Since it is in general possible to carry out multiple route switches simultaneously, this preferred implementation allows paths to be altered in combinations that could not occur individually without service interruption, such as for example where each takes advantage of network capacity allocation relinquished by the other. By applying this across part or the whole of a mesh, reallocations of capacity can be carried out in a single step that either would not be possible individually or which would require a long sequence of steps.

Since it is possible to recolour one or more links and carry out one or more route switches simultaneously, this preferred implementation allows link capacity to be reallocated by recolouring (since recolouring can alter the number of timeslots allocated to each direction on a link, provided that at least one timeslot is allocated before and after the recolouring) at the same time as the traffic is route switched onto paths which as a result gain the capacity to carry this traffic. Once again, this allows a set of changes to a mesh in one step that either would not be possible individually or which would require a long sequence of steps.

IV.4. Shared Time Reference

Execution of synchronised changes at plural networking equipment devices is facilitated if all nodes in the mesh and, where used, an external device which commands the changes (referred to herein as the "Mesh Change Controller" or "MCC") have a shared knowledge of time, at least within a predetermined accuracy. For example, a timeslot recolouring is preferably effected at a common defined timeslot boundary; for route switching the accuracy is preferably within the minimum delay time for a traffic path across the mesh.

In one preferred implementation, each node is equipped with a time receiving device that can obtain timing signals from a time dissemination service. An example of such a service is the Global Positioning System or GPS, which allows GPS receivers to determine not only their positions but also the time.

In another preferred implementation, one node acts as a master timekeeper and sends messages relaying the time to each node to which it is linked. These nodes in turn relay the time to each node to which they are linked. Each node also indicates, in the same or a separate message, the number of links across which the time information has been relayed since it was transmitted by the master timekeeper. This allows each node to discard messages which have not reached it via the shortest available number of hops from the master timekeeper. Each node then relays the time across all other links apart from the link via which it has the path with the shortest number of links to the master timekeeper. (This method of relaying information along the shortest paths from a single source is similar the methods used to build distance vector routing tables in the RIP routing protocol associated with data communications networks using for example the IP and IPX communications protocols.) This has the effect of disseminating time information to all nodes in the network using the minimum number of message transmissions and across the smallest number of links to every node, it prevents messages circulating in loops and it allows for new paths for the time relay messages to be chosen automatically when links are added to or removed from the mesh. This is accomplished by allowing a node to "time out" a link across which no relays have been received over some period, and upon that timeout being reached to chose afresh between such other links over which relay messages are still being received.

In a third preferred implementation, each of a subset of the nodes in the mesh is equipped with a time receiving device that can obtain timing signals from a time dissemination service and each of these nodes then acts as a master timekeeper. In this case, the distance vector methods above operate to ensure that each node that is not a master timekeeper relays the time information that it is receiving from the master timekeeper that is the smallest number of links distant from it. In this arrangement, only a subset of nodes must be equipped with special time receiving devices, but the failure of a single master timekeeper does not prevent all other nodes in the mesh from receiving time messages. (A node can redesignate itself as no longer a master timekeeper and in doing so become a slave. This allows a node to continue operation where only its time receiving device fails.)

IV.5. Preload and Trigger Functions

As mentioned above, an adaptation from an initial mesh configuration to a final mesh configuration is preferably carried out as one or more change steps, each step possibly including one or more recolouring operations and/or one or more route switching operations. Plural networking equipment devices can preferably carry out plural such operations simultaneously.

As noted above, the time taken to carry out such steps will typically affect the overall reliability of the network. This is particularly the case where the back-up capability of the network is lower during particular steps than it is before and after the adaptation. Therefore, it is beneficial to minimise the amount of time required to carry out each step.

The probability of failures during each step will also typically affect the overall reliability of the network. In addition to the types of failure described above, consideration is preferably also given to failures in the adaptation control process itself. For example, the effect of control messages being lost or corrupted between the controlling system and the network devices themselves is preferably considered. The control messages are preferably sent across the mesh links themselves. For any message sent over any communications channel, there is some probability that it becomes corrupted or lost. Typically, some type of checksum is appended to control messages sent over a communications channel, by means of which zero of more of errors in the message can be detected and corrected and zero or more further errors can be detected but not corrected. If errors are detected but not corrected, the control message is typically discarded and the devices which are communicating across the channel carry out the same procedure as is the message had been lost.

It is thus in general beneficial to carry out an adaptation using a small number of steps, to minimise the time taken for each step and to maximise the probability that each step is commanded successfully. An adaptation consisting of a sequence of a small number of steps may often be preferable to an alternative one with a larger number of steps, even where the back-up capability of the network is much reduced during the smaller sequence, if for example the time per step is small and the success probability of the step is high.

The commanding of change steps is preferably carried out by a preload and trigger sequence, an example of which is described in detail below. The preload and trigger sequence is designed to minimise the time taken for each step, to maximise the probability that each step is commanded successfully, and to provide a reliable method to synchronise multiple changes at plural nodes.

In summary, in the preferred embodiment, the change steps comprising a complete adaptation sequence are separated by the MCC into one or more groups, such that all of the changes in one group are required to occur simultaneously, and each group is assigned a "trigger number". The MCC transmits the relevant information about all of the groups to each node which will take part in any of the synchronous changes during the adaptation, including the trigger number associated with each change. Once all of the information has been transmitted to the relevant nodes, the MCC then causes each change step to occur by sending trigger execution requests to all nodes involved in that trigger: a trigger execution request is an instruction to carry out all the changes associated with that trigger at a specified time. After the specified time for a trigger, the MCC polls each node involved to determine if the change has occurred successfully. If so, it can then command the next trigger at a new specified time. The trigger time is chosen by the MCC only once it is ready to send the trigger execution requests for that trigger number. This allows the MCC to proceed as quickly through the change sequence as it is able to determine that each previous step has succeeded.

In order to support triggered execution of mesh changes, the nodes are preferably able to store information about both future route switching operations and future recolouring operations.

In the case of route switching, the process is preferably carried out in four separate parts. First, information concerning any new paths required to support the route switching change is installed into the relevant nodes with the paths being designated disabled. Then the information about the required route switching operations is sent to the route switching entities, labelled with the relevant trigger number(s). Next the trigger execution requests are sent to the route switching entities by the MCC. Finally, the paths that are not required in the final mesh, and which are therefore designated disabled at this point, are removed from the relevant nodes. It should be noted that the addition and removal of paths requires no synchronisation; only the route switching operation itself is required to be executed by the sequence of preload and trigger. If an adaptation change sequence includes route switching operations at more than one trigger number, then preferably all of the new paths that will be redesignated as enabled at any trigger number are loaded before information about the required route switching operations is preloaded into the route switching entities.

In general, an adaptation will include both recolouring and route switching, so that the four steps above become:

1. install all new required paths;
2. preload all route switching and recolouring information;

3. command the triggers;

4. withdraw all paths not required in the final mesh.

Only the third of these stages involves any change in the operational state of the mesh. In this stage, the amount of information that must be exchanged between the MCC and the nodes is nearly minimised since it consists only of the trigger execution requests. (The time for each trigger could have been preloaded at the second stage, to reduce the content of the trigger execution requests. However, it is included as a separate stage in order to allow the trigger execution to proceed at a variable rate according to the feedback of status from the nodes and hence to proceed at the maximum rate overall.)

Apart from the third stage, the exchange of messages occurs during a period of stable operation of the mesh; the speed of exchange and the exchange protocol are not important to the success of the adaptation, provided that reliable delivery of the all the relevant data is ensured. During the third stage, the manner in which the trigger execution request mechanism operates has a direct bearing on the success of the adaptation.

The trigger execution request mechanism preferably operates using short request messages. Since the communications channels across which these messages pass have a finite probability that each symbol of transmitted information is corrupted, then the shorter the message the lower the probability that it is corrupted. Where the transmission medium supports messages with a fixed minimum length (such as a radio link with cell-based framing), the message is preferably of that minimum length. The format of the message preferably incorporates a checksum as described previously.

The trigger execution request procedure preferably includes the following message types:

trigger_activate(trigger number, activate time)
trigger_activate_acknowledge(trigger number, accepted?)
trigger_abandon(trigger number, activate time)
trigger_abandon_acknowledge(trigger number)

and also preferably trigger_rollback(trigger number, activate time)
trigger_rollback_acknowledge(trigger number, accepted?)
roundtrip_measure(sending time)
roundtrip_measure_acknowledge(sending time, responding time)

Those messages having names ending in acknowledge are sent from node to MCC, and the others are sent from MCC to node.

A node receiving a message X always replies with a message X_acknowledge. In addition:

for trigger_activate, the node notes the number and time and sets the trigger as pending. It replies accepted=YES in the absence of problems that would prevent it from executing the trigger; otherwise it replies accepted=NO.

for a trigger_abandon, if the trigger is pending, it marks it as no longer pending.

When the time for a pending trigger is reached, the node carries out all actions associated with the trigger.

There are multiple methods of operation possible at the MCC. The following method is preferred for normal use. It requires a knowledge of the round trip time to the currently most distant node from the MCC. Preferably, the MCC knows the list of nodes to which each trigger must be applied and sends messages to these nodes only.

The round trip time may be determined by calculation, given a knowledge of the network topology. Alternatively, it may be measured, by use of the roundtrip_measure and roundtrip_measure_acknowledge messages, whereby the MCC sends one or more roundtrip_measure messages to one or more nodes, each node responding each time with a roundtrip_measure_acknowledge message. The MCC can compare the sending time that it marked in the message (and which is returned in the acknowledge) with the time of receiving the acknowledge, to determine the round trip time. The responding time in the acknowledge can also be used to set the time in the MCC to that common time known in the nodes, if the MCC does not already know this time.

Given that the MCC knows both the round-trip time and the current time as known by all nodes, it preferably executes a sequence as follows. After selecting an activation time that is at least five round trip times after the current time:

at 5 round-trip times before the activation time:
the MCC sends trigger_activate to all nodes;
from then until 4 round-trip times before the activation time:
the MCC notes all acknowledges it receives;
at 4 round-trip times before the activation time:
IF any trigger_activate_acknowledge received had accepted=NO
OR the MCC has been notified of any fault arising in the network
THEN the MCC sends trigger_abandon to all nodes;
ELSE the MCC sends trigger_activate to all nodes from which a trigger_activate_acknowledge has not been received
from then until 3 round-trip times before the activation time:
the MCC continues to note all acknowledges it receives;
at 3 round-trip times before the activation time:
IF trigger_abandon already sent
THEN MCC sends trigger_abandon to all devices from which abandon_acknowledge has not been received
ELSEIF any trigger_activate_acknowledge received had accepted=NO
OR trigger_activate_acknowledge has not been received from at least p % of nodes
OR the MCC has been notified of any fault arising in the network
THEN the MCC sends trigger_abandon to all nodes;
ELSE the MCC sends trigger_activate to all nodes from which a trigger_activate_acknowledge has not been received
from then until 2 round-trip times before the activation time:
the MCC continues to note all acknowledges it receives;
at 2 round-trip times before the activation time:
IF trigger_abandon already sent
THEN MCC sends trigger_abandon to all devices from which abandon_acknowledge has not been received
ELSEIF any trigger_activate_acknowledge received had accepted=NO
OR trigger_activate_acknowledge has not been received from all nodes
OR the MCC has been notified of any fault arising in the network
THEN the MCC sends trigger_abandon to all nodes;
ELSE the MCC sends trigger_activate to all nodes from which a trigger_activate_acknowledge has not been received
from then until 1 round-trip time before the activation time:
the MCC continues to note all acknowledges it receives;
at 1 round-trip time before the activation time:
IF trigger_abandon already sent
THEN MCC sends trigger_abandon to all devices from which abandon_acknowledge has not been received
at activation time:
IF trigger_abandon has not been sent, the triggered changes should occur at all nodes.

The procedure above is aimed at achieving the result that either all nodes carry out the triggered changes or none of them do. If the trigger is abandoned, for example due to failure of a node to reply to the activation request, the whole process can be tried again.

In order to make the process more or less likely to achieve the above result, the length of and number of stages in the above sequence can be varied between changes to the mesh configuration. By this means, less important changes can be triggered quickly and more important changes more slowly.

In the following sections, the use of triggered interference measurements will be described. A failure to start such measurements does not lead to disruption; another start can be attempted if they fail, so that they are less important changes than a recolouring operation which, if only partially successful, may leave the network non-operational.

The synchronising property of the trigger protocol is useful for components of a mesh change that include recolouring and/or route switching operations that must occur simultaneously. It can also be applied more widely to any steps in a mesh change, including those which take a significant time. For example, one step in an adaptation might require the repositioning of a mechanically steered antenna followed by the start-up of a radio link when the new position is reached. This action can be assigned to a trigger number and preloaded with all of the other mesh change data. When the relevant trigger is activated, the antenna begins to move and at the end of its travel the radio link will start up.

Preferably the trigger protocol is used to initiate all changes that occur during the adaptation sequence, apart from the addition and removal of paths. This ensures that throughout the change steps, the minimum of information exchange and execution time are required. The MCC can poll to determine when each step has completed, which is a particularly useful capability in the case of operations such as antenna reorientation at they can take varying amounts of time.

The use of triggered changes throughout a mesh change facilitates recovery from problems that may occur during a change sequence. If a forward step in the process cannot be carried out for some reason, then it is possible to roll back the changes to the starting position, without the need to transfer any new information about a modified change sequence.

This is the purpose of the trigger_rollback message mentioned in the preferred embodiment above, namely to allow a sequence of mesh change steps to be reversed, if a problem arises during the sequence. Trigger_rollback and its acknowledgement can be used in the above sequence in place of trigger_activate in the above sequence at the MCC. At the nodes, if a trigger_rollback message is received, a reversal of the actions of the trigger number specified becomes pending; if not cancelled in time by an abandon, reversal will occur at the specified time.

The provision of a rollback function allows an escape procedure where an adaptation step sequence cannot be completed for some reason, such as failure of a link to start up or a potential interference problem being detected part way through the sequence. Like the forward triggering mechanism, rollback requires no data to be sent to the nodes, other than the rollback requests themselves, and hence provides a quick procedure for handling problems. Since the nodes have been preconfigured with all of the mesh change steps within a sequence, they can roll back as well as activate any commanded change step.

The ability to recover from errors in a mesh change quickly and with a minimum of data exchange is of significant benefit, since during a mesh change some network characteristics such as back-up capability may be temporarily diminished. This includes the case of errors in the form of link failures, which particularly affect delivery of control messages. The repeated transmission of a control message to a node which does not promptly acknowledge the message is thus an important part of the mesh change trigger procedure.

IV.6. Provision of Management Connectivity

In order to operate the mesh, there will normally be connectivity between each of the mesh nodes and one or more management systems. In general, this connectivity is required in order that the state of the network can be monitored from one or more control centres. In general, such connectivity would also be used in order to configure and reconfigure the nodes. In the context of adaptation, this connectivity can be used to send adaptation instructions from the mesh change controller to the nodes and to monitor the success of each adaptation change step.

It is highly desirable that this connectivity is achieved wirelessly. Preferably it is achieved via the same links that constitute the mesh. It is highly desirable that the management connectivity is at least as resilient as the traffic connectivity of the mesh. Whereas it may be acceptable that traffic connectivity is interrupted if all of the fixed paths associated with a particular service become disrupted as a result of one or more faults, it is highly desirable that the management connectivity be able to make use of any possible path from the control centre to any node: for example, provided there is management connectivity, this can be used to restore non-management or user traffic connectivity.

Maximum possible management connectivity is important when a series of adaptation steps is being carried out. This allows faults that occur during an adaptation to be detected and corrective actions to be caused to take place at the relevant nodes. However, the duration of an adaptation is a difficult period in which to ensure continued management connectivity, due to the changes to the network topology that are occurring.

Preferably, management connectivity is implemented by arranging for every node in the network, or at least those connected to plural other nodes, to function as a router for management traffic. A router in this context is analogous to the type of device typically used to construct data communications networks, such as for example make up the Internet. The management router function at each node has links to corresponding router functions at each other node to which it may from time to time have a wireless or other link.

Preferably each router operates by means of a "Shortest Path First" or "Link State" routing protocol. Such protocols are well described in the literature. A notable example and a preferable basis for implementation of the mesh management router function is the OSPF standard produced by the Internet Engineering Task Force as RFC2328.

In a link state protocol, every router broadcasts to every other router, by means of the network itself, information about its connections to other routers, termed "link state advertisements". These indicate both that the router exists and which links attached to it are operational. By this means, every router acquires a database of the topology of the whole network and news of any link state changes. When a link is discovered, fails or is restored to operation, each router receives notification via the broadcast mechanism. Each router then recomputes its routing table, based on each new piece of information, taken with the existing database that it holds. A routing table is a list of best routes from this router R to all other points in the network, in the form of "link L is the next hop on the best route to point P", where this router R is attached to link L. Since all routers hold the same network topology database and apply the same rules in order to compute their local routing tables, these routing tables have the combined effect that message from R to P will take the shortest path across the network to reach its destination.

A link state protocol requires each router to hold a large database compared with other routing protocols. However, the benefit compared to other protocols is that every router can immediately recompute its routing tables once it receives information about a topology change. This produces a fast convergence of the routed network upon a topology change taking place.

In some cases, the number of links on a path between R and P may not be the only determinant of the best path. For example, links may have very different traffic capacities, such that a path over three high capacity links is preferable to a path over two lower capacity links. The routing protocol can be made to take this into account by assigning a "cost" to each link, such that the lower the sum of the costs of the links on a path the more desirable it is, rather than considering for example only the number of links in the path. The costs of each link may be known to or configured into the routers that directly connect to the link in question; the cost may be notified to other routers in the link state advertisement broadcasts. By this means, the routers in the network achieve a consistent set of routing tables, taking into consideration the cost associated with each link.

The effectiveness of a link state protocol depends on the rate of changes in the network: despite the fast convergence, periods of significant change may lead to temporary suboptimal operation, in which for example the routing tables at every point are not consistent and a pair of directly connected routers might each believe that the best route to P was via a link to the other as next hop.

As one way of ensuring continuous and consistent connectivity in the context of an adaptation, where many links may be taken away or started up at once, some special modifications to the routing function may be incorporated.

The first preferred modification is that when a link is created, it is added to the routing databases with a very high assigned cost. (Very high means sufficiently high that it will never be used if a path via only low cost links is available.) This may be carried out by reconfiguration only of the routers at each end of the link, or alternatively the cost changes are notified to all routers simultaneously.

The second preferred modification is that the cost of links can be reassigned. Prior to deletion of one or more links, the links to be destroyed are reassigned a very high cost. Also, a link that was created with a high cost and is now stable can be changed to a low cost. Again, these cost reassignments may be carried out by reconfiguration only of the routers at each end of the link, or alternatively the cost changes are notified to all routers simultaneously.

The third preferred modification is that each router can be set into a "split table mode". In this mode, then for the cases of certain changes to the network topology, a router recalculates its routing table but keeps the result separate from the routing table used for forwarding data. The routing table that it continues to use for forwarding data is the one in use before split table mode was entered. When this mode of operation is cancelled, the latest recalculated routing table comes into use for forwarding data. Preferably, the certain changes to the network topology mentioned above are failure or restoration or creation of links which are assigned a cost higher than some threshold, plus the reassignment of the cost of a link. Preferably, if any other network change occurs, the recalculated routing tables are immediately placed into operation for forwarding data.

The combination of these mechanisms can be used to ensure best possible management connectivity during an adaptation. The preferred operation in the absence of any unexpected changes during the adaptation is as follows.

Where a step involves removing links, then, prior to the removals, the routers all enter split table mode. The links to be removed are all assigned a high cost, then after the time needed to recompute the routing tables, split table mode is exited. Since the mesh must remain fully connected after the links have been deleted, the new routing tables will not make use of any link that is about to be deleted, since there will always be a lower cost path available. When the links are removed, then since none of them was used in any routing table, the recalculations that follow from the link state advertisements advising their removal will not cause any change to the routing tables, such that the network will remain stable.

Where a step involves creating links, these can be created as new links with a high cost. The link state advertisements advising their creation will not cause any change to the routing tables, such that the network will remain stable as the creation is advertised. Once the links are all operational, the routers all enter split table mode. The new links are all assigned a low cost, then after the time needed to recompute the routing tables, split table mode is exited.

y means of the procedures above, management connectivity remains stable throughout a fault-free adaptation. Furthermore, connectivity is maintained to all possible nodes in the event of a failure. It will be noted that paths with a high cost are only less preferable to those with low cost. In the event that a high cost path becomes the only possible option, then the routing tables will be recomputed and this path will be used to achieve management connectivity. The stipulation above that split table mode stops the new routing table being used only for certain cases of topology change means that a failure of a low cost link during this mode will not prevent connectivity being maintained over higher cost routes.

It will be clear that the changes to operating mode or link cost, the deletion of links and the creation of links can all be executed by a trigger mechanism. Thus, as with all other changes during the preferred adaptation, they can be preloaded before any change steps are carried out and then executed with the minimum of data transfer during the adaptation.

It should be noted that RFC2328 specifies that in the event of a topology change becoming known to a router, the router ceases forwarding data until it has recomputed its routing table, to avoid routing instability. In a preferred implementation for a mesh, this rule does not apply if the topology change involves only changes to the operational state of high cost links.

In the case of adaptation, this ensures that traffic flow is not interrupted by changes to the topology that would not result in changes to the routing tables.

This can also be used to ensure that the installation, maintenance or deintstallation of a new node does not disrupt unrelated traffic flows elsewhere in the mesh. During such operations, a link to such node may well become operational and then non-operational repeatedly. Such a link can be assigned a high cost during the process. Preferably split table mode is not employed during such a period. Therefore the routing tables will be recomputed and applied, so that each router will add/delete a route to the affected node as the link's state dictates. However, there will be no suspension of traffic flows during the recomputation, so that all other routes are unaffected.

IV.7. Other Relevant Properties of Mesh Network Equipment

In general, where a radio link is to be set up between two nodes where no link is currently operating, then the link set-up process may take a significant time and its success may not be guaranteed. If the time taken to start up the new link exceeds the time for which a path can be interrupted without the service being deemed to be disrupted, then no mesh changes can be permitted in which traffic is diverted onto the link at the same time that start-up of the link commences. In other words, a link start-up and a route switch of traffic onto the link cannot occur as a simultaneous step in such a case. To avoid service disruptions due to adaptation, it may also be desired that the operation of a newly started link can be verified before traffic is switched onto it. The preferred methods described herein allow both of these cases to be accommodated.

V. Adaptation

In general, the adaptation methods described herein can be realised by suitable modification of the process that was or is used to form the mesh network. Bearing in mind that, as a generality, some formation process is always required to form a mesh and that such formation process may or may not be like that described in this specification, as a generality the adaptation methods described herein may or may not make use of the preferred formation method described herein.

However, notwithstanding the generality of the above, the adaptation methods described herein preferably make use of the formation method described generally and in detail above. This is principally because the meshes produced by this preferred formation method, as described herein, have a number of properties that increase the success rate of particular adaptation methods, make some adaptation methods possible that would not be otherwise, and reduce the complexity in others.

In particular, all meshes produced by the preferred formation method include a primary topology. As discussed above, this is a non-redundant topology which has the capacity to meet all of the traffic commitments of all the services supported by the mesh and in which the use of at least one antenna is not required at each node. (For this purpose, it should be recalled that a feeder link is preferably treated as a pair of nodes, each with multiple antennas, but only one line-of-sight, as discussed in Section II.7.) For each service, the primary path for that service runs along the primary topology.

Further, as mentioned, it is possible in the preferred formation method to constrain the mesh to include specified nodes as mesh "leaves", that is to force such nodes to have only one connection to the primary topology. This allows the remainder of the mesh to function with or without these nodes, so that a leaf position is suitable for a node which is for example to be installed, de-installed or is unreliable. This in turn permits a mode of operation which may be termed "adapt then install", wherein a mesh is planned in which all new nodes are leaves and which may involve adaptation of the current mesh. This can always be broken down into first an adaptation that involves only the existing nodes, followed by one or more installations that do not require any changes to the current mesh. This separation is important for a number of reasons. First, it may be desired to carry out adaptations during periods of low network usage, such as night hours, while it may be desired to carry out installation when staff costs are lowest and customers are available to give access to site, such as normal working hours. The separation of adaptation and installation allows each type of operation to be scheduled at its most appropriate time. It also allows mesh-affecting changes to be restricted at any one time to either adaptation (preferably executed and monitored automatically) or installation proceeding at a person's pace and subject to unexpected factors on site. This separation is preferable for the purpose of minimising undesirable interactions and also for monitoring, understanding and assuring the correct operation of the network.

It will be noted that where plural nodes are each specified as a leaf, it follows that the primary path for one such node cannot lie through another such node. For the purposes of making changes to a mesh that require nodes to be added to or removed from the mesh, this provides the significant operational benefit that these installations can be carried out in any order. This allows geographical factors, such as the best routing between job sites, and other factors, such as hours at which site access can be gained, to be used as the basis for scheduling installation tasks, after the mesh change has been calculated. This allows for example changes of site availability to be accommodated during job execution.

In another preferred alternative to making every node a leaf, the formation process can be modified to replace this stipulation by an alternative stipulation defined in terms of node clusters. A node cluster may be the set of nodes that are located at a common site. For example, at one site there might be two radio nodes, a customer access node and a switching device node connecting to them all by means of cable connections. In such a case, their installation may be desirably a single job, something that is incompatible with the previous leaf-based restrictions. In one method for ensuring that the new node cluster installations form jobs that can be carried out in any order, all nodes are labelled with a cluster identifier, and the nodes within each cluster which are yet to be installed are also labelled. Then, the following additional step is included in the preferred formation method between steps F7 and F8 discussed in Section II.4. "Create Primary Topology" above and shown in FIG. 2: discard all paths which, when considered in the direction starting at the node under consideration, cross one or more boundaries between two node clusters and then encounter a node which has yet to be installed.

In some cases it may not be important that installation jobs can occur in any order, but the "adapt then install" property is still required. In such cases, the relaxation of the independence of installation order may increase the probability that an adaptation with a small number of steps will occur and this may therefore be desirable. In order to produce meshes that conform to this pattern, the step between steps F7 and F8 mentioned above is altered so as to discard all paths which, when considered in the direction starting at the node under consideration, encounter a node that is currently installed, cross one or more boundaries between two node clusters and then encounter a node which has yet to be installed.

Similar considerations and procedures to those above apply to cases of deinstallation.

V.1. Use of Auxiliary Timeslot Allocations

Where a mesh radio system is made up of discrete timeslots, then the preferred colouring process described above can be used to produce a stable arrangement of compatibly operating radio links. There are a number of functions which, if incorporated into mesh nodes, will improve the probability of successful execution of an adaptation, but which require nodes to transmit on timeslots other than those that were accounted for in the colouring used in the current mesh, without affecting the stability of the links operating in the current colouring configuration.

For example, the purpose of the transmissions may be to test whether a calculated colour allocation will in fact operate compatibly, and this should be done in such a way that carrying out the test will not affect the stability of the current mesh.

Such functions can be carried out by allocating some time for "auxiliary timeslots". These are allocations of time that are outside the normal timeslot allocation. One approach to providing auxiliary timeslots is "robbing": from time to time, the period allocated to a particular timeslot is robbed and used instead to provide an alternative timeslot. The other is to add an auxiliary time allocation. For example, if the timing structure of the radio systems is divided into repeated standard frames, each standard frame containing one occurrence of each normal timeslot, then after n such standard frames, an auxiliary frame is added before the next standard frame. In both cases above, the auxiliary timeslots can be arranged to occur much less frequently than normal timeslots, so that they reduce the traffic capacity of the mesh by only a small margin.

Both of these mechanisms can be used to generate auxiliary timeslots. In both cases, preferably auxiliary timeslots are always produced as a contiguous group of timeslots. If an auxiliary timeslot is used for making signal measurements, then the signal to be measured is preferably transmitted in the middle of the auxiliary timeslot group, so that there are "guard" auxiliary timeslots before and after it. Guard timeslots are preferred because of the fact that, as noted above, one transmitting node can generate interference at another node outside the timeslot used for transmission if the nodes are located far enough from each other. Therefore:

if a signal is to be emitted and measured in an auxiliary timeslot, then guard timeslots between the previous normal timeslot and the measurement timeslot ensure that signals from normal mesh operation do not add error to the measurement process;

if a signal is to be emitted and measured in an auxiliary timeslot, then guard timeslots between the emission timeslot and the next normal timeslot ensure that the emitted signal does not interfere with normal mesh operation.

Auxiliary timeslots have a number of uses in the context of increasing the success rate of the adaptation process. The first is that they can be used to set up a special radio link using a pair of timeslots within the group. If the two timeslots used are surrounded by guard timeslots, then such a link can be set up without interference problems between the special radio link and the operating mesh.

Such a special radio link can be used, prior to an adaptation, to verify that each line-of-sight proposed for use in the adaptation steps is viable for use as a radio link. Preferably, before the computation of an adaptation sequence occurs, the lines-of-sight that are included as candidates have all been verified. This can be carried out as a background task over a long period, preferably with lines-of-sight being retested periodically to check for any new effects due to changing vegetation, etc. The process entails taking a "spare" antenna at each end of the link and pointing it along the line-of-sight to be verified. It should be noted that this takes advantage of the preferred implementation of the formation method discussed above in which formation arranges for one antenna per node not to required to carry traffic on the primary topology.

Such a special radio link can also be used during installation of a new node, to verify that it will operate compatibly with the existing mesh. As a part of the preferred computation of the new mesh, the links to the new node will already have been assigned normal timeslots, as a part of the colouring process. First, a radio link is started from the new node to an existing node, using only auxiliary timeslots, isolated using guard slots. It is now possible for all nodes in the mesh to determine whether the transfer of this new link to its assigned normal timeslots would interfere with their current operation. To achieve this, suppose that one direction of the new link is assigned normal timeslot T1, but is currently operating on auxiliary timeslot A1. A node N1 that is receiving on T1 measures the interference power that it is currently receiving on A1. If this power that N1 is receiving on T1 is greater than that on A1 by at least its required demodulation margin, then the new link will not cause an interference problem. Otherwise, T1 is an unsuitable timeslot for use for the new link. The link to the new node may also interfere with timeslots after T1. This can also be tested in the guard timeslots after A1. For example, a node N2 that might be affected on timeslot T1+1 measures the interference power that it is currently receiving on A1+1. If this power that N2 is receiving on T1+1 is greater than that on A1+1 by at least its required demodulation margin, then the new link will not cause an interference problem. Otherwise, T1 is an unsuitable timeslot for use for the new link.

The auxiliary timeslots can also be used during the adaptation steps themselves. For example, when a change to a new link and colouring arrangement is about to happen, then the auxiliary timeslots can be used to verify that this new arrangement is compatible across the mesh, while still operating the previous link and colouring arrangement. The new arrangement can be tested out for each normal timeslot in turn. Suppose that there are t1 transmitters on timeslot T1 in the new arrangement and that one such transmitter X will transmit on link L to receiver R. To verify that link L will operate correctly, then first all t1 transmitters transmit on an auxiliary timeslot A1. R measures the received power in A1. Then all t1 transmitters except X transmit and R again measures the power in A1. If the second power reading is less than the first by at least its required demodulation margin, then link L will operate correctly in the new arrangement.

In order for the above measurements to be made, all of the transmitters and receivers who will use T1 must place an antenna in the position where it will be in use for T1 in the new colouring arrangement. In some adaptation sequences, it is possible for all antennas to be so arranged so that they satisfy that requirement for all of the normal timeslots simultaneously. In other cases, this is not possible. However, provided that the current mesh has at least one "spare" antenna per node, i.e. that is not required as part of the primary topology as in the preferred embodiment discussed above, then it is possible to satisfy this requirement for each normal timeslot individually: the spare antennas can be moved into the positions for timeslot T1, the above measurements can be made for the t1 transmitters, then the spare antennas can be moved into the positions for timeslot T2 and so on. It will be understood that an adaptation sequence that allows the measurements to be made for all normal timeslots, without movements of antennas during the measurement sequence, has benefits in terms of speed of execution.

Figure 5:
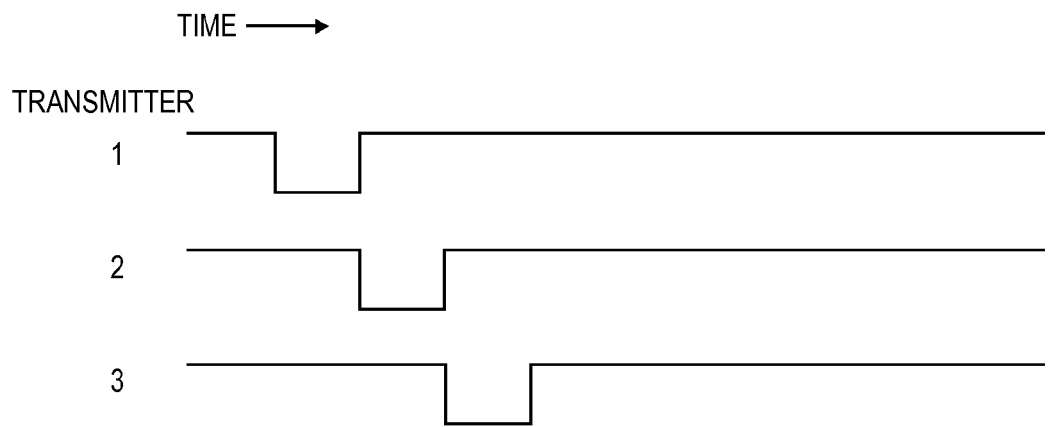
FIG. 5 shows schematically a first example of a transmission pattern for determining whether a set of links will operate self consistently; and, FIG. 6 shows schematically a second example of a transmission pattern for whether a set of links will operate self consistently.

Preferably all of the measurements for timeslot T1 are made in a single synchronised sequence, as follows. The measurements may be made in (t1+1).c consecutive occurrences of timeslot A1, where c is the number of timeslots during which a receiver must measure received power in order for the result to be of acceptable accuracy. Prior to the measurement sequence, each of the t1 transmitters is notified of the values of c and t1 and is also assigned a unique number in the range 2 to t1+1. The same information is given to each of the receivers that will be receiving from one of the t1 transmitters. The receivers and transmitters are all notified of a particular occurrence of A1, at which the measurement sequence will begin; this may be done by means of a method such as the triggering protocol described above. In the first c occurrences of A1 thereafter, all transmitters transmit and all receivers measure the received power level. Then one transmitter at a time (since the transmitters were each given unique numbers), the transmitters stop transmitting for a total of c occurrences of A1. After c occurrences of A1, the transmitter that has stopped resumes transmission and another transmitter stops, until all t1 transmitters have done so. This transmission pattern is shown schematically in FIG. 5. When a transmitter stops transmitting, the corresponding receiver makes a power measurement. At the end of the sequence, each receiver has two power measurements: one for its transmitter plus all interferers, the other for only the interferers. If the second power reading is less than the first by at least its required demodulation margin, then this link will operate correctly in the new arrangement. This method is termed herein a summed interference measurement.

Figure 6:
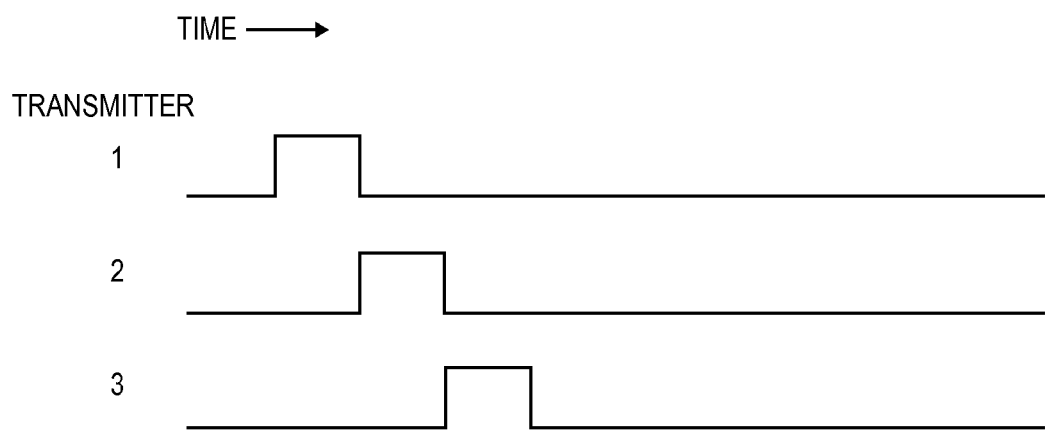

An alternative method is a component interference measurement, in which the t1 transmitters are caused to transmit one by one, but without the initial all-transmitters transmission. The arrangement would then be as shown schematically in FIG. 6. In this alternative method, each receiver measures the received power from each of the t1 transmitters. The receiver has been notified prior to the measurement sequence as to where in the transmission sequence "its" transmitter will transmit. Each receiver is therefore able to compare the signal from "its" transmitter with all other interferers. In order to determine whether the link will operate correctly, this component interference measurement method requires that the interferers be summed before comparing them with the desired signal. In contrast, the summed interference measurement method measures the summed interferers directly. In the event that a link will not operate correctly, the component interference measurement method enables the receiver to identify which transmitter is the source of the problem.

Both of these methods as described above allow for testing of interference only between all users of a timeslot T1. The case where a transmitter transmitting on T1−1 causes interference at a node receiving on T1 can also be accommodated in some cases. In order for this to be possible in the mesh described above, antennas should be aligned to their positions for both T1−1 and T1 simultaneously. In such a case, the procedure for a summed interference measurement is modified so that in addition to the transmissions and measurements in A1, all transmitters that would be transmitting in T1−1 transmit throughout the sequence in the guard timeslot A1−1 that immediately proceeds A1. Interference from T1−2, if relevant, can similarly be tested by means of transmissions in A1−2, provided the antenna positions for T1−2 are also simultaneously possible.

For a component interference measurement, the inter-timeslot effect is measured slightly differently. All antenna positions for T1 and T1+1 must first be set up. The sequence of the t1 transmissions and measurements remains as described above. In addition, all receivers for T+1 make t1 separate interference measurements in the guard timeslot A1+1 immediately following A1. Again the technique can be extended to T1+2 if relevant.

A measurement of future link and timeslot compatibility is another optional part of adaptation. It adds extra time to the execution of the adaptation. However, it reduces the chance of a link failure during the adaptation due to unpredicted interference between links.

In addition to their use during adaptation, either or both the component interference measurement and summed interference measurement process can be carried out in the auxiliary timeslots during normal mesh operation. Used this way, they can provide early warning of changing interference conditions and an indication of the causes of such conditions.

V.2. Methods of Adaptation

The methods of mesh adaptation that can be used differ in the degree of and type of change that they involve. It is possible to classify mesh adaptation methods according to their degree of or type of change. It should be understood that such classification is used in this specification merely as an aid to understanding the concepts and is not intended to limit the application of such methods to real meshes. In the preferred implementation, such classification is based on criteria such as the antenna movements that are required, the changes to the primary path routing, and/or the timeslot re-allocations.

V.2.1. Methods Classified as Provisioning

In these methods, no changes are made to the existing primary topology and hence no changes are made to the existing primary traffic paths. No radio links are used in the new mesh that were not included in the current mesh, except for radio links where at least one end of each link is at a new node. Hence no antennas are moved except to form links to a new node. These methods can be used for example where one or more new nodes are to be installed into an existing mesh. Furthermore, in these methods, the primary topology of the new mesh configuration is constrained to be identical to the primary topology of the initial mesh configuration, except for the addition of a new link to each new node.

In the preferred embodiment for performing these methods, the new primary topology is obtained by the normal formation method except that the links from which the formation method is allowed to choose are restricted to a combination of all those links in the current mesh plus all links between a new node and an existing node. In addition, all new nodes are constrained to be leaves in the new primary topology. These constraints have the result of producing a primary topology that satisfies the requirements above (if one exists).

In the case where a valid primary topology exists that satisfies these constraints, it will be possible to install each new node without affecting the primary paths of existing services.

Various options are available for computing the remaining mesh topology in the preferred embodiment, thus providing alternative methods of provisioning. The first is strict provisioning. In this case the entire current mesh, without any modifications to it, must form a part of the new mesh. Thus, the new primary topology is valid only if adequate timeslots can be allocated to the new links without the need to change the timeslot configurations on any radio links in the current mesh. To ensure this condition holds, a constraint can be added in the primary formation process which prevents a primary path being added that adds a timeslot to any existing primary link. During resilient link addition, after all the existing resilient links have been incorporated without change, the formation algorithm attempts to add any resilience links where at least one end of each link is at a new node, using the normal procedure applied only to these choices. During back-up path addition, after all the existing paths have been incorporated without change, the formation algorithm attempts to add any back-up paths for new services where at least one end of each link is at a new node, using the normal procedure applied only to these choices. During recolouring all existing colourings must be maintained; new link timeslots must be compatible with these colourings.

In carrying out strict provisioning, no changes to the mesh need to be made which affect existing mesh links or paths for existing services. The only changes to the mesh consist of adding new nodes, links and services as a part of an installation procedure.

The second method of provisioning is additive provisioning. In this case, it is permitted to add one or more timeslots to an existing mesh link, provided that this can be done without changing the configurations of timeslots already in use on any radio links in the current mesh. This is computed as above for strict provisioning, except that during primary topology formation timeslots are permitted to be added to primary topology links provided that each node affected has an unallocated timeslot available.

The third method is subtractive provisioning, in which primary links and paths are chosen from those already present plus those to a new node, but resilience links can be removed as required to make way for a new link in the primary topology.

The fourth is substitutional provisioning: this is a combination of the previous two, in which recolouring of timeslots is also allowed.

These types of provisioning, in the order given above, offer gradually increased probability of success. The execution steps for adaptation by provisioning depend on which option above is used. Except in the strict provisioning case, changes to the mesh will be required to allow installation of one or more new nodes. These changes are a subset of those required for redistribution, which is described below. There is a significant difference between all types of provisioning and redistribution: in all types of provisioning there is no alteration to primary paths and hence no route switching is required.

In general, provisioning requires the least changes to be made to the mesh and is therefore the easiest to achieve and in general should be tried first. However, provisioning may fail to find an acceptable solution. This may be because, for example, there is no line-of-sight from the new node to an existing node with at least two free antennas (which, it will be understood, is a necessary condition for producing a valid primary topology with the preferred stipulation that a spare antenna remain at each node) or because the only possible links to the new node would result in a violation of the maximum hop count or would result in excess traffic on one of the links. In such cases, a more complicated class of adaptation will be required.

V.2.2. Methods of Redistribution

In these methods, no radio links are used in the new mesh that were not included in the current mesh, except for radio links where at least one end of each link is at a new node. However, no other restrictions are imposed, so that the new primary topology can use any existing links in the mesh. Links from the current mesh may not necessarily appear in the new mesh.

These methods can be used for example where one or more new nodes are to be installed into an existing mesh. (An analogous method for removing a node from the current mesh exists, as discussed briefly below.) These methods are also suitable as a way to adjust the primary topology so that specified nodes become leaves or where the overall parameters of the mesh require to be adjusted.

A redistribution can be produced by using the formation process completely unmodified, except that the links that it is given as candidates during the whole process are restricted to those which are included in the current mesh, plus those links where at least one end of each link is at a new node.

The output from the process, if redistribution is possible in any particular case, is a new mesh in which no new radio links are required (except for radio links where at least one end of each link is at a new node), although use of some radio links may cease. As a result, a change from the old mesh to the new mesh can be carried out as a single triggered change step. In the preferred implementation of the mesh, the new mesh should be coloured before the adaptation can be implemented.

The single triggered change step can include both route switching and recolouring operations in any combination. The sequence follows the four general steps described above in the preload and trigger procedure; there is only one triggered step required to carry out the redistribution and there is no operation of an intermediate mesh.

In a preferred implementation, interference measurements and path costs adjustments will be carried out, in which case the detailed operation can be as follows. In the following discussion, reference will be made to a starting mesh called MESH(A) and to a target mesh called MESH(B). For the purposes of this sequence, MESH(B) is the mesh produced by the formation process, but omitting any of the new nodes and links that are to be installed. Once this mesh is operating, these new items can be installed, following the "adapt then install" principle:

Step 1: preload all of the change information that will be required during the triggered steps that are described below;

Step 2: add all traffic paths that will be used in MESH(B) and which are not used in MESH(A);

Step 3: enable split table mode for all management router functions;

Step 4: all links that are included in MESH(A) but not MESH(B) are altered in the management routing database to a high cost;

Step 5: after the time required for reconvergence of routing tables, disable split table mode for all management router functions;

Step 6: measure the interference behaviour of each timeslot in turn for MESH(B). Since all antennas to be used in MESH (B) are correctly positioned at this stage, the measurement may be made taking into account inter-timeslot interferences;

If step 6 indicates that any link will experience interference such that the received signal does not exceed the interference by the demodulation margin required, then the adaptation process must be abandoned, the results analysed and a different adaptation computed (for example taking into account the new information about interference between links, when colouring is carried out). If the adaptation is to be abandoned, then step 5 to step 2 above must be reversed.

If the interference measurements are satisfactory, the process proceeds to step 7:

Step 7: recolour all operating links for their MESH(B) configurations. This may include destroying some MESH(A) links. Switch the routes of all services to their MESH(B) path configurations;

In the event that any link fails to operate properly, then again the adaptation must be abandoned and the problem analysed, so reverse step 7 and then steps 5 to 2 above. Otherwise, wait for a period until MESH(B) is deemed stable and then proceed to step 8.

Step 8: remove all traffic paths that were used in MESH(A) and which are not used in MESH(B).

This class of adaptation described by way of example in detail above avoids antenna movements (other than those required to form links to the new node during installations) and does not require operation of intermediate meshes and in general is therefore the next easiest to achieve after provisioning.

As a further alternative method of adaptation, a class of adaptation can be used in which the primary topology of the new mesh "PRI(B)" is overlaid by the topology of the old mesh MESH(A) but in which any lines-of-sight can be considered for redundant links. This method requires antenna movements but not to set up the new primary topology and in some circumstance it may result in a mesh that has better redundancy. It is computed as for redistribution, except that once the primary topology has been computed, all links are then considered in the subsequent steps, rather than only links from the current mesh. Execution of this type of adaptation is as for adaptation by coexisting primaries, which is discussed next.

If none of the classes of adaptation described by way of example above provides an acceptable solution, then other, more complex classes of adaptation that include antenna movements can be considered.

V.2.3. Methods of Coexisting or Overlapping Primaries

In these methods, a new mesh is produced in which new radio links are added between existing nodes. Thus, in these methods, some antenna movements are required within the existing mesh. These methods preferably constrain the formation process to produce a new mesh such that only one or two groups of antenna movements are required and such that the change steps involve operating only one intermediate mesh.

The methods attempt to find a new mesh such that all radio antennas required for the old primary topology and the new primary topology can be allocated at the same time. In other words, the antennas for both primary topologies can be positioned without exceeding the number of available antennas at any node. Hence, the antenna positions required for the primary topology of the new mesh can be achieved without prejudice to the ability of the current primary topology to carry all committed traffic across the mesh.

This will be discussed below by way of detailed example by reference to a starting mesh called MESH(A), which has a primary topology PRI(A), and a target mesh called MESH(B), which has a primary topology PRI(B).

In a case where it is acceptable for new radio links to be started up at the same time as traffic paths are transferred onto them, a recolouring can be carried out in which all the old primary links are replaced with all the new primary links. This is actually an augmented version of recolouring as described above since it applies to links which were not previously operating.

In the case where it is required that new radio links are started up before traffic paths are transferred onto them, this imposes an additional requirement that sufficient timeslots are available at every node both to support the current primary topology carrying all of its committed traffic load plus the minimum number of timeslots required to start up each link that appears in PRI(B) but not PRI(A). This then permits the use of an intermediate mesh MESH(I) which includes this combination of links. MESH(I) allows all of the new links in PRI(B) to be started up and their operation verified, before a change to use of PRI(B) is actually made. The adaptation via the intermediate mesh MESH(I) requires use only of the standard, unaugmented recolouring function.

In the remaining description in this section, the requirement to start up links before traffic paths are transferred onto them, and hence use of this MESH(I), is assumed. The modifications for the other case will then be described.

The discussion of the preferred method of computation of the steps in this class of adaptation below refers to the formation steps in the unconstrained mesh formation process described in detail above.

The first operation is to compute PRI(B). This can be done by proceeding as for the unconstrained mesh formation process, except with the following modifications. As in the unconstrained mesh formation process (but not as in the previous two classes of adaptation), all lines-of-sight between mesh nodes are offered to the formation process as candidates for PRI(B).

In the preferred method, the modifications to the formation process to be used for computing PRI(B) include two additional steps before the start of the formation process. In the first step, all lines-of-sight are marked with a flag indicating whether they were used in PRI(A). In the second step, the number of new links for PRI(B) that can be supported by each node is calculated. If the number of antennas which are not used at a node on links forming part of PRI(A) is $a_{Free}$, the number of timeslots not in use at that node on links forming part of PRI(A) is $t_{Free}$, the minimum number of timeslots required for a radio link is 2 and $p_{Free}$ is the number of whole pairs of $t_{Free}$ timeslots, so that $p_{Free}=t_{Free}/2$ for $t_{Free}$ even, $(t_{Free}-1)/2$ for $t_{Free}$ odd, then the number of new links for PRI(B) that can be supported by that node is the lesser of $a_{Free}$ and $p_{Free}$. For example, if a node with 16 timeslots and 4 antennas uses 13 timeslots and 2 antennas in PRI(A), then it can support one new link for PRI(B). The same is true for example of a 4-antenna node that uses 12 timeslots and 3 antennas in PRI(A).

The modifications to the formation process in the preferred embodiment further include an additional test added as part of step F9 in the unconstrained mesh formation method as applied in the process for computing PRI(B). When a path is evaluated for use in PRI(B), at each node in the path a count is made of the number of lines-of-sight that will be used (newly for this path) that were not used in PRI(A). If this number would exceed the number of new PRI(B) links that the node can support, as calculated as above, then the path is rejected. If it equals that number, then at step F10 in the unconstrained mesh formation method, all unused lines-of-sight from the node that are not flagged as used in PRI(A) are marked as unavailable.

At step F11, if the number of violations is zero, so that the path is selected as part of PRI(B), then at each node in the path the number of new PRI(B) links that the node can support is reduced by number of lines-of-sight that have been are used (newly for this path) that were not used in PRI(A).

Once PRI(B) has been computed, two options can be applied for computing the rest of the new mesh MESH(B), thus forming alternative methods of adaptation by coexisting primaries.

These two methods differ according to whether the adaptation can be carried out using only one mesh change step at which antenna(s) must be moved, or two such steps. Use of only one step reduces the risk of failure during the adaptation. On the other hand, the use of two steps increases the capability of the formation process to produce back-up capability since MESH(B) is less constrained in its topology.

It will be observed that if interference measurements are to be carried out prior to recolouring, then the single movement case allows a complete set of measurements on all timeslots to be made with the antennas moved all together into their new primary topology positions, but without any disruption of traffic from the old primary topology. These measurements can include measurement of all inter-timeslot effects.

In the case of two movements, the above does not hold. The preferred point in the process for making such measurements is set out below.

For an adaptation with two movement steps, once PRI(B) has been computed, the rest of the new mesh MESH(B) can be computed making use of the formation process with no further modifications and with free choice from all lines-of-sight.

For an adaptation with one movement step, further modifications are made to the formation process when resilience links are selected. At the start of the resilience link selection process, three extra steps are inserted before proceeding to select the first resilience link. First, all lines-of-sight corresponding to links in PRI(A) but not in PRI(B) are marked with a flag (such links representing some of the candidate resilience links in MESH(B)). Then, for each node, the number of "movable antennas", meaning the number not used in the coexistent mesh of PRI(A) and PRI(B) and hence still free to be moved in the single antenna movement step, is marked. Finally, at all nodes where this number is equal to zero, all lines-of-sight from each such node are marked as unavailable, apart from those flagged as corresponding to links in PRI(A) but not in PRI(B).

One extra step is inserted after each resilience link has been added. When a link is added that is not flagged as having been in PRI(A), the number of movable antennas at both ends of the link is decremented. At each end of the link, if the number of free antennas becomes zero, all lines-of-sight from that node are marked as unavailable, apart from those flagged as having been in PRI(A).

In the preferred method, this planned adaptation would then actually be performed on the mesh configuration by a sequence of adaptation change steps. The steps will first be described by way of example for the single antenna movement case:

Step 1: preload all of the change information that will be required during the triggered steps that are described below;

Step 2: add all traffic paths that will be used in MESH(B) and which are not used in MESH(A);

Step 3: enable split table mode for all management router functions;

Step 4: all links that are included in MESH(A) but not MESH(B) are altered in the management routing database to a high cost;

Step 5: after the time required for reconvergence of routing tables, disable split table mode for all management router functions;

It should be noted that steps 3 and 4 can be carried out as a single triggered action; in this case, step 5 would also probably be triggered. Triggering is optional since no resilience is yet being removed from the network. However, the routing tables are in a sub-optimal arrangement, due to the artificial costs added. Hence, triggered operation may be preferred, as this shortens the time for which the routing tables are sub-optimal. From step 6, triggering is preferably used, since resilience now begins to be depleted and maximum speed through these steps is therefore desirable.

Step 6: drop all links for which at least one of the assigned antennas will be moved and move these antennas to their positions in MESH(B);

Steps 7 and 8 are preferably executed to make an interference test on each of MESH(I) and MESH(B) before carrying out any recolouring:

Step 7: measure the interference behaviour of each timeslot in turn for MESH(I). Since all antennas to be used in MESH (I) are correctly positioned at this stage, the measurement may be made taking into account inter-timeslot interferences;

Step 8: measure the interference behaviour of each timeslot in turn for MESH(B). Since all antennas to be used in MESH (B) are correctly positioned at this stage, the measurement may be made taking into account inter-timeslot interferences;

If either of steps 7 or 8 indicates that any link will experience interference such that the received signal does not exceed the interference by the demodulation margin required, then, as described for redistribution, the adaptation must be abandoned and the problem analysed, so reverse steps 6 down to 2 above. Otherwise, proceed to step 9:

Step 9: recolour all operating links for their MESH(I) configurations. Start up all new MESH(I) radio links, using their MESH(I) colourings. Note that only the minimum possible number of timeslots required to establish each link is need be used at this step. All of step 9 is carried out as one triggered action;

In the event that any link fails to start up or operate properly the adaptation must be abandoned and the problem analysed, so reverse step 9 and then steps 6 to 2 above. Otherwise, wait for a period until MESH(I) is deemed stable and then proceed to step 10.

It may be noted that the intermediate mesh MESH(I) now operating is a mesh supporting all timeslots required to carry the traffic of PRI(A) plus at least two timeslots per link present in PRI(B) but not in PRI(A); it may also include some of the back-up paths present in MESH(A) if possible.

Step 10: recolour all operating links for their MESH(B) configurations. This may include destroying some MESH(I) links. Switch the routes of all services to their MESH(B) path configurations. Start up all new MESH(B) radio links, using their MESH(B) colourings. All of step 10 is carried out as one triggered action;

In the event that any link fails to start up or operate properly, the adaptation must be abandoned and the problem analysed, so reverse step 10, step 9 and then steps 6 to 2 above. Otherwise, wait for a period until MESH(B) is deemed stable and then proceed to step 11. This wait is preferably longer than that after step 9, since after this period the ability to reverse the whole sequence quickly will be lost.

Step 11: enable split table mode for all management router functions;

Step 12: all links that are included in MESH(B) but not MESH(A) are altered in the management routing database to a low cost;

Step 13: after the time required for reconvergence of routing tables, disable split table mode for all management router functions;

As above, steps 11 and 12 and step 13 may each constitute a single triggered step.

Step 14: remove all traffic paths that were used in MESH (A) and which are not used in MESH(B).

The procedure above is for a single movement adaptation for the case where traffic cannot be transferred onto radio links at the same time that they are started up.

For the case where links can be started and be loaded with traffic simultaneously: (i) in the computation stage $p_{Free}$ is no longer used, so that the number of new antennas available for PRI(B) $a_{Free}$; and, (ii) MESH(I) is no longer required and hence steps 7 and 9 are not carried out.

For an adaptation with double antenna movements: (i) after step 9 is successful an extra step is used to move those antennas not in use for MESH(I) into their MESH(B) positions; and, (ii) the interference measurement for MESH(B), step 8 above, is carried out instead after the above new step.

A variation on the method of overlapping primaries is to compute a desired mesh without any adaptation constraints and then test whether this forms a MESH(B) which satisfies either of the single or dual movement adaptation conditions described above. The calculation can be performed as follows. After calculating the desired mesh by unconstrained formation, apply the overlapping primaries method, but allowing only the primary links in the unconstrained mesh and the PRI(B) links as candidates for PRI(B). If the method does not fail, this mesh may be preferable to that produced by the previous methods.

V.2.4. Methods of Repeated Overlapping Primaries

A further class of adaptation, which is the most likely to succeed of those described herein, is implemented as a repeated set of adaptations by coexistent primaries described in detail above. First, a new target topology is computed by unconstrained formation. If this is a target mesh whose primary topology coexists with the current primary topology, then adaptation can be carried out in one sequence as above. Otherwise, it will be necessary to find a series of such sequences (each of which is itself an adaptation by coexistent primaries) that achieves the desired objective.

In outline, this class of method first computes a target mesh MESH(T) using unconstrained formation, such that MESH(T) meets some new set of goals. Starting from the current mesh MESH(C) which meets the current set of goals, it then computes a progression of primary topologies $P_1 \ldots P_n$ each of which meets the goals for MESH(T), such that $P_1$ is PRI(C), $P_n$ is PRI(T) and such that for all $x<n$ $P_x$ and $P_{x+1}$ are a pair of coexisting primaries. This last property means that a progressive adaptation from MESH(C) to MESH(T) is therefore achievable using n−1 repetitions of the method of coexisting primaries described previously. Any one of the variations of the method can be used at each of the n−1 repetitions, according to the desired characteristics of the meshes after each repetition.

Thus only those techniques already discussed above will be required to carry out the adaptation. The only new technique required is a method for calculating $P_1 \ldots P_n$. The preferred method combines the computation of overlapping primaries with the link handicap method described above in connection with the formation process (Section II.5.). Starting with y=1, it repeatedly attempts to form a new mesh $P_{y+1}$ such that $P_y$ and $P_{y+1}$ are coexisting primaries. The computation process for coexisting primary PRI(B) given above is followed, with the additional modification of applying a handicap to all links that do not appear in PRI(C) and no handicap to those which do.

The result of applying this handicap is to produce a succession of $P_{y+1}$ which tend towards the topology of PRI(C). Options that can be applied to the computation include the level of handicap H applied and the overall set of lines-of-sight offered for the computation of each $P_{y+1}$. The set of lines-of-sight may be those in $P_y$ plus those in PRI(C); alternatively it may be all lines-of-sight. One preferred option is to carry out the following sequence for each $P_{y+1}$. First a value of H greater than the allowed hop count between two mesh nodes is used, with only lines-of-sight in $P_y$ plus PRI(C) being considered. If this does not produce a result different from $P_y$, H is reduced repeatedly and the process retried. If still no result different from $P_y$ is produced, then the above sequence of descending H is repeated, this time with all lines-of-sight being considered. This time a result is acceptable only if the result is different from $P_y$ and also includes more of the links from PRI(C) than does $P_y$.

It will be appreciated that the process above can also be carried out such that $P_1$ is PRI(T) and $P_n$ is PRI(C) because of the requirement that $P_x$ and $P_{x+1}$ are a pair of co-existent primaries for $x<n$. The method of execution in such a case is identical, except that the mesh changes then run in the order $P_n$ to $P_1$ rather than $P_1$ to $P_n$.

V.3. Other Adaptation Options

Whilst the above description of adaptation has referred in places to adaptation being required in order to add a node, as mentioned previously adaptation may be required in other circumstances, such as for example when a node is to be removed from the current mesh; to accommodate a change in the service level (e.g. bandwidth requirement) of a particular subscriber at a node; and to optimise the mesh if for example the current mesh becomes sub-optimal or falls below some quality threshold.

For removal of a node, the "adaptation then installation" procedure can be replaced by "adaptation then deinstallation"; the adjusted mesh is suitable for the removal of the relevant node(s) provided that these have been constrained to be leaf nodes during the adaptation process.

In some cases, it may be desired to limit the number of simultaneous mesh changes permitted to one or some other small number. In this case, there are two preferred approaches. In one approach, the methods described above are altered so that they produce steps limited to this maximum number of changes. Alternatively, the methods are unaltered, but each large step that they produce is then transformed into a set of smaller steps whose net result is the same as the large step.

Although the embodiments of the invention described herein with reference to the drawings principally comprise computer processes performed in computer apparatus and computer apparatus per se, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program. For example, the carrier may comprise a storage medium, such as a ROM, for example a CD ROM or a semiconductor ROM, or a magnetic recording medium, for example a floppy disk or hard disk.

Embodiments of the present invention have been described with particular reference to examples illustrated schematically in the drawings. However, it will be appreciated that variations and modifications may be made to the examples described within the scope of the present invention.

What is claimed is:

1. In a wireless communication system forming a mesh of networked nodes, a method of extending the mesh of networked nodes comprising:

identifying a node that is within wireless communication range of the mesh of networked nodes, but is initially unconnected to the mesh of networked nodes, wherein the node comprises a plurality of antennas;

reserving, by a computer apparatus, one of the plurality of antennas of the node as a free antenna to provide a radio link for mesh verification operations;

for each of the one or more remaining antennas of the node, identifying one or more transmission paths between the node and a destination node detectable via the one or more remaining antennas, each transmission path identified comprising a plurality of attribute values:

a) comparing an attribute value from each transmission path against a criterion, b) selecting a transmission path with an attribute value matching the criterion, and c) connecting the one or more remaining antennas of the node with the destination node via the selected transmission path, the node now connected within the mesh of networked nodes via the one or more remaining antennas; and repeating steps a-c until all of the one or more remaining antennas of the node are either connected to a respective destination node via a respective selected transmission path or until no additional transmission paths are identifiable via the one or more remaining antennas of the node.

2. The method of claim 1 further comprising:
repeating the method of claim 1 for all detectable nodes within wireless communication range of the mesh of networked nodes, but which are initially unconnected to the mesh of networked nodes until all detectable nodes are connected to any of a plurality of destination nodes within the mesh of networked nodes, wherein the mesh of networked nodes is extended to include all detectable nodes initially unconnected to the mesh of networked nodes.

3. The method of claim 1 wherein comparing the attribute value from each transmission path against the criterion terminates when a first transmission path with the attribute value matching the criterion is found.

4. The method of claim 1, wherein the criterion comprises one of a plurality of criteria selected from the group comprising: bandwidth hops between the node and the destination node, bandwidth distance between the node and the destination node, committed traffic load of the node, total currently committed data flow of the selected transmission path, total number of nodes between the node and a connection node along the selected transmission path, node number of antennas of the connection node, and number of unused antennas of the node.

5. The method of claim 4 further comprising:
establishing an order of preference for the plurality of criteria; and
wherein comparing the attribute value of each transmission path against the criterion comprises:
comparing the attribute value of each transmission path against each criterion of a subset of the plurality of criteria in the order of preference.

6. The method of claim 5 wherein selecting the transmission path with the attribute value matching the criterion comprises:
selecting the transmission path comprising at least one attribute matching each criterion of the subset of the plurality of criteria.

7. The method of claim 1 further comprising:
marking as potential transmission paths, each transmission path with an attribute value matching the criterion but not selected as the transmission path used for connecting the one or more remaining antennas of the node.

8. The method of claim 1 wherein:
the wireless communication system comprises exclusively wireless nodes and exclusively wireless transmission paths; and
wherein the wireless transmission paths comprise highly directional point-to-point radio transmission links between the exclusively wireless nodes of the wireless communication system.

9. In a wireless communication system forming a network of nodes, a method of generating extending a dataset stored in a data-repository, the dataset representing a topology for the network of nodes, the method comprising:
retrieving from the dataset in the data-repository, all node representations, destination node representations, and transmission path representations of the network of nodes;
identifying a node representation which is initially unconnected to the network of nodes according to the dataset, wherein the node representation is associated with a plurality of antennas in the dataset;
marking as unavailable, by a computer apparatus, any connection to a transmission path representation for which there are not at least two free antennas associated with the node representation available, to reserve one of the plurality of antennas associated with the node representation as a free antenna to provide a radio link for mesh verification operations;
for each of the one or more remaining antennas associated with the node representation which are not marked as unavailable, identifying one or more transmission path representations between the node representation and a destination node representation in the dataset, each transmission path representation identified comprising a plurality of attribute values;
comparing an attribute value from each transmission path representation against a criterion;
selecting a transmission path representation with an attribute value matching the criterion;
establishing in the dataset, a connection representation between the node representation and the destination node representation via the selected transmission path representation, the node representation now connected to the network of nodes within the dataset; and
storing in the data-repository, the dataset having the connection representation between the node representation and the destination node representation via the selected transmission path representation.

10. The method of claim 9 further comprising:
repeating the method of claim 10 for all node representations initially unconnected to the network of nodes according to the dataset until all node representations have connection representations between them and at least one destination representation via one or more corresponding transmission path representations in the dataset.

11. The method of claim 9 further comprising:
retrieving the dataset from the data-repository representing the topology for the network of nodes; and
applying the dataset representing the topology for the network of nodes to a corresponding actual network of nodes in the wireless communication system.

12. The method of claim 11, further comprising: performing a mesh verification operation wherein the wireless communication system to verify a node corresponding to the node representation in the dataset, as applied to the corresponding actual network of nodes, is within line of sight radio communication with one or more other networked nodes in the network of nodes by utilizing the reserved free antenna associated with the node representation in the dataset as a radio link to the node corresponding with the node representation in the dataset as applied to the corresponding actual network of nodes.

13. The method of claim 12, further comprising: making signal interference measurements affecting the node corresponding with the node representation in the dataset as applied to the corresponding actual network of nodes via the free antenna associated with the node corresponding to the node representation in the dataset, the signal interference measurements comprising reflection and scattering of transmitted signals between the free antenna associated with the node corresponding to the node representation in the dataset and one or more other destination node representations in the dataset as applied to the corresponding actual network of nodes.

14. The method of claim 13 further comprising:
establishing an order of preference for the plurality of criteria; and wherein comparing the attribute value of each transmission path representation against the criterion comprises:
comparing the attribute value from each transmission path representation against each criterion of a subset of the plurality of criteria in the order of preference.

15. The method of claim 9, wherein:
comparing the attribute value from each transmission path against the criterion comprises comparing one of bandwidth-hops or bandwidth-distance associated with the node representation relative to a connection node representation within the network of nodes that provides a network connection external to the corresponding actual network of nodes; and
wherein selecting the transmission path representation whose attribute value matches the criterion comprises: selecting the transmission path representation based upon a committed traffic load for the node representation relative to the bandwidth-hops or the bandwidth-distance associated with the node representation relative to the connection node representation.

16. The method of claim 1, further comprising: performing a mesh verification operation wherein the wireless communication system to verify the node is within line of sight radio communication with one or more other networked nodes in the mesh of networked nodes by utilizing the reserved free antenna of the node as a radio link for the node.

17. The method of claim 16, further comprising: making signal interference measurements affecting the node via the free antenna of the node, the signal interference measurements comprising reflection and scattering of transmitted signals between the free antenna of the node and one or more other networked nodes in the mesh of networked nodes.

18. The method of claim 1, wherein:
the mesh of networked nodes comprises a plurality of subscriber nodes and a plurality of transit nodes, wherein each of the plurality of subscriber nodes functions as a data source that originates traffic in the wireless communication system, and functions further as a data sink that is a destination for traffic in the wireless communication system, and functions further as a transit node through which traffic in the wireless communication system passes from one node in the mesh to another node in the mesh, and wherein each of the plurality of transit nodes function only as a transit node through which traffic in the wireless communication system passes from one node in the mesh to another node in the mesh but is neither an originating source nor a destination for the traffic in the wireless communication system; and
wherein extending the mesh of networked nodes and connecting the node to the mesh of networked nodes comprises connecting the node to the mesh of networked nodes as a subscriber node.

19. The method of claim 1:
wherein comparing the attribute value from each transmission path against the criterion of step "a" comprises comparing one of bandwidth-hops or bandwidth-distance associated with the node relative to a connection node within the mesh of networked nodes that provides a network connection external to the mesh of networked nodes; and
wherein selecting the transmission path with the attribute value matching the criterion of step "b" comprises selecting the transmission path based upon a committed traffic load for the node relative to the bandwidth-hops or the bandwidth-distance associated with the node relative to the connection node.

20. The method of claim 19, wherein the nodes in the mesh of networked nodes having the largest committed traffic loads are connected to the connection node via the shortest available path through the mesh of networked nodes to the connection node.

* * * * *